United States Patent
Silver et al.

(10) Patent No.: US 12,544,584 B2
(45) Date of Patent: Feb. 10, 2026

(54) THERAPEUTIC LIGHTING DEVICES AND METHODS

(71) Applicant: Pathy Medical, LLC, Shelton, CT (US)

(72) Inventors: Mikiya Silver, New Haven, CT (US); Gennady Kleyman, Brooklyn, NY (US); Vinod V. Pathy, Shelton, CT (US)

(73) Assignee: Pathy Medical, LLC, Shelton, CT (US)

( * ) Notice: Subject to any disclaimer, the term of this patent is extended or adjusted under 35 U.S.C. 154(b) by 371 days.

(21) Appl. No.: 17/228,292

(22) Filed: Apr. 12, 2021

(65) Prior Publication Data

US 2021/0322782 A1    Oct. 21, 2021

Related U.S. Application Data

(60) Provisional application No. 63/010,950, filed on Apr. 16, 2020.

(51) Int. Cl.
*A61N 5/06* (2006.01)
*A61B 17/02* (2006.01)
(Continued)

(52) U.S. Cl.
CPC .............. *A61N 5/06* (2013.01); *A61B 17/02* (2013.01); *A61B 2018/00595* (2013.01);
(Continued)

(58) Field of Classification Search
CPC .. A61N 5/06; A61N 5/067; A61N 2005/0626; A61N 2005/0644;
(Continued)

(56) References Cited

U.S. PATENT DOCUMENTS 5,871,522 A * 2/1999 Sentilles ............... A61B 90/40
607/94
11,147,984 B2 * 10/2021 Emerson ............. A61N 5/0624
(Continued)

FOREIGN PATENT DOCUMENTS

| CN | 202288372 U | 7/2012 |
| KR | 10-2012-0012194 A | 2/2012 |
| KR | 101168044 B1 | 7/2012 |

OTHER PUBLICATIONS

PCT International Search Report and Written Opinion dated Jul. 30, 2021, issued during the prosecution of PCT International Patent application No. PCT/US2021/027002.
(Continued)

*Primary Examiner* — Michael T. Holtzclaw
(74) *Attorney, Agent, or Firm* — Troutman Pepper Locke LLP; Scott D. Wofsy; Gabrielle L. Gelozin

(57) ABSTRACT

A device for treating biological tissue including a body having opposed proximal and distal end portions, a shroud extending from the distal end portion of the body, and a light source supported at a distal end of the body and connected to a power source for emitting therapeutic light to treat biological tissue proximate to the shroud, wherein the shroud is dimensioned and configured to establish an effective distance and area of therapeutic light treatment relative to the biological tissue to be treated.

15 Claims, 37 Drawing Sheets

(51) Int. Cl.
*A61B 18/00* (2006.01)
*A61B 18/14* (2006.01)
*A61B 90/30* (2016.01)
*A61N 5/067* (2006.01)

(52) U.S. Cl.
CPC .............. *A61B 2018/00922* (2013.01); *A61B 2018/1412* (2013.01); *A61B 2090/309* (2016.02); *A61N 2005/0626* (2013.01); *A61N 2005/0644* (2013.01); *A61N 2005/0651* (2013.01); *A61N 2005/0659* (2013.01); *A61N 2005/0661* (2013.01); *A61N 2005/0662* (2013.01); *A61N 2005/0664* (2013.01); *A61N 5/067* (2021.08)

(58) Field of Classification Search
CPC .... A61N 2005/0651; A61N 2005/0659; A61N 2005/0661; A61N 2005/0662; A61N 2005/0664; A61N 5/0624; A61N 2005/0632; A61N 2005/0643; A61B 17/02; A61B 2018/00595; A61B 2018/00922; A61B 2018/1412; A61B 2090/309; A61B 18/04; A61B 90/30
USPC ................................................ 607/1, 88–89
See application file for complete search history.

(56) References Cited

U.S. PATENT DOCUMENTS

| | | | | |
|---|---|---|---|---|
| 2003/0181893 | A1* | 9/2003 | Neuberger | A61B 18/203 606/9 |
| 2006/0167531 | A1 | 7/2006 | Gertner et al. | |
| 2008/0077204 | A1* | 3/2008 | Bornstein | A61N 5/0601 607/93 |
| 2009/0143842 | A1* | 6/2009 | Cumbie | A61N 5/0624 600/365 |
| 2010/0094265 | A1 | 4/2010 | Rastegar et al. | |
| 2011/0040358 | A1 | 2/2011 | Bean et al. | |
| 2011/0288617 | A1* | 11/2011 | Sharma | A61L 2/0047 607/88 |
| 2013/0013032 | A1* | 1/2013 | Irwin | A61N 5/0616 607/93 |
| 2014/0005756 | A1 | 1/2014 | Liu et al. | |
| 2015/0112411 | A1 | 4/2015 | Beckman et al. | |
| 2016/0016001 | A1 | 1/2016 | Loupis et al. | |
| 2016/0166848 | A1 | 6/2016 | Bouboulis | |
| 2017/0136257 | A1 | 5/2017 | Jurna et al. | |
| 2018/0185526 | A1* | 7/2018 | Brown | A61L 2/0047 |
| 2018/0318034 | A1 | 11/2018 | Julian Ibanez et al. | |
| 2019/0015681 | A1 | 1/2019 | Pyun et al. | |
| 2020/0230435 | A1* | 7/2020 | Bae | A61N 5/0616 |
| 2021/0267436 | A1* | 9/2021 | Yamashita | A61N 5/0603 |

OTHER PUBLICATIONS

Extended European Search Report issued by the European Patent Office, dated Jun. 14, 2024, in corresponding European Patent Application No. 21789121.7.

Canadian Office Action dated May 1, 2025, issued during the prosecution of CA 3173195.

\* cited by examiner

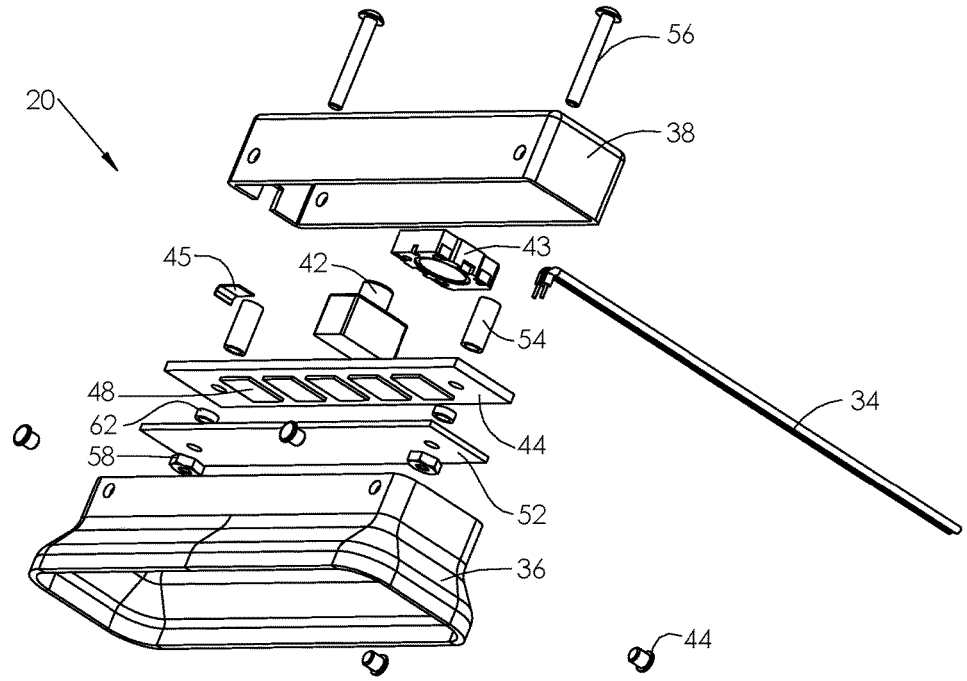
FIG. 13
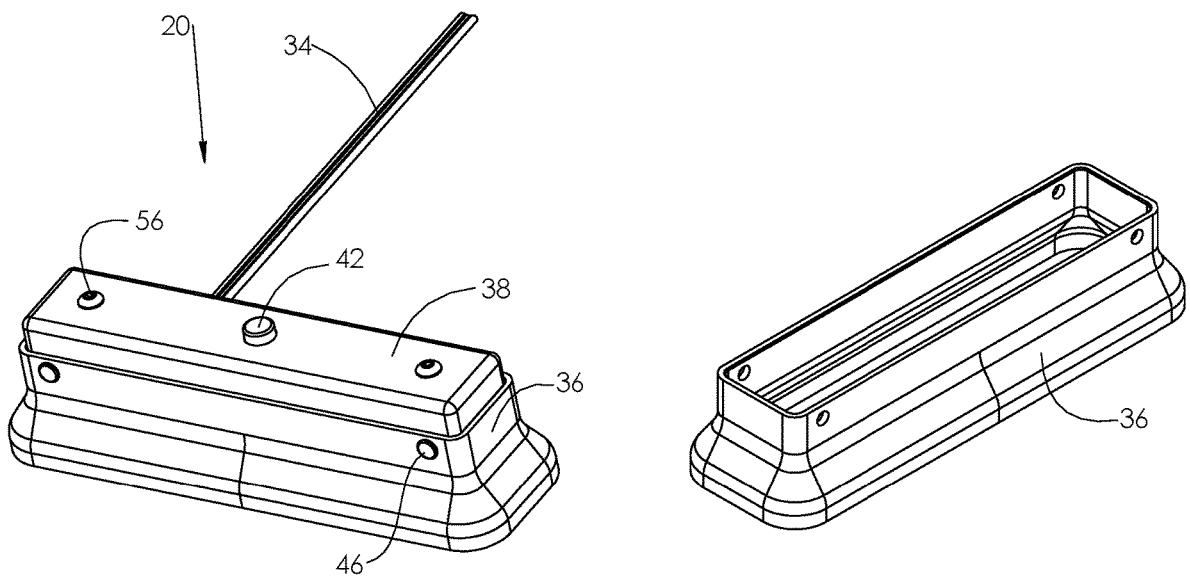
FIG. 14
FIG. 15

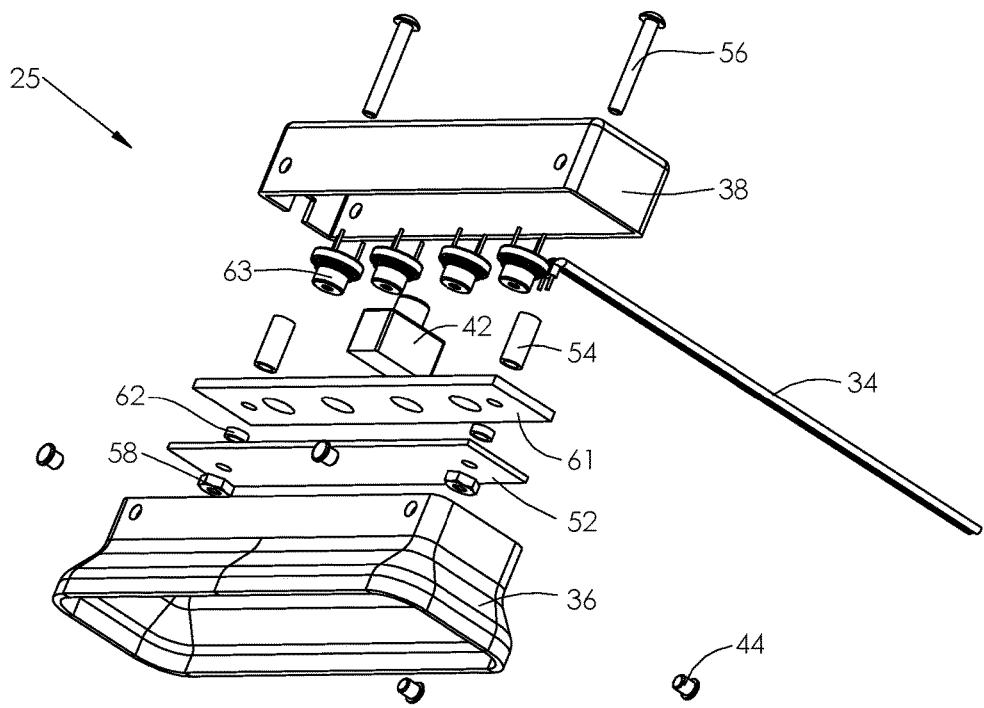
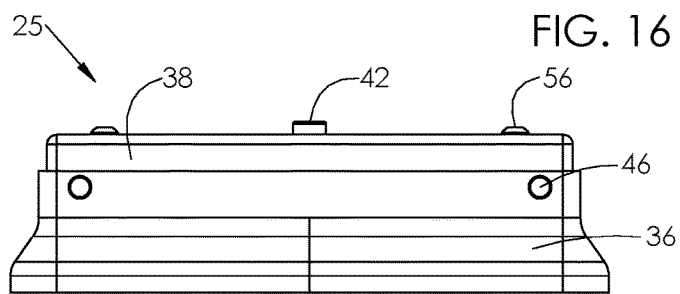
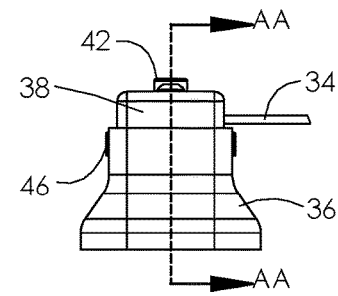
FIG. 16
FIG. 17
FIG. 18
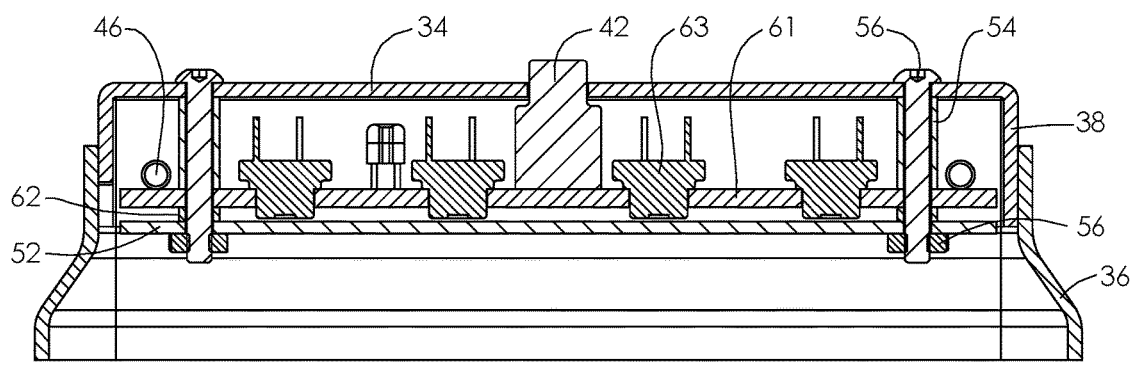
FIG. 19

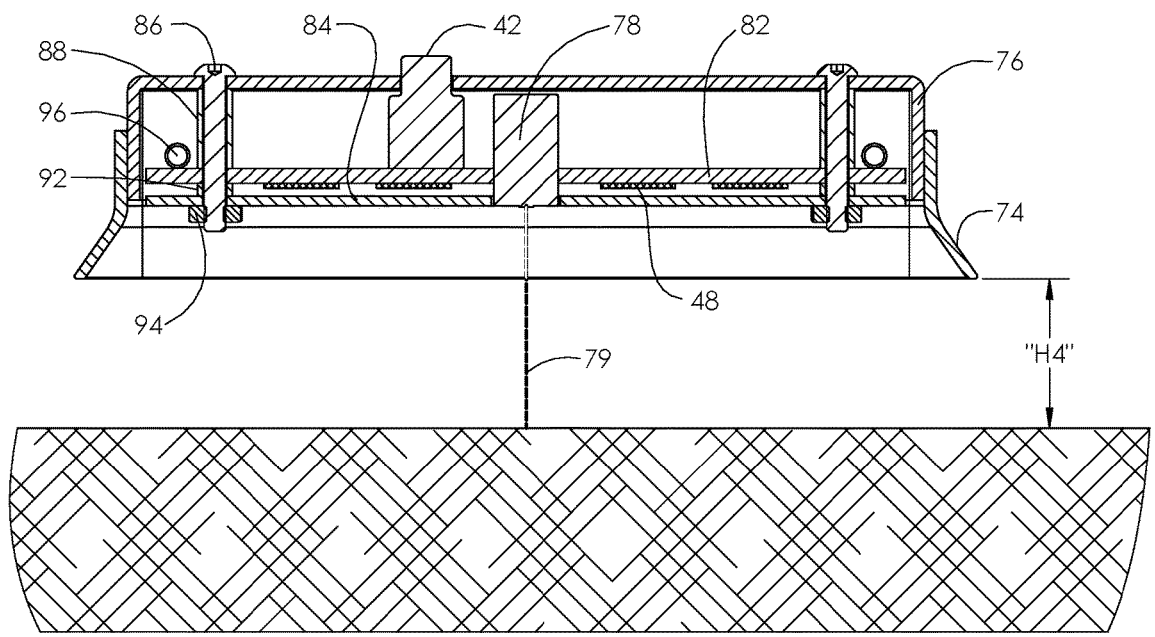
FIG. 29
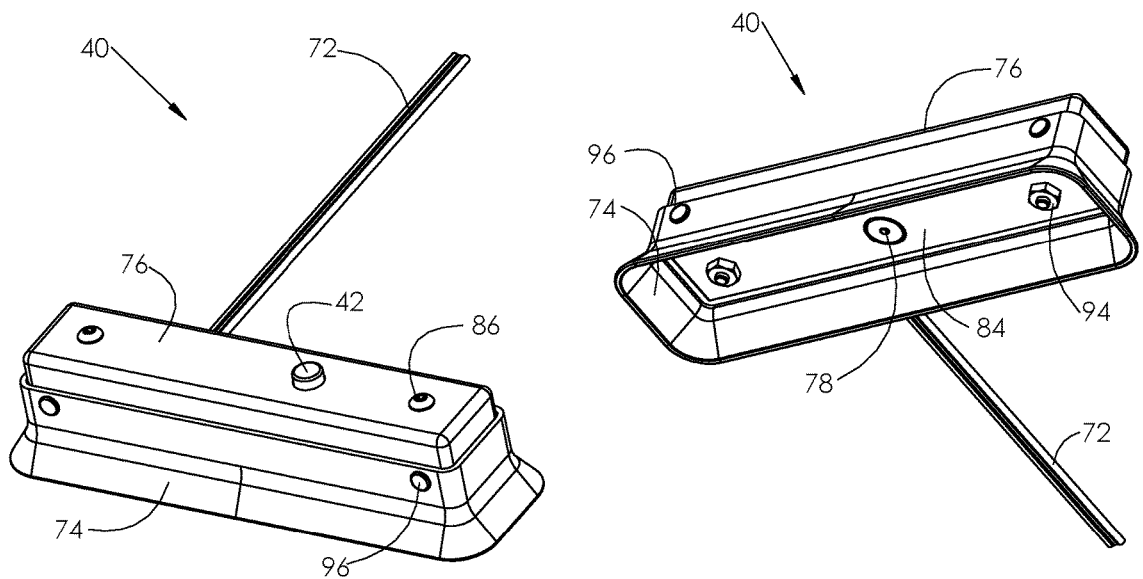
FIG. 30
FIG. 31

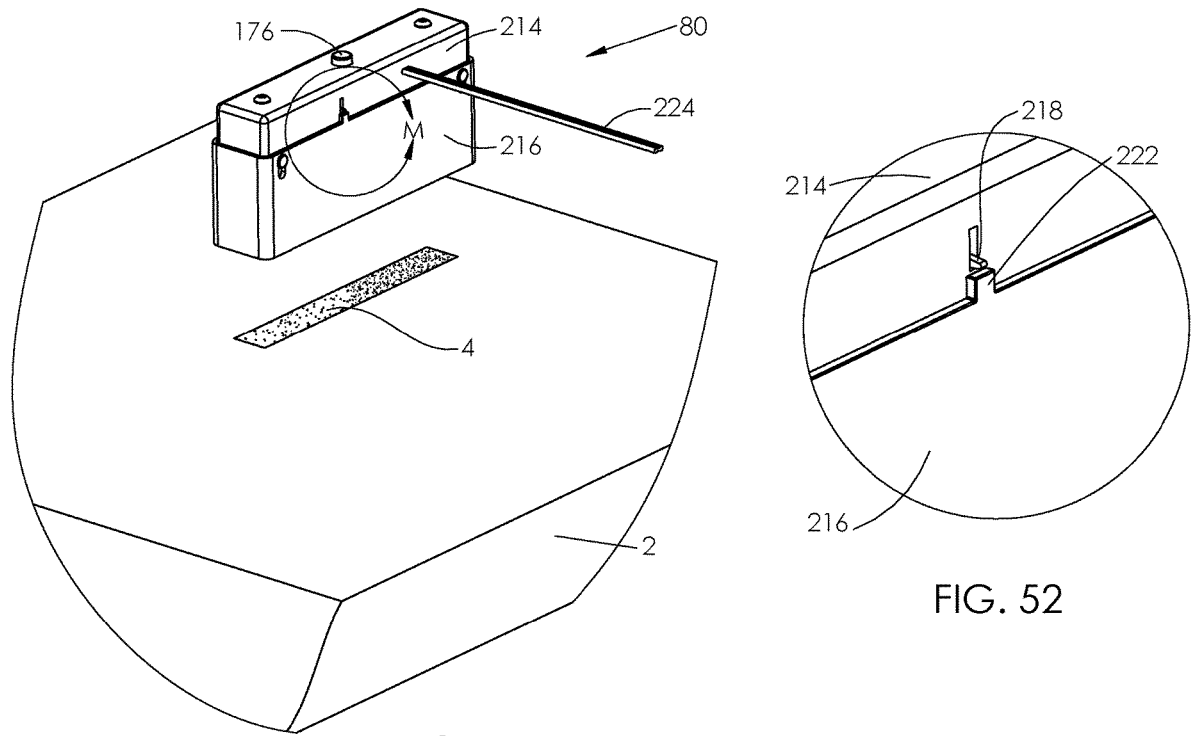
FIG. 51
FIG. 52
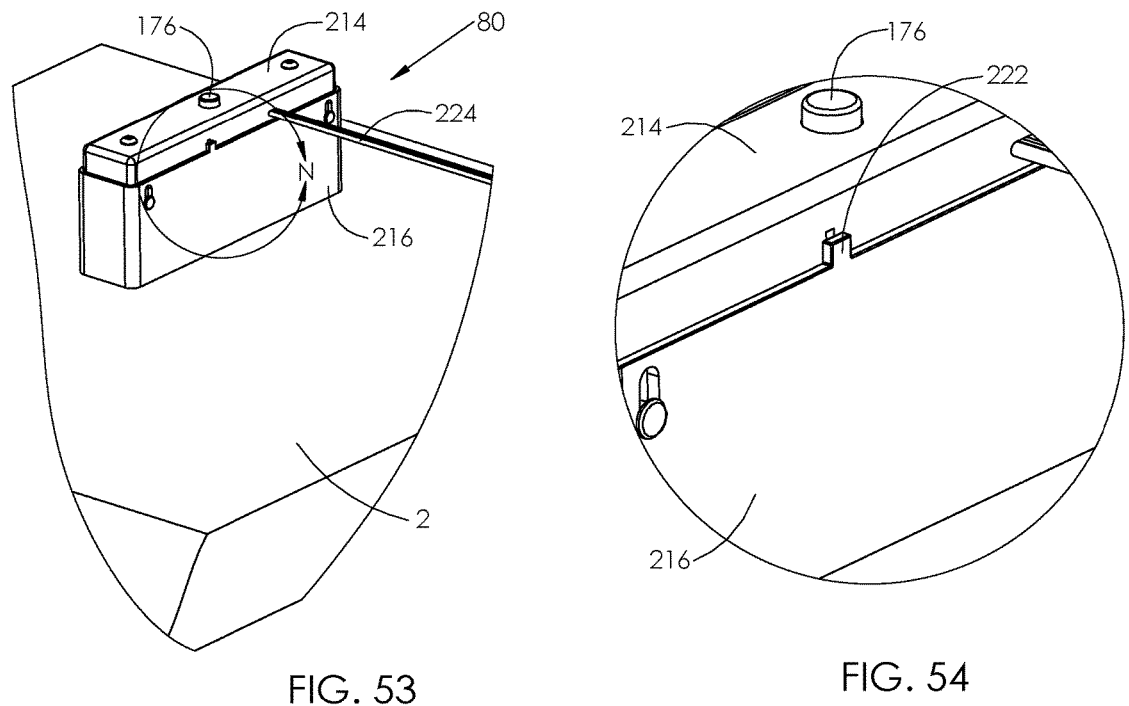
FIG. 53
FIG. 54

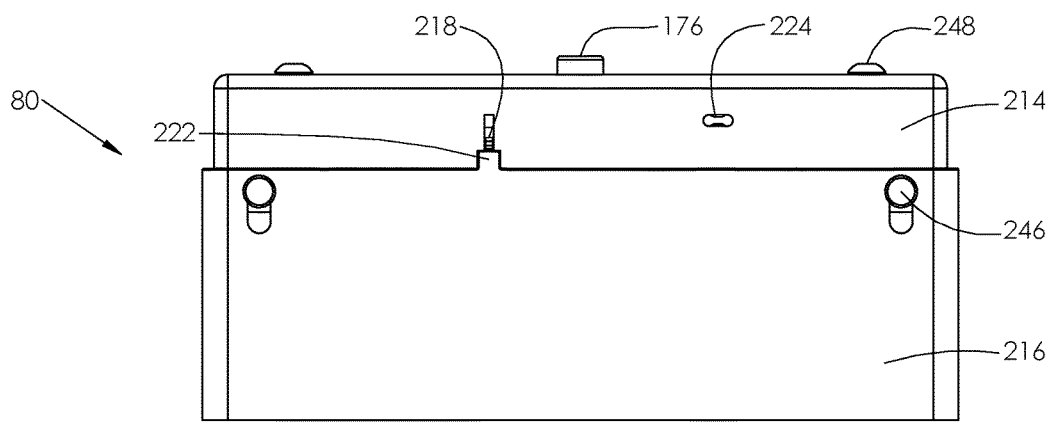
FIG. 56
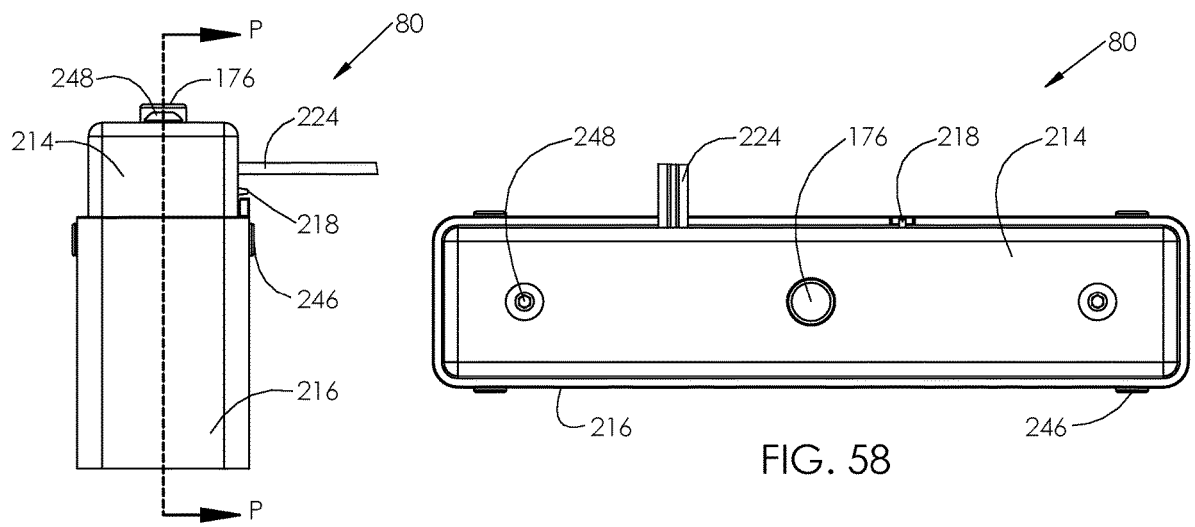
FIG. 57
FIG. 58
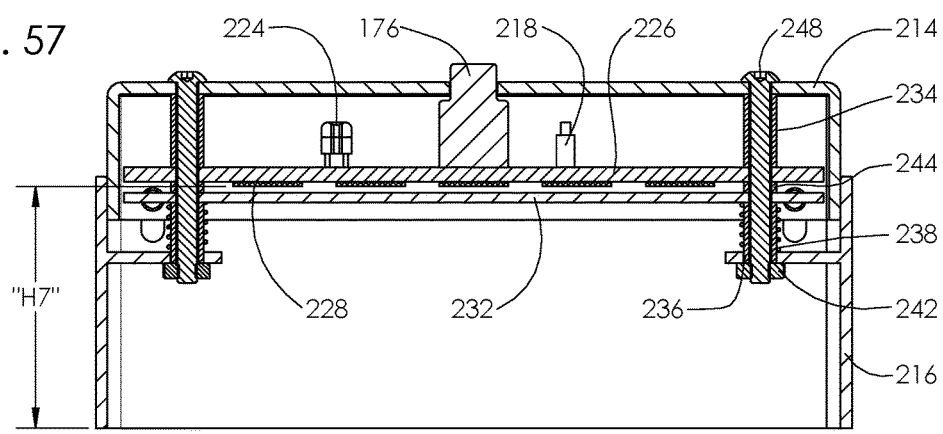
FIG. 59

THERAPEUTIC LIGHTING DEVICES AND METHODS

CROSS REFERENCE TO RELATED APPLICATION

This application claims the benefit of priority to U.S. Provisional Patent Application Ser. No. 63/010,950, filed on Apr. 16, 2020, the disclosure of which is incorporated herein by reference in its entirety.

BACKGROUND OF THE INVENTION

1. Field of the Invention

The subject invention is directed to surgical instrumentation, and more particularly, to therapeutic lighting devices and methods of using the same to reduce surgical site infections.

2. Description of the Related Art

Surgical Site Infections (SSIs) have been reported to have rates as high as 10%. Multiple sources estimate rates to be between 0.5-10%, though it is difficult to measure post-operative data especially with minor infections. Studies have shown SSIs affect 275,000 patients annually in the US and cost approximately $10B annually to hospitals, healthcare providers, and insurance companies.

Handheld electrosurgical devices are recognized in the art of surgery for providing directed cauterization of bleeding vessels as well as cutting technology to incise through tissues. Unfortunately, any break in the skin, whether surgical or otherwise, can result in an infection. Current methods of infection prevention intraoperatively include skin antisepsis, hand washing by the surgical team, prophylactic antibiotic therapy, and laminar air flow.

Clearly, the general usage of sterile techniques and prophylactic antibiotic therapy has drastically decreased the SSI rates from those as high as 40% previously. Yet, with the physical and financial devastation that surgical infections may cause, and with increased antibiotic resistance by organisms such as MRSA (methicillin-resistant *Staphylococcus aureus*) and VRE (vancomycin-resistant *Enterococcus*), other treatment modalities are necessary. Inclusive of these additional modalities is the use of short-wavelength ultraviolet (UV-C) light for germicidal irradiation (UVGI) which damages the DNA in microorganisms. Further, UV-C therapy has been noted to promote wound healing as well.

UV-C light, however, has started to prove more useful in the prophylaxis of SSI, with one study revealing a decrease in infection rate from 10% to 0.24% with ultraviolet light therapy. Commercial UV-sterilizing devices most commonly known for consumer disinfection of mobile phones. Current UV-C light medical treatments include lamps, room disinfection, and bulky commercial handheld UV light emitters. Devices like the Biomation Thera-Wand are used for wound care but are not sterilized and brought into the surgical arena. Regarding handheld devices, these have currently not gained widespread use despite the clear benefit of UV-C light therapy to wound infection rates.

One of the most significant hindrances to utilization thus far has been the requirement for a pause in surgery specifically to place the bulky UV-C device in proximity to the tissues at risk. Bulky, expensive, hard-to-use devices can be replaced with the novel devices proposed in this application. Another hindrance is the need to manufacture a sterile device that can be used within the sterile operating field during interventions like surgery. A further danger is the potentially harmful effects of too much treatment or potentially damaging wavelengths of light.

As these hindrances have failed to provide acceptable results, there is a need for alternative approaches to treating surgical areas on a patient. Novel directing of the light shown in this disclosure (via shrouds, optical lens design, etc.), novel methods that utilize timing mechanisms, novel methods that determine the distance of the light emitter from the treatment area and the advancement of technologies such as lasers enable the prevention of potential harmful radiation from injuring a patient, and can be used in open surgery, laparoscopy and minimally-invasive surgery, percutaneous procedures such as biopsies or injections, wound-care, and other interventional treatments, can accomplish this objective.

SUMMARY OF THE INVENTION

The therapeutic lighting devices of the subject invention are intended to treat or as prophylaxis against infectious organisms. UV-C radiation has been shown to be more lethal against susceptible organisms with increasing exposure time, though increasing distance from the site decreases the effectiveness. This is also true of other therapeutic light sources.

The devices are intended as a sterile disposable or non-disposable adjunct to current anti-infectious modalities. The devices may be utilized not only in an operative setting, but also at the bedside to treat wounds. The devices can be used continually throughout a surgery (arena-style UV lighting, e.g.) or periodically throughout the surgery (i.e. sweeping before first incision, sweeping before wound closure), or at specified tasks required in the surgery (before insertion/placement of an implant, e.g.).

In addition, an added utility of the devices may be concomitant visible lighting to improve illumination alongside UV-C light within the same device. This could be achieved either by intersplicing visible light LEDs with light treatment (UV, e.g.) LEDs, or having separate lighting areas on the same device. A device may have a switch to activate the therapeutic light separately or may continually bathe the surgical site with therapeutic light treatment.

Embodiments of therapeutic light devices with attachments may be attached to electrosurgical instruments such as electrocautery pencils, forceps, other surgical, instruments, surgical drapes, patient tissue, surgical table, other medical equipment, etc. By having the therapeutic light work continually, the surgeon is able to be active without requiring stoppages. By using more targeted and intermittent therapies, the surgeon is able to more precisely target tissue and wound sites and prevent overexposure to non-injured or injured tissue.

More particularly, the subject invention is directed to a new and useful device for treating biological tissue. The device includes a body having opposed proximal and distal end portions, a means operatively associated with the distal end portion of the body for establishing an effective distance and an area of therapeutic treatment relative to biological tissue to be treated, and a light source supported at a distal end of the body and connected to a power source for emitting therapeutic light to treat biological tissue proximate to the shroud. The means operatively associated with the distal end portion of the body for establishing an effective distance and an area of therapeutic treatment relative to biological tissue to be treated can be a shroud extending from the distal end portion of the body. The power source can be housed within an interior cavity of the body or it can be housed external to or remote from the body. The therapeutic light can be selected from the group of light sources that consists of UV light, UV-C light, Far UV-C light, infrared light, near-infrared light, low level laser light, and White light.

The light source includes at least one light sources associated with or separate from a printed circuit board (PCB) that is supported within the distal end of the body, and it is preferably an LED light source. The light source could also comprise at least one laser diode, which may be embedded on the PCB or separate from the PCB. A control circuit is operatively associated with the printed circuit board so that the power source and/or light source can be deactivated after a predetermined treatment period or provide an indication to a user that the treatment period has been completed.

The shroud is dimensioned and configured to establish an effective distance and area of therapeutic treatment relative to the biological tissue to be treated. The shroud can be formed from a material that is impervious to therapeutic light so as to avoid an impact of therapeutic light on areas of biological tissue that are not intended to be treated. Preferably, an optical element can be designed to focus the therapeutic light to the treatment area.

Preferably, a switch is operatively associated with the body for activating the power source and/or the light source. Electro-mechanical means may be operatively associated with the body and the shroud to activate the power source and/or the light source when the shroud comes into contact with the biological tissue to be treated, or it can provide an indication to a user that the device is ready for use. Indicator means can also be associated with the printed circuit board for sonically or visually indicating when the power source has been deactivated or provide an indication to a user that the treatment has been completed.

A lens is supported within the distal end of the body in front of the light source. The optical design of the lens can be used to focus the therapeutic light to the target treatment area to maximize safety and efficacy. The means operatively associated with the distal end portion of the body for establishing an effective distance and an area of therapeutic treatment relative to biological tissue to be treated can be an elongated probe extending from the distal end portion of the body an elongated probe extends distally from the lens to establish a preferred distance to a treatment area. The means operatively associated with the distal end portion of the body for establishing an effective distance and an area of therapeutic treatment relative to biological tissue to be treated can also be a shroud extending from the distal end portion of the body and an elongated probe extending distally from the lens to establish a preferred distance to a treatment area. A lens is supported within the distal end of the body in front of the light source. Means would be operatively associated with the probe to activate the power source and/or the light source when the probe comes into contact with the biological tissue to be treated or it the means could provide an indication to a user that the device is ready for use.

The means operatively associated with the distal end portion of the body for establishing an effective distance and an area of therapeutic treatment relative to biological tissue to be treated can be a laser ruler is housed within the body to establish a preferred distance to a treatment area, in the absence of a shroud extending from the distal end portion of the body. Means may be operatively associated with the laser ruler to activate the power source and/or the light source when the laser ruler has established the preferred distance to a treatment area or the means could provide an indication to a user that the device is ready for use.

The means operatively associated with the distal end portion of the body for establishing an effective distance and an area of therapeutic treatment relative to biological tissue to be treated can be a laser ruler housed within the body and a shroud extending from the distal end portion of the body to establish a preferred distance to a treatment area. Means may be operatively associated with the laser ruler to activate the power source and/or the light source when the laser ruler has established the preferred distance to a treatment area or the means could provide an indication to a user that the device is ready for use.

Clamping means can be operatively associated with the body for selectively attaching the device to a surgical table, a surgical instrument or a surgical drape. In addition, means may be operatively associated with the clamping means and the body of the device to adjust the position of the device relative to the treatment area.

In an embodiment of the invention, the shroud is mounted for movement relative to the body to establish a minimum effective distance and area of therapeutic treatment. And, switching means are operatively associated with the body and the shroud to activate the power source and/or the light source upon movement of the shroud to the minimum effective distance.

The subject invention is also directed to a device for treating biological tissue during laparoscopic surgery, which includes a proximal handle portion, a tubular body extending distally from the proximal handle portion, a shroud extending from the distal end of the tubular body, and a light source supported at a distal end of the tubular body proximal to the shroud and connected to a power source housed within the handle portion or external to the handle portion for emitting therapeutic light to treat biological tissue proximate to the shroud. A switch is operatively associated with the body for manually activating the power source and/or the light source, and the light source includes at least one therapeutic light source, such as an LED light source embedded on or associated with a printed circuit board that is supported within the distal end of the cannula. Preferably, the shroud is dimensioned and configured to establish an effective distance and area of therapeutic light treatment relative to the biological tissue to be treated. However, it is envisioned that the effective treatment distance can be established by way of a laser, a probe or a sensor, that could be embedded in the probe or in the shroud.

The subject invention is also directed to a handheld electrosurgical instrument that includes an elongated body, an electrocautery blade extending from a distal end of the body, and a light source operatively associated with the body and oriented to focus therapeutic light to an area around a tip of the electrocautery blade. The electrosurgical instrument further includes a first switch on the body for manually activating the electrocautery blade and a second switch on the body for manually activating the therapeutic light source. In addition, the instrument includes a first power cord extending from a proximal end of the body for connecting the electrocautery blade to a first power source and a second power cord extending from a proximal end of the body for connecting the therapeutic light source to a second power source.

The subject invention is also directed to a surgical retractor that includes an upper body portion operatively associated with a power source and a lower body portion extending orthogonal to the upper body portion and housing a therapeutic light source associated with a printed circuit board and connected to the power source. Preferably, the power source is housed within the upper body portion of the retractor, a lens is positioned in front of the therapeutic light source and a flange projects forward from the distal end of the lower body portion of the retractor. Switching means may be associated with the upper body portion for manually activating the therapeutic light source and/or the power source. It is envisioned that the LED light source can includes a therapeutic LED and a non-therapeutic LED, and the switching means could include a first switch associated with the therapeutic LED and a second switch associated with the non-therapeutic LED.

The subject invention is also directed to a method of treating biological tissue with therapeutic light, which includes the steps of positioning an emitter at a treatment area, establishing an effective distance for the emitter from the treatment area, activating the emitter to provide therapeutic light at the treatment area, and then removing the emitter from the treatment area. The method can further include the steps of controlling a duration of therapeutic light treatment, allowing the emitter to enable the therapeutic light treatment, signaling to a user that the emitter is ready to provide the therapeutic light treatment, signaling to a user that the therapeutic light treatment has concluded, and allowing the emitter to stop the therapeutic light treatment.

It is well within the scope of this disclosure that the therapeutic lighting devices described herein may be used in conjunction with other materials, drugs, devices for diagnostic imaging, or curing materials such as glues or cements, and they may provide further or additional therapeutic benefits beyond the treatment of surgical site infection such as relieving pain, promoting tissue repair, and reducing inflammation.

These and other features of the devices and instrument of the subject invention will become more readily apparent to those having ordinary skill in the art to which the subject invention appertains from the following brief description of the drawings and the drawings themselves.

BRIEF DESCRIPTION OF THE DRAWINGS

So that those skilled in the art will readily understand how to make and use the devices and instruments of the subject invention without undue experimentation, preferred embodiments thereof will be described in detail herein below with reference to the figures wherein:

FIG. 13 shows an exploded view of apparatus 20;

FIG. 14 shows an isometric view of apparatus 20;

FIG. 15 shows an isometric view of shroud 36;

FIG. 16 is an exploded view of therapeutic light treatment by concept #3;

FIG. 17 and FIG. 18 are front and side views of therapeutic light treatment by concept 3;

FIG. 19 is a cross section A-A taken from FIG. 18;

FIG. 29 is sectional view E-E taken from FIG. 28;

FIG. 30 and FIG. 31 are isometric views of therapeutic light treatment apparatus by concept 5;

FIG. 51 shows an isometric view of therapeutic light treatment apparatus 80 by concept 8, before placement to the treatment area;

FIG. 52 is an enlarged view M taken from FIG. 51;

FIG. 53 shows an isometric view of therapeutic light treatment apparatus 80 by concept 8, placed to the treatment area;

FIG. 54 is an enlarged view N taken from FIG. 53;

FIG. 56, FIG. 57 and FIG. 58 are front, side and top view of therapeutic light treatment apparatus 80;

FIG. 59 is a cross-section along line P-P taken from FIG. 57;

ENABLING DESCRIPTION OF EMBODIMENTS OF THE INVENTION

Figure 1:
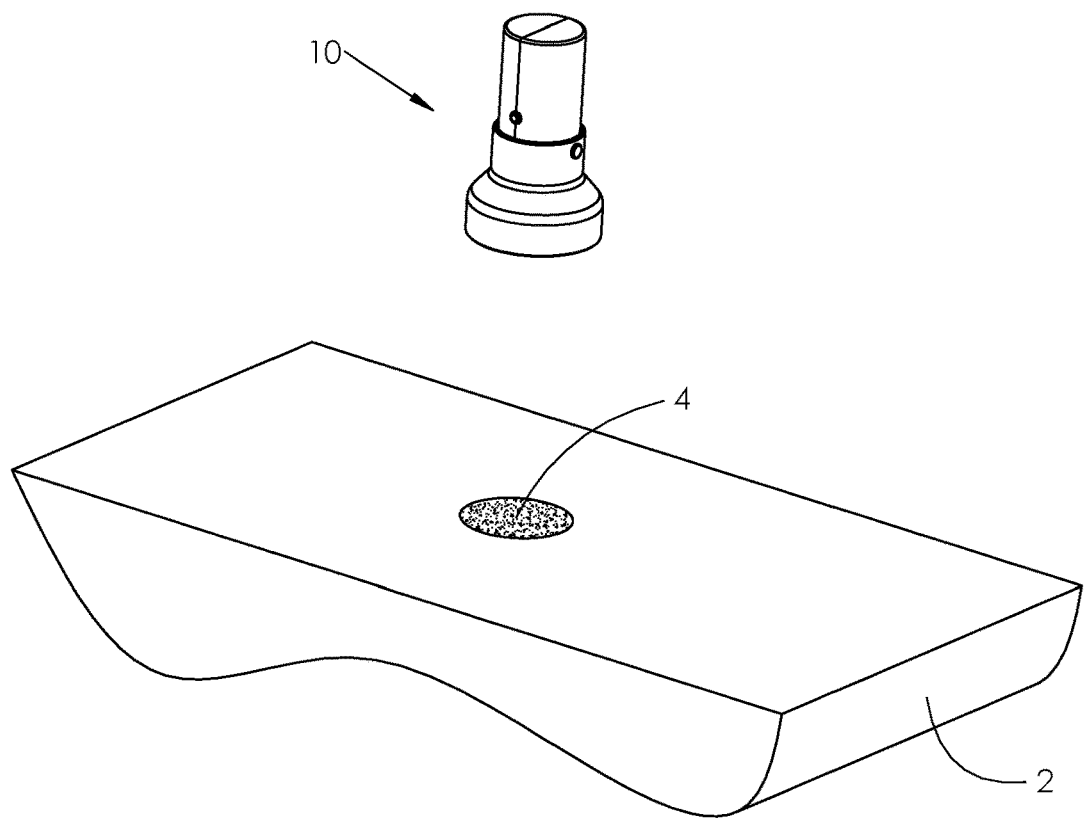
FIG. 1 shows an isometric view of a therapeutic light treatment apparatus by first concept, before placement to the treatment area.
Figure 2:
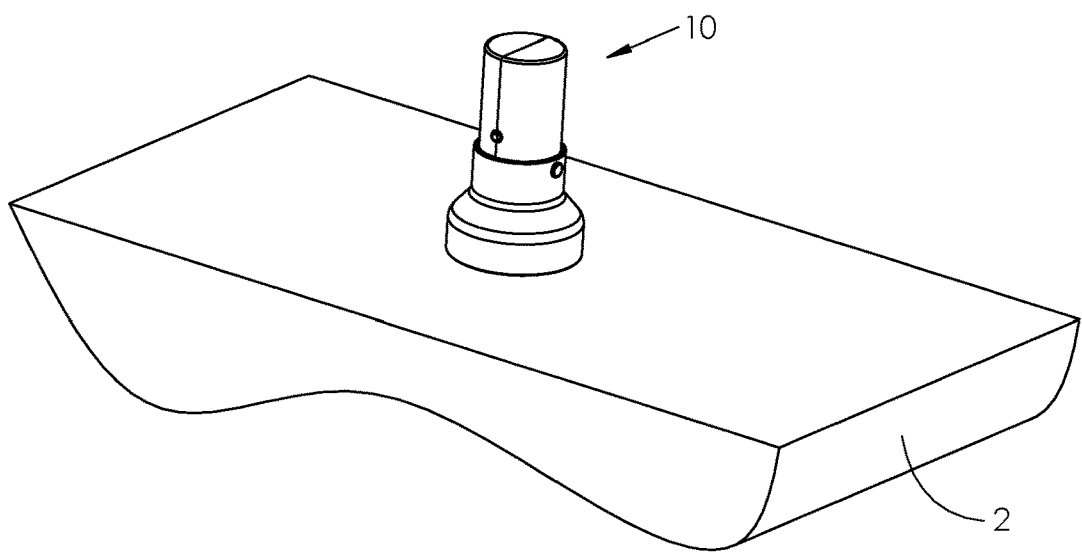
FIG. 2 shows an isometric view of therapeutic light treatment apparatus by first concept, placed to the treatment area.

Referring now to the drawings wherein like reference numerals identify similar structural elements and features of the subject invention, there is illustrated in FIG. 1 a handheld therapeutic light emitting apparatus constructed in accordance with a preferred embodiment of the subject invention and designated generally by reference number 10.

Therapeutic light emitting apparatus 10 is adapted and configured for performing biological tissue therapy on light treatment area 4 of biological tissue 2 of a patient, as shown in FIGS. 1-7. Apparatus 10 includes opposed proximal 12 and distal 12' portions, shroud 6 extending from distal portions of the body 12 and 12', and a light source 18 supported at distal end portions of the body 12 and 12' and connected to a power source 24 for emitting therapeutic light to treat biological tissue 2 proximate to shroud 6. Power source 24 is housed within an interior cavity of the apparatus 10, and it is also contemplated that power source 24 can be housed external to or remote from the apparatus 10. The therapeutic light for performing biological tissue therapy on light treatment area 4 of biological tissue 2 of a patient can be selected from a group of light sources that consists of UV light, UV-C light, Far UV-C light, infrared light, near-infrared light, low level laser light, and White light.

The light source 18 includes at least one light source associated with a printed circuit board (PCB) 22 that is supported within distal portion 12' of the body, and it is preferably an LED light source. Light source 18 could also comprise at least one laser diode. Light sources may be embedded on PCB 22 or separate from PCB 22. A control circuit is operatively associated with PCB 22 so that power source 24 and/or light source 18 can be deactivated after a predetermined treatment period or provide an indication to a user that the treatment period has been completed.

Figure 5:
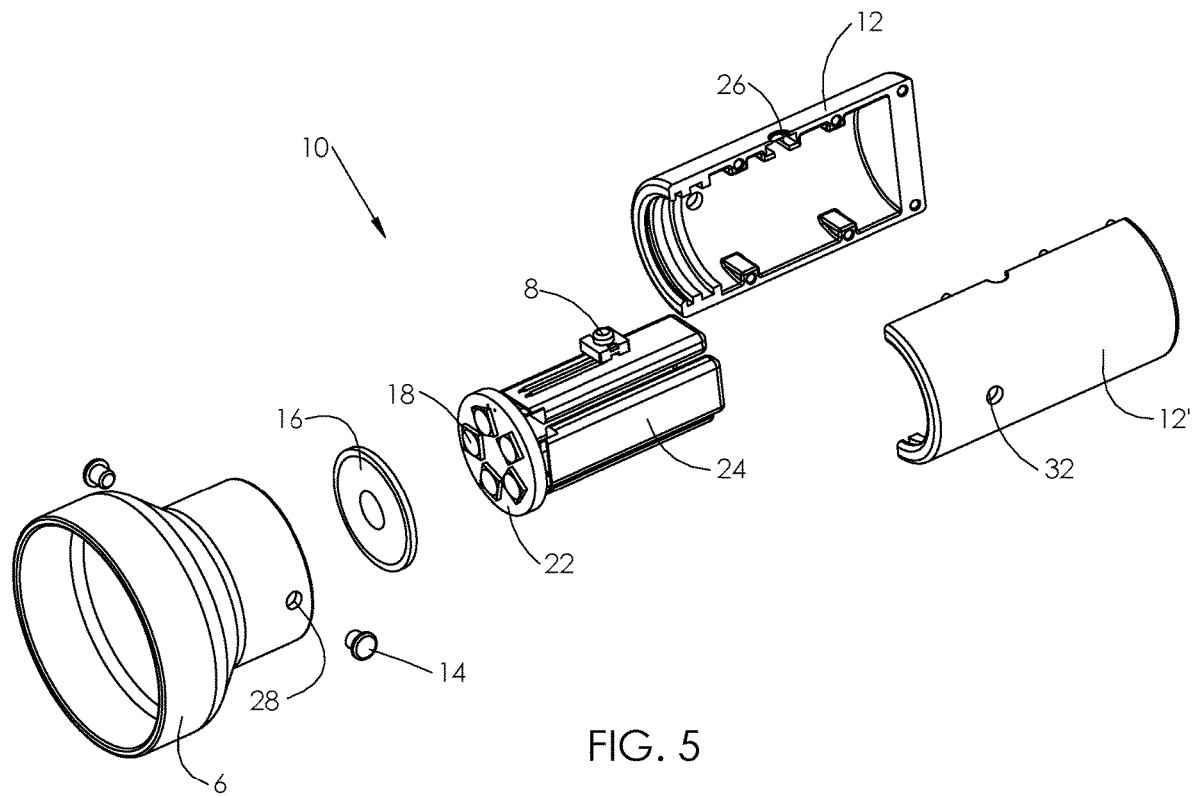
FIG. 5 is an exploded view of therapeutic light treatment apparatus 10.
Figure 6:
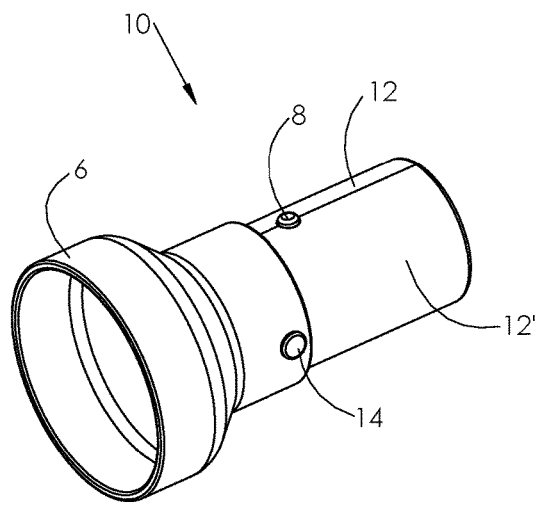
FIG. 6 is an isometric view of apparatus 10.
Figure 7:
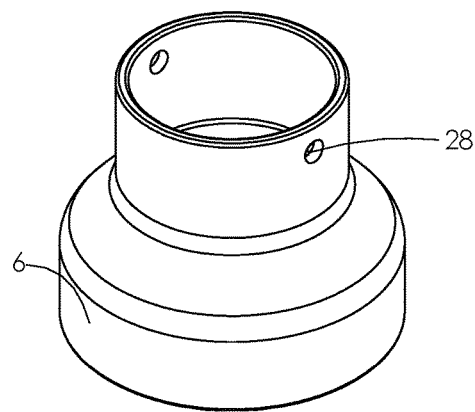
FIG. 7 is an isometric view of shroud 6.
Figure 8:
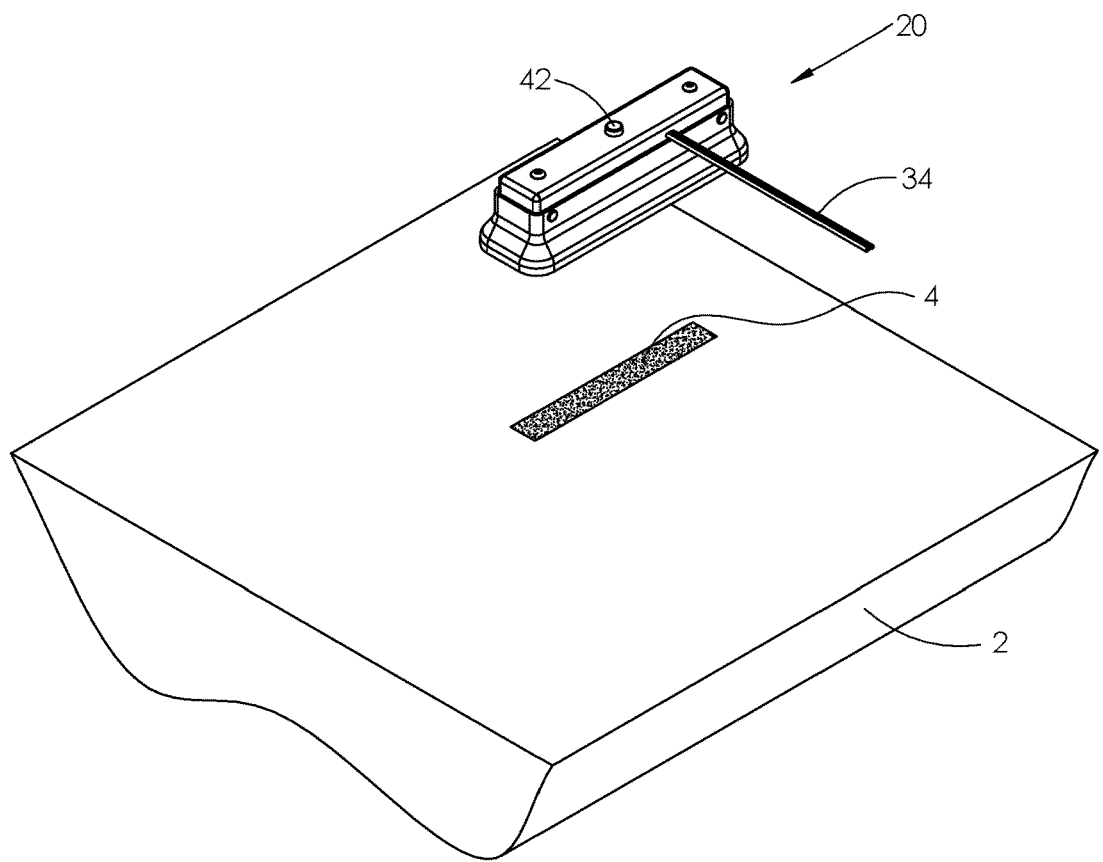
FIG. 8 shows an isometric view of therapeutic light treatment apparatus by second concept, before placement to the treatment area.

Shroud 6 is dimensioned and configured to establish an effective distance and area of therapeutic treatment relative to the biological tissue 2 to be treated. Holding pins 14 are inserted into shroud pin opening 28 and body pin opening 32 to attach shroud 6 to body portions 12 and 12', as shown in FIGS. 5-7. It is contemplated that shroud 6 can be formed from a material that is impervious to therapeutic light (such as irradiated acrylic) so as to avoid an impact of therapeutic light on areas of biological tissue 2 that are not intended to be treated. Preferably, an optical element can be designed to focus the therapeutic light to the treatment area 4.

Figure 3:
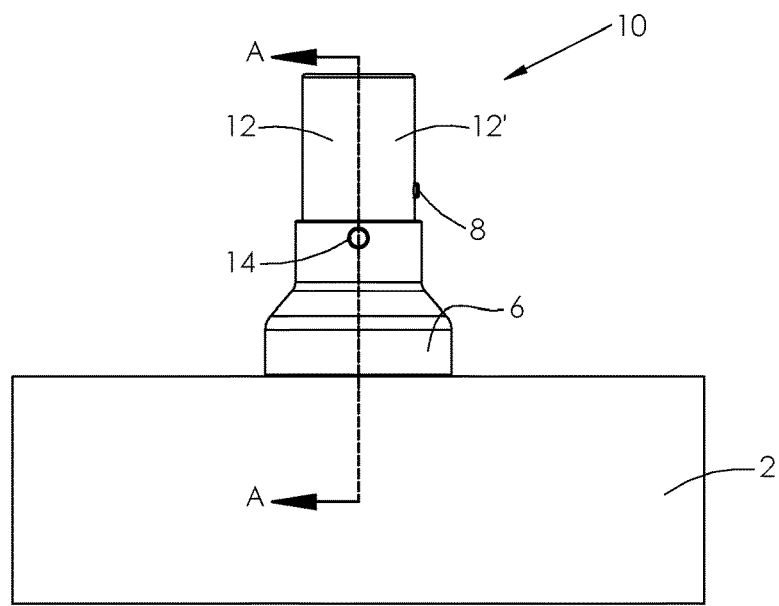
FIG. 3 shows a front view of therapeutic light treatment apparatus by first concept, placed to the treatment area.
Figure 4:
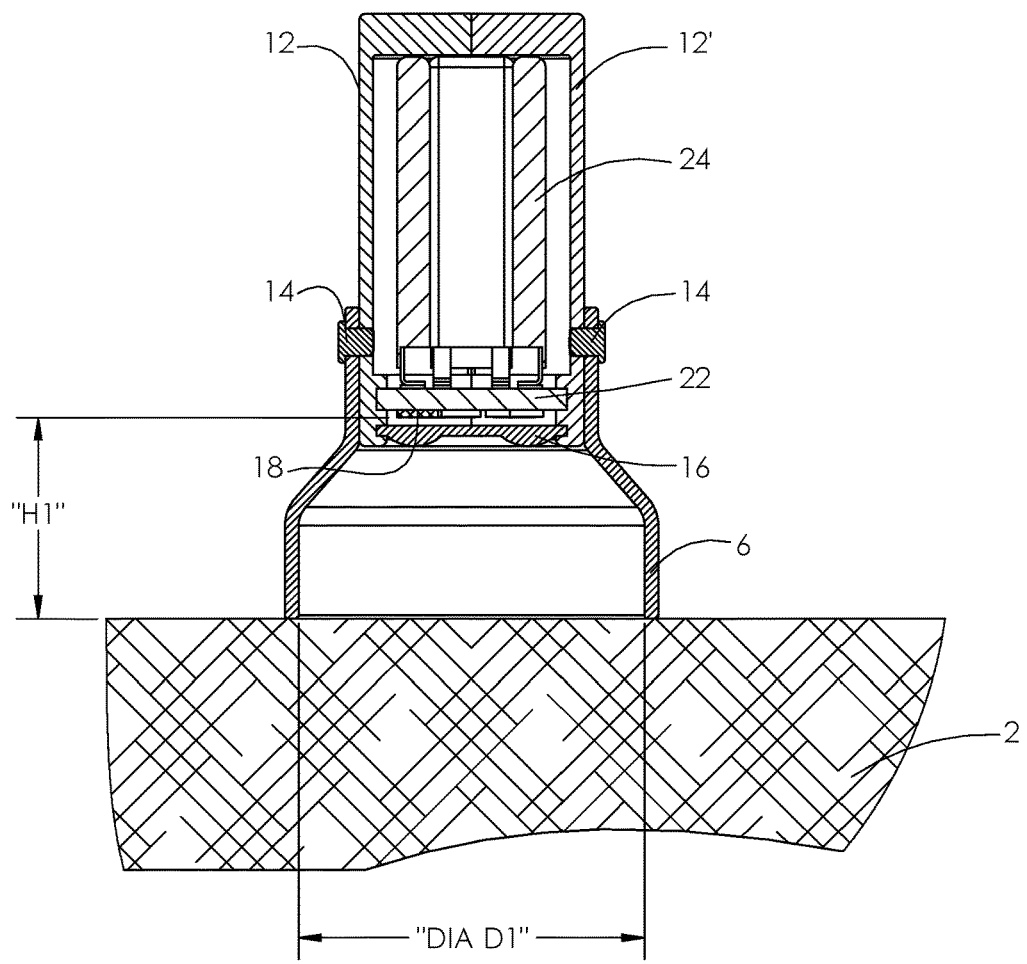
FIG. 4 shows section A-A taken from FIG. 3.

Preferably, a switch 8 is operatively associated with the body for activating the power source 24 and/or the light source 18, as shown in FIG. 3. Switch 8 is housed in switch holding structure 26 between body portions 12 and 12', as shown in FIG. 5. Electronics are operatively associated with the shroud 6 to activate the power source 24 and/or the light source 18 when the shroud 6 comes into contact with the biological tissue 2 to be treated, to allow the power source 24 and/or the light source 18 to be activated, or it can provide an indication to a user that the apparatus 10 is ready for use. An indicator can also be associated with the PCB 22 for sonically or visually indicating when the power source 24 has been deactivated or provide an indication to a user that the treatment has been completed. A lens 16 is supported within distal end 12' of the body in front of the light source 18, as shown in FIG. 4. The optical design of the lens 16 is used to focus the therapeutic light to the target treatment area 4 so as to maximize safety and efficacy. Referring again to FIG. 4, the shroud 6 may be mounted for movement relative to the apparatus 10 to establish a minimum effective distance and area of therapeutic treatment. And, switch 8 may be operatively associated with body portions 12 and 12' and shroud 6 to activate the power source 24 and/or the light source 18, upon movement of shroud 6 to the minimum effective distance.

Figure 9:
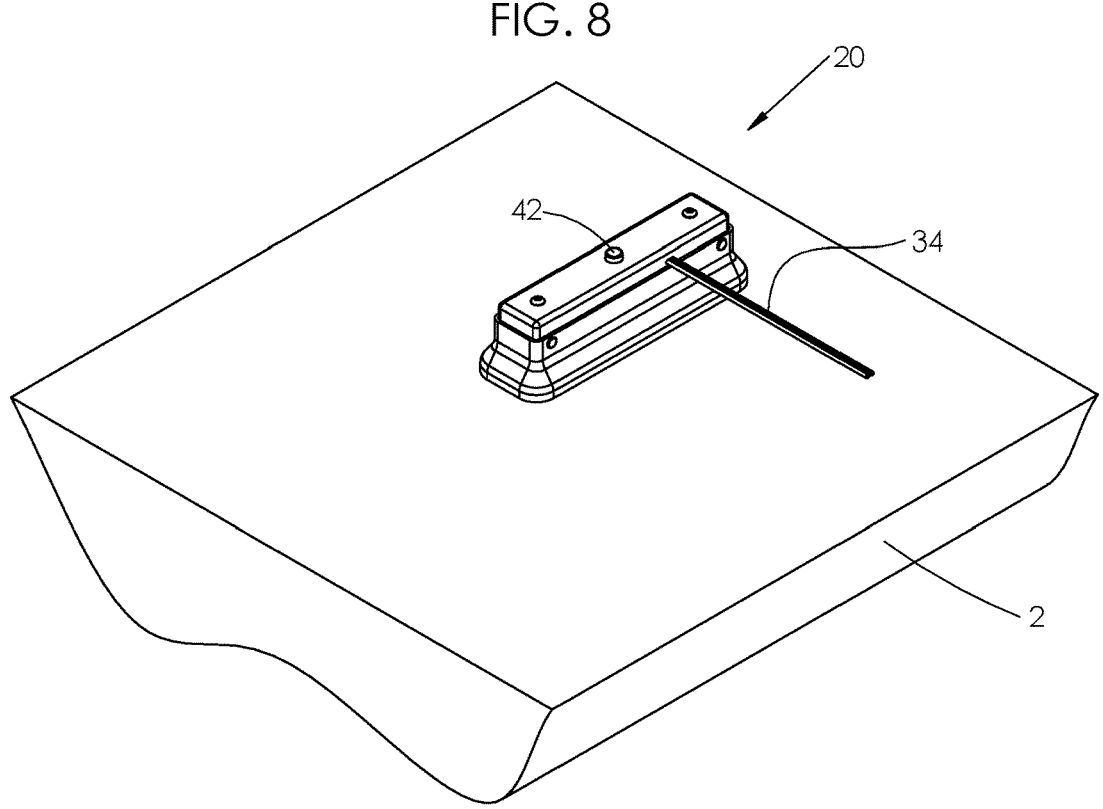
FIG. 9 shows an isometric view of therapeutic light treatment apparatus by second concept, placed to the treatment area.
Figure 10:
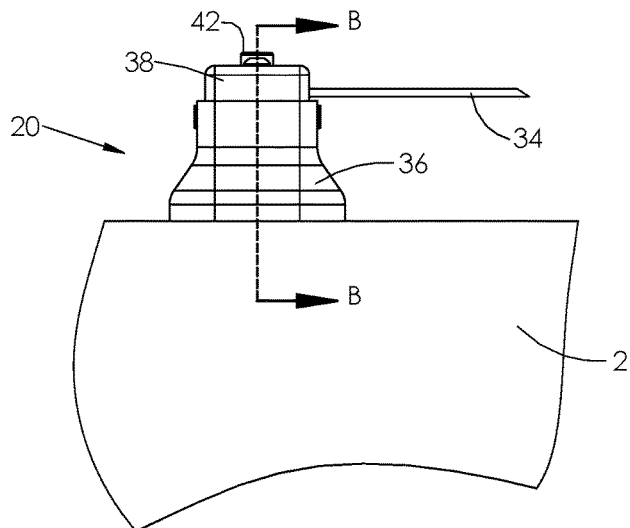
FIG. 10 shows a front view of therapeutic light treatment apparatus by second concept, placed to the treatment area.

Referring now to FIGS. 8-15, there is illustrated another handheld therapeutic light emitting apparatus constructed in accordance with a preferred embodiment of the subject invention and designated generally by reference numeral 20. Therapeutic light emitting apparatus 20 is adapted and configured for performing biological tissue therapy on light treatment area 4 of biological tissue 2 of a patient, as shown in FIG. 9. As shown in FIG. 10, apparatus 20 includes body portion 38, shroud 36 extending from body portion 38, and electrical wire 34 connected to an external electrical source.

Figure 11:
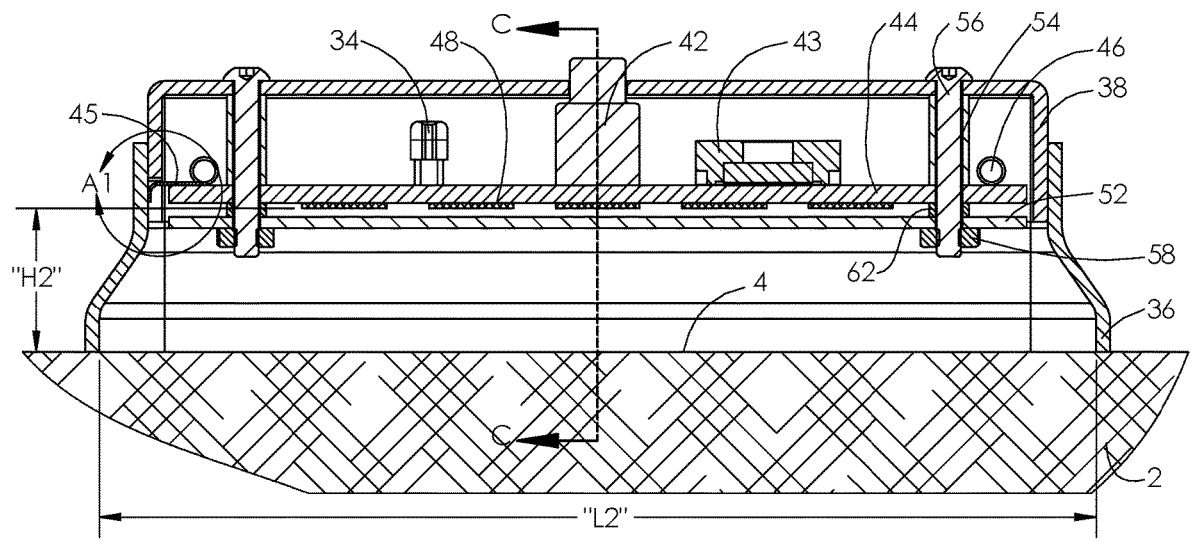
FIG. 11 shows section B-B taken from FIG. 10.
Figure 12:
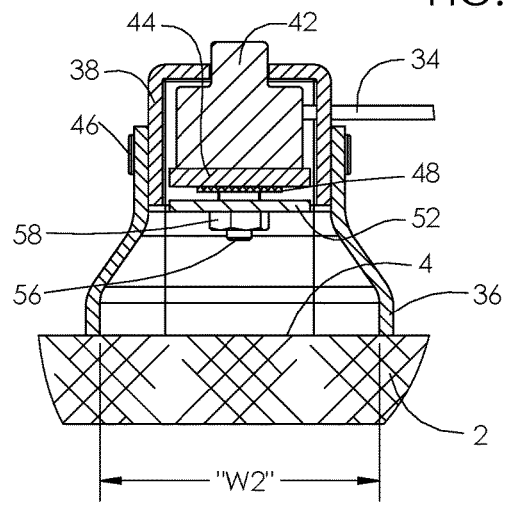
FIG. 12 shows section C-C taken from FIG. 11.
Figure 12A:
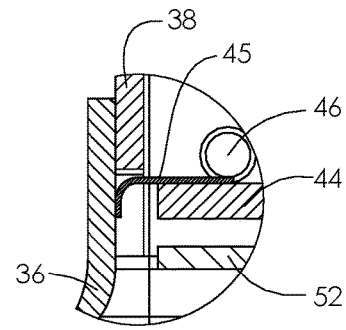
FIG. 12a shows enlarged view A1 taken from FIG. 11.
Figure 20:
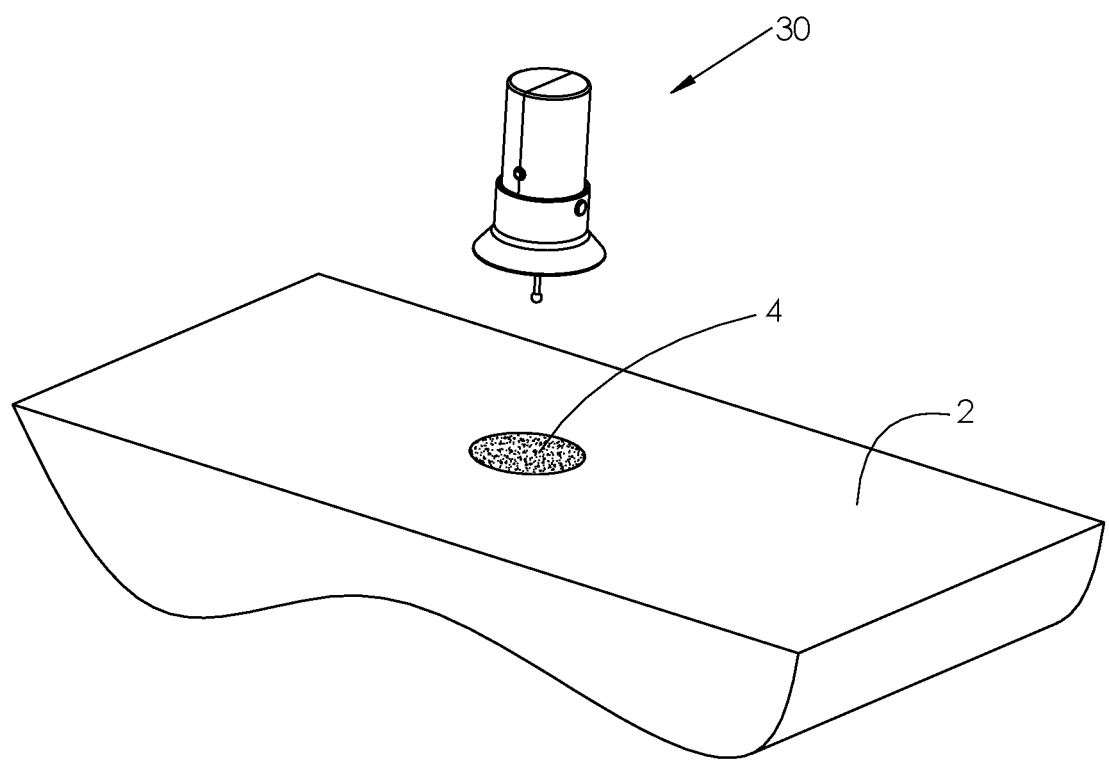
FIG. 20 shows an isometric view of therapeutic light treatment apparatus by concept 4, before placement to the treatment area.
Figure 21:
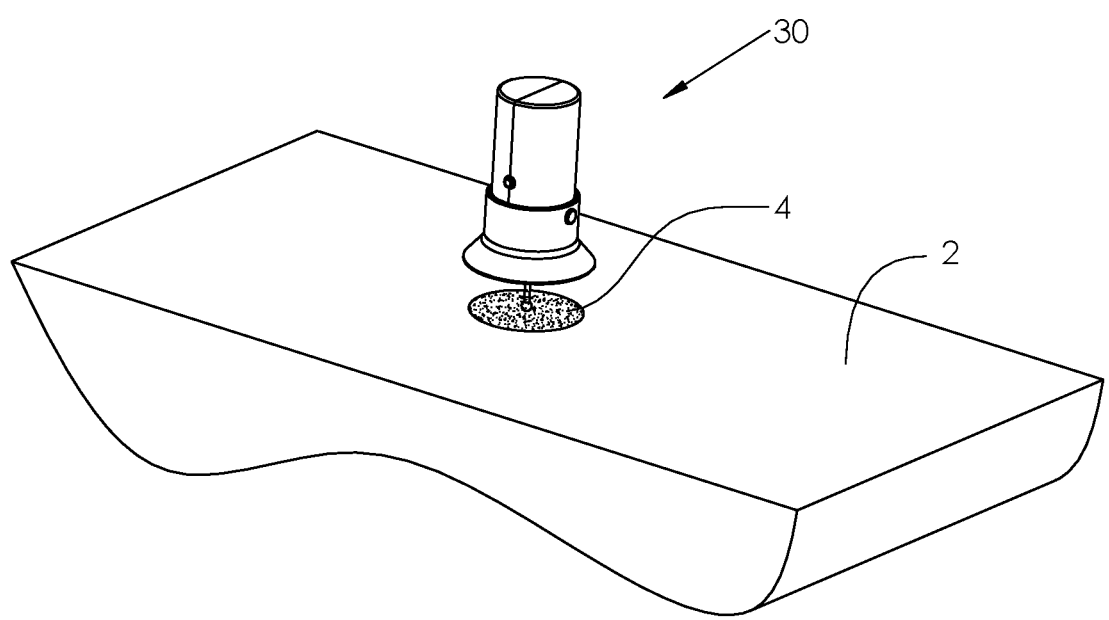
FIG. 21 shows an isometric view of therapeutic light treatment apparatus by concept 4, placed to the treatment area.

Referring now to FIG. 11, a light source 48 is supported across body portion 38 and associated with electrical wire 34 for emitting therapeutic light to treat biological tissue 2 proximate to shroud 36. Light source 48 is housed within an interior cavity of the apparatus 20, and includes at least one light source associated with a printed circuit board (PCB) 44 that is supported within body portion 38, and it is preferably an LED light source. Light source 48 could also comprise at least one laser diode, which may be embedded on PCB 44 or separate from PCB 44. The therapeutic light for performing biological tissue therapy on light treatment area 4 of biological tissue 2 of a patient can be selected from a group of light sources that consists of UV light, UV-C light, Far UV-C light, infrared light, near-infrared light, low level laser light, and White light. As detailed in FIG. 12A, connector 45 operatively associates shroud 36 with PCB 44 so that the apparatus can detect the presence of biological tissue to activate or enable activation of the electrical wire 34 and/or light source 48 to supply therapeutic light to treat biological tissue 2.

Shroud 36 is dimensioned and configured to establish an effective distance and area of therapeutic treatment relative to the biological tissue 2 to be treated. Pins 46 are inserted to attach shroud 36 to body 38, as shown in FIGS. 13-15, and shroud 36 and body portion 38 are further fastened together by screws 56 and nuts 58. Referring to FIG. 13, at distal and proximal ends of body portion 38, spacer 54 is placed on PCB 44, and spacer 62 is placed on a lens 52. It is contemplated that shroud 36 can be formed from a material that is impervious to therapeutic light (such as amber colored plastic) so as to avoid an impact of therapeutic light on areas of biological tissue 2 that are not intended to be treated. Preferably, an optical element can be designed to focus the therapeutic light to the treatment area 4.

Preferably, a push button switch 42 is operatively associated with the body for activating the electrical wire 34 and/or light source 48, as shown in FIGS. 10-11, and is housed in body portion 38. Electronics are operatively associated with body portion 38 and shroud 36 to activate the electrical wire 34 and/or light source 48 when the shroud 36 comes into contact with the biological tissue 2 to be treated, or it can provide an indication to a user that the apparatus 20 is ready for use. An indicator can also be associated with the PCB 44 for sonically or visually indicating when the light source 48 has been deactivated or provide an indication to a user that the treatment has been completed. As detailed in FIGS. 11-12A, PCB 44 is operatively associated with shroud 36 via electrical connector 45, so that when shroud 36 makes contact with treatment area 4, an electrical signal is transmitted via PCB 44 to micro speaker 43, resulting in the production of a sound to indicate UV light can be initiated.

Lens 52 is supported within body portion 38 in front of the light source 48, as shown in FIG. 11. The optical design of the lens 52 is used to focus the therapeutic light so as to the target treatment area 4 to maximize safety and efficacy. In FIG. 11, the shroud 36 is mounted for movement relative to the body 38 to establish a minimum effective distance and area of therapeutic treatment. And, push button switch 42 is operatively associated with body portion 38 and shroud 36 to activate the electrical wire 34 and/or light source 48 upon movement of shroud 36 to the minimum effective distance.

Referring now to FIGS. 16-19, there is illustrated another handheld therapeutic light emitting apparatus constructed in accordance with a preferred embodiment of the subject invention and designated generally by reference numeral 25. As explained in more detail below, apparatus 25 is similar in many respect to the apparatus 20 described above, in that it includes body portion 38, shroud 36 extending from body 38, and electrical wire 34 connected to an external electrical source, as shown in FIGS. 16-19. And, as in the previous embodiment of the subject invention, therapeutic light emitting apparatus 25 is adapted and configured for performing biological tissue therapy on light treatment area 4 of biological tissue 2 of a patient, as shown in FIG. 18.

The apparatus 25 differs from the previously described embodiment of the subject invention in that light source 48, which utilizes one or more UV LED light sources, is replaced by one or more ultraviolet laser diodes 63, as shown in FIGS. 16-19. It is contemplated that a laser can more precisely control light emission wavelength (vs. LEDs and other light emitting devices), which can prove safer and more effective by focusing all light in the therapeutic band of wavelengths.

Figure 22:
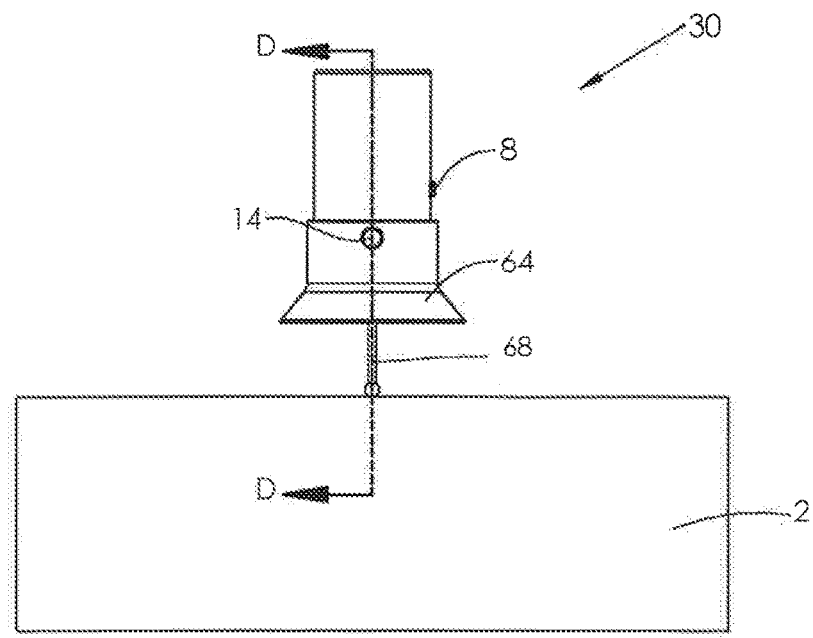
FIG. 22 is a front view of therapeutic light treatment apparatus by concept 4.
Figure 23:
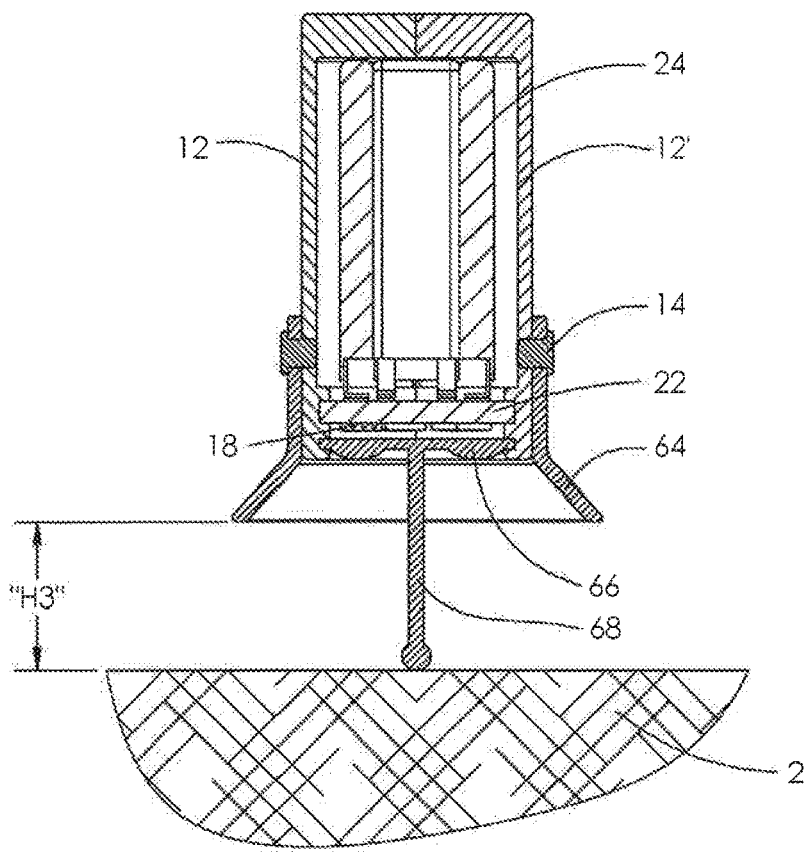
FIG. 23 is a section D-D taken from FIG. 22.

Referring now to FIGS. 20-26, there is illustrated another handheld therapeutic light emitting apparatus constructed in accordance with a preferred embodiment of the subject invention and designated generally by reference numeral 30. As explained in more detail below, apparatus 30 is similar in many respect to the apparatus 10 described above, in that it includes opposed body portions 12 and 12' and a light source 18 supported at distal end of the body and connected to a power source 24 for emitting therapeutic light to treat biological tissue 2, as shown in FIGS. 22-23. And, as in the previous embodiment of the subject invention, therapeutic light emitting apparatus 30 is adapted and configured for performing biological tissue therapy on light treatment area 4 of biological tissue 2 of a patient, as shown in FIG. 22.

Figure 24:
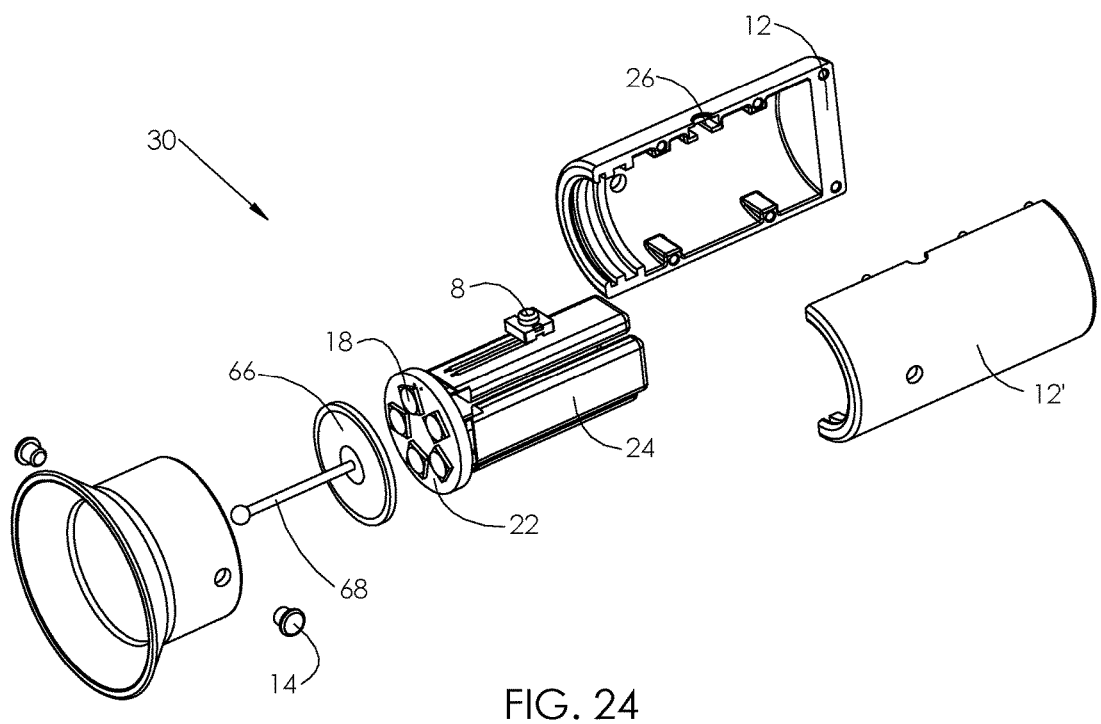
FIG. 24 is an exploded view of therapeutic light treatment by concept 4.
Figure 25:
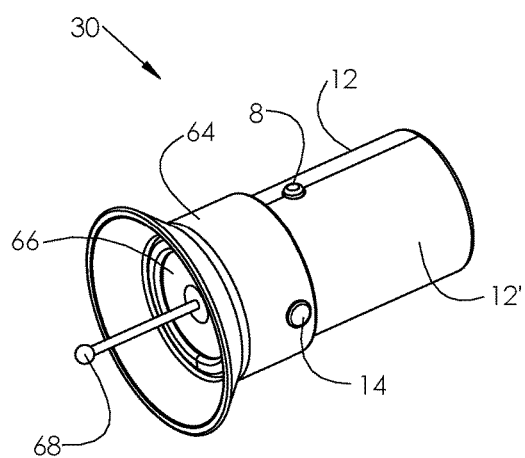
FIG. 25 is an isometric view of therapeutic light treatment by concept 4.
Figure 26:
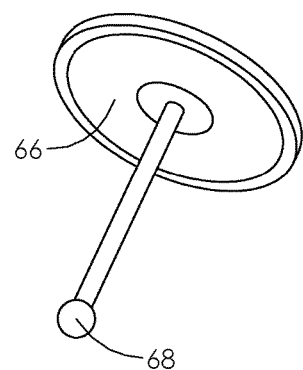
FIG. 26 is an isometric view of lens 66 with probe 68.
Figure 27:
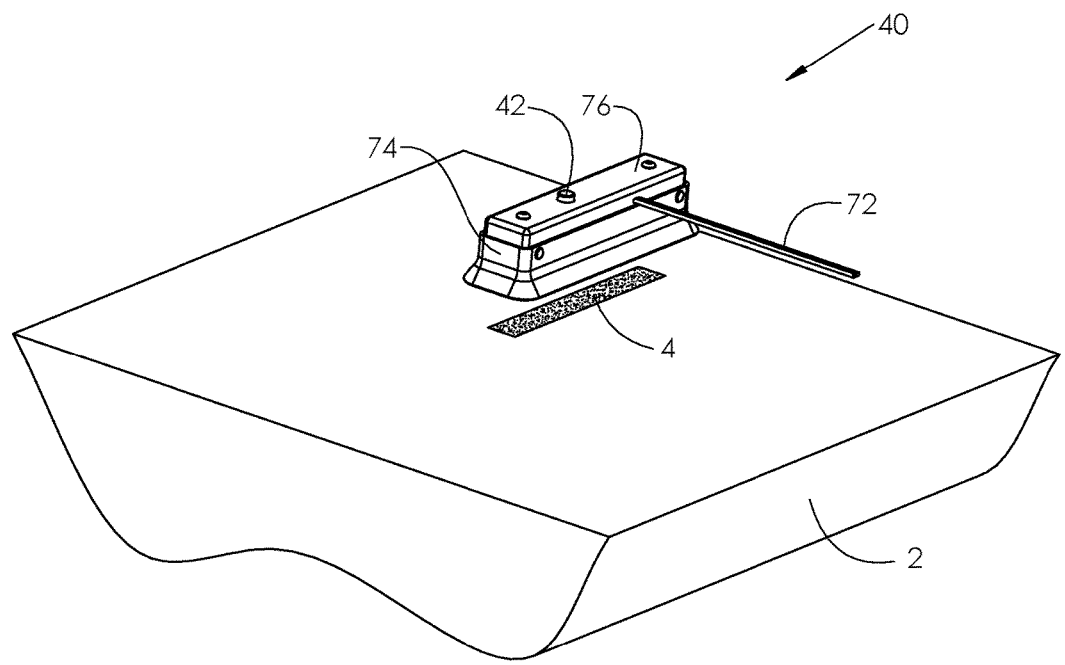
FIG. 27 shows an isometric view of therapeutic light treatment apparatus by concept 5, before placement to the treatment area.

Referring to FIG. 24, the apparatus 30 differs from the previously described embodiment of the subject invention in that an elongated probe 68 can extend distally from the lens 66 to establish a preferred distance to treatment area 4. In some embodiments, shroud 64 can extend from distal end 12' portion of the body, also shown in FIGS. 20-26. It is contemplated that probe 68 can be capacitive, meaning, probe 68 can electronically detect contact with treatment area 4 and subsequently establish an effective treatment distance. It is also contemplated that an indicator could provide a signal to a user that the apparatus 30 is ready for use. Referring to FIG. 23, when probe 68 comes into contact with biological tissue 2, switch 8 can be activated (either by user or automatically) for a pre-determined or programmed therapy time for UV treatment, after which the UV LED will be turned off. An indicator can also be associated with the PCB 22 for sonically or visually indicating when the power source 24 has been deactivated or provide an indication to a user that the treatment has been completed.

Referring now to FIGS. 27-33, there is illustrated another handheld therapeutic light emitting apparatus constructed in accordance with a preferred embodiment of the subject invention and designated generally by reference numeral 40. As explained in more detail below, apparatus 40 is similar in many respect to the apparatus 20 described above. Apparatus 40 can include body portion 76, shroud 74 extending from body 76, and electrical wire 72 connected to an external electrical source, also shown in FIG. 27. And, as in the previous embodiment of the subject invention, therapeutic light emitting apparatus 40 is adapted and configured for performing biological tissue therapy on light treatment area 4 of biological tissue 2 of a patient, as shown in FIG. 29.

Referring to FIG. 29, the apparatus 40 differs from the previously described embodiment of the subject invention in that laser ruler 78 is supported within body 76 to establish a minimum or preferred distance to treatment area 4. It is contemplated that an indicator could provide an indication to a user that the apparatus 40 is ready for use. Referring again to FIG. 29, when the laser beam 79 of laser rule 78 comes into contact with biological tissue 2, push button switch 42 can be enabled and/or activated (either by user or automatically) for a pre-determined or programmed therapy time for UV treatment, after which the UV LED will be turned off. An indicator can also be associated with the PCB 82 for sonically or visually indicating when connection with electrical wire 72 has been deactivated or provide an indication to a user that the treatment has been completed.

Referring again to FIG. 29, a light source 48 is supported across body 76 and associated with electrical wire 72 for emitting therapeutic light to treat biological tissue 2 proximate to shroud 74. Light source 48 is housed within an interior cavity of the apparatus 40, and includes at least one light sources associated with a printed circuit board (PCB) 82 that is supported within body 76, and it is preferably an LED light source. Light source 48 could also comprise at least one laser diode, which may be embedded on PCB 82 or separate from PCB 82. The therapeutic light for performing biological tissue therapy on light treatment area 4 of biological tissue 2 of a patient can be selected from a group of light sources that consists of UV light, UV-C light, Far UV-C light, infrared light, near-infrared light, low level laser light, and White light.

Figure 32:
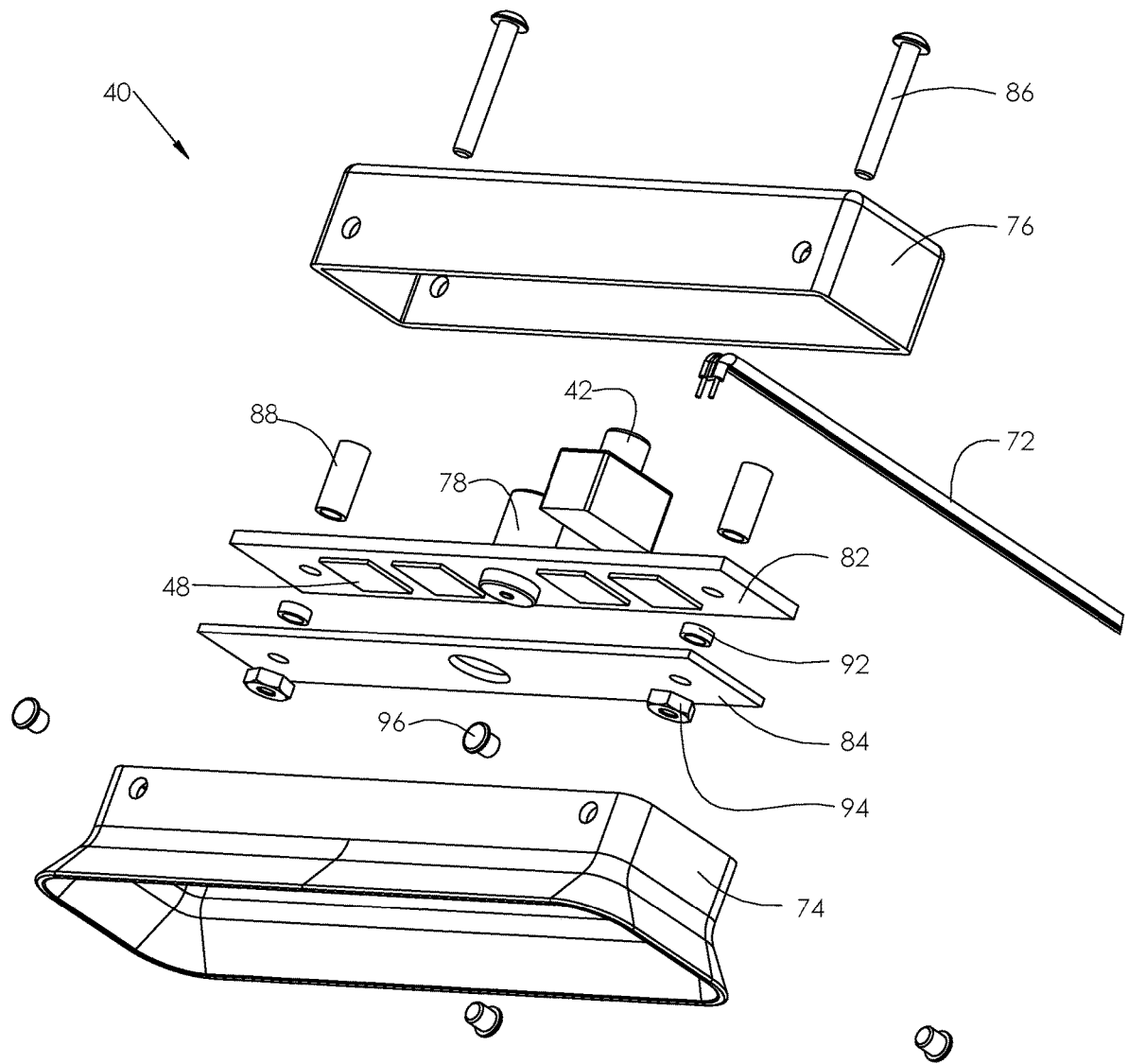
FIG. 32 is an exploded view of therapeutic light treatment apparatus by concept 5.
Figure 33:
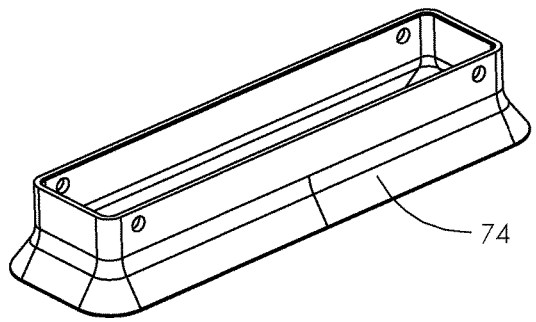
FIG. 33 is an isometric view of shroud 74.
Figure 34:
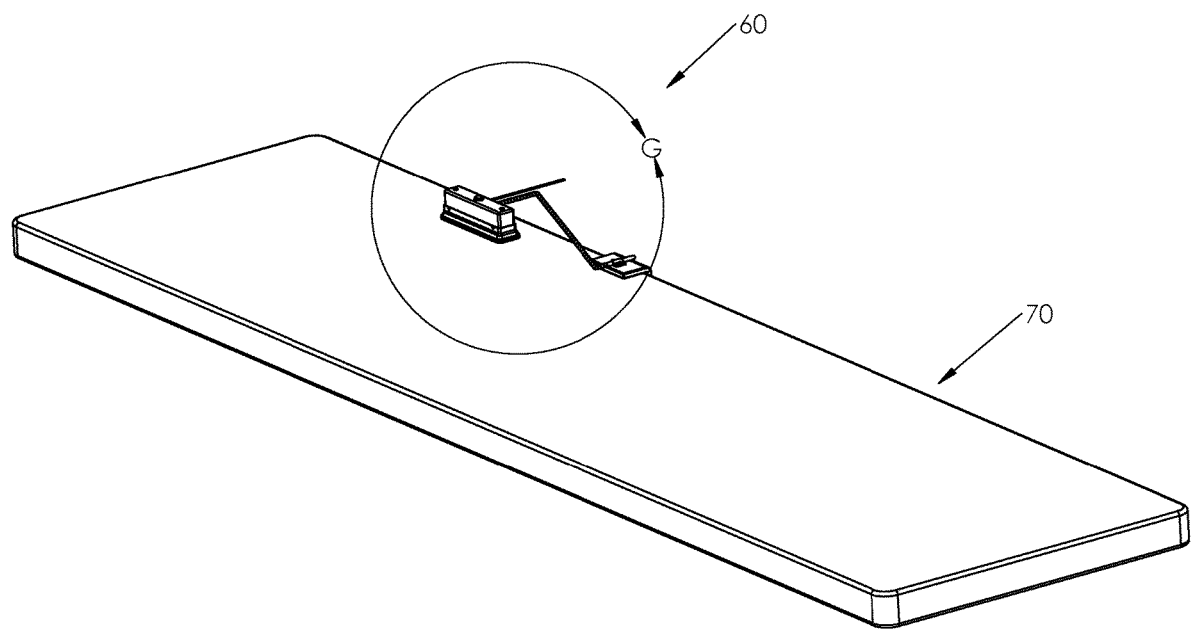
FIG. 34 and FIG. 35 are isometric views of therapeutic light treatment apparatus 60 attached to the surgical table 70 by concept 6.
Figure 35:
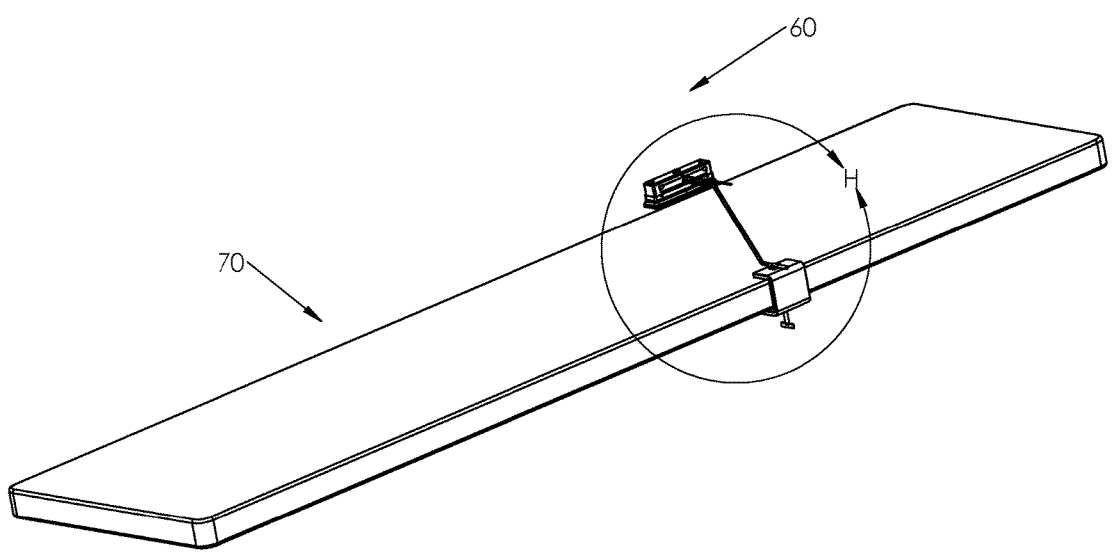
Figure 36:
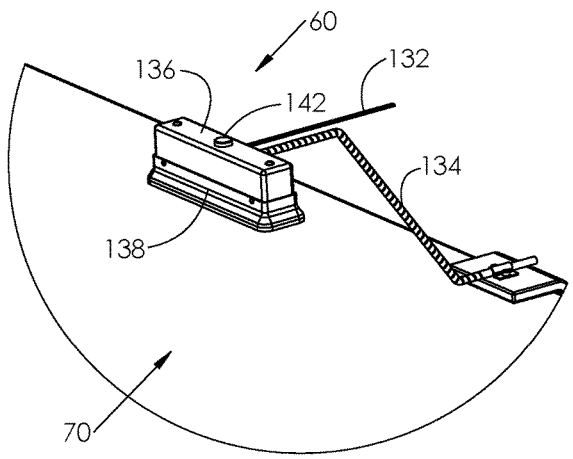
FIG. 36 is an enlarged view G taken from FIG. 34.

Pins 96 are inserted to attach shroud 74 to body 76, as shown in FIGS. 32-33, and shroud 74 and body 76 are further fastened together by screws 86 and nuts 94. Referring to FIG. 32, at distal and proximal ends of body 76, spacer 88 is placed on PCB 82, and spacer 92 is placed on lens 84. It is contemplated that shroud 74 can be formed from a material that is impervious to therapeutic light (such as amber colored plastic) so as to avoid an impact of therapeutic light on areas of biological tissue 2 that are not intended to be treated. Preferably, an optical element can be designed to focus the therapeutic light to the treatment area 4.

Figure 28:
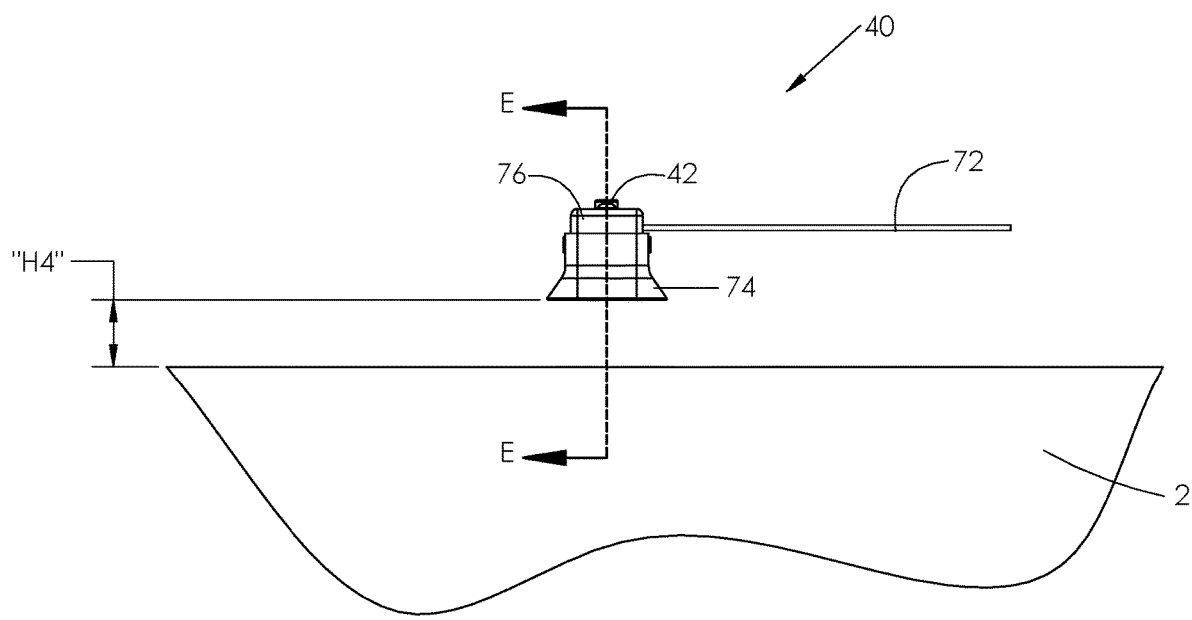
FIG. 28 shows a front view of therapeutic light treatment apparatus by concept 5, located to the treatment area.

Preferably, a push button switch 42 is operatively associated with the body for activating the electrical wire 72 and/or light source 48, as shown in FIGS. 28-29, and is housed in body 76. Electronics are operatively associated with body 76 and shroud 74 to activate or enable activation of the electrical wire 72 and/or light source 48 when the laser ruler 78 comes into contact with the biological tissue 2 to be treated, or it can provide an indication to a user that the apparatus 40 is ready for use. An indicator can also be associated with the PCB 82 for sonically or visually indicating when the electrical wire 72 has been deactivated or provide an indication to a user that the treatment has been completed.

Lens 84 is supported within body 76 in front of the light source 48, as shown in FIG. 32. The optical design of the lens 84 is used to focus the therapeutic light to the target treatment area 4 to maximize safety and efficacy.

Figure 39:
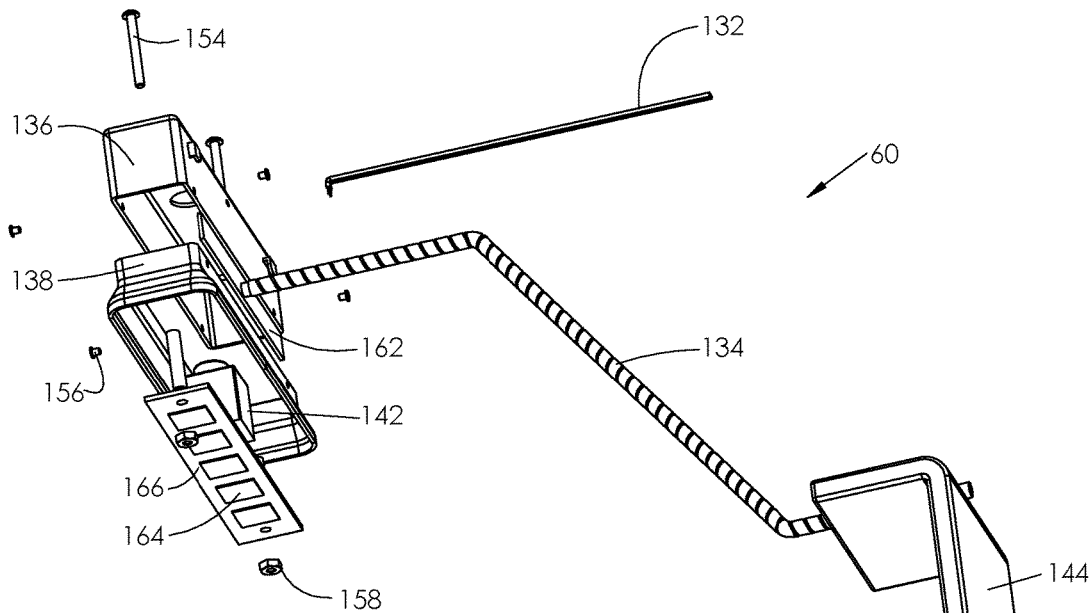
FIG. 39 is an exploded view of therapeutic light treatment apparatus 60.
Figure 40:
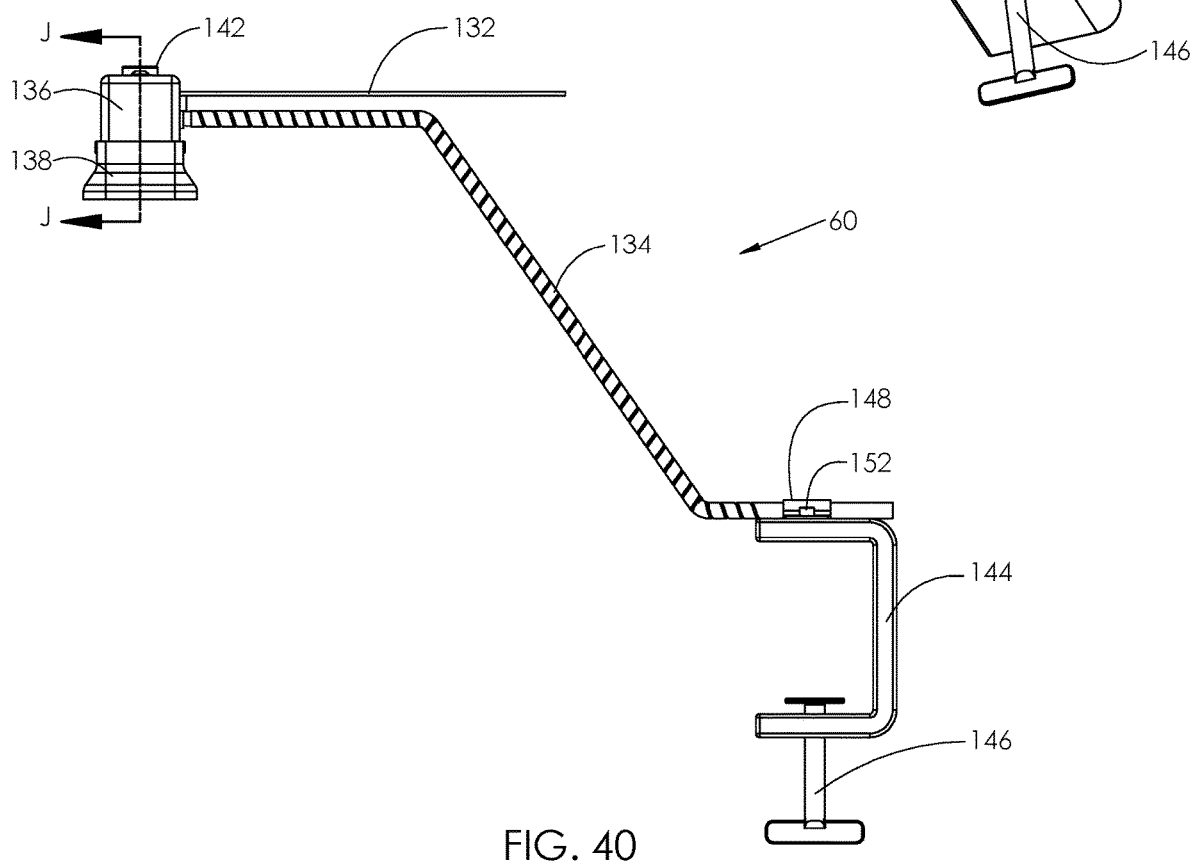
FIG. 40 is a side view of therapeutic light treatment apparatus 60.

Referring now to FIGS. 34-43, there is illustrated a handheld therapeutic light emitting treatment attachment constructed in accordance with a preferred embodiment of the subject invention and designated generally by reference numeral 60. As explained in more detail below, the apparatus joined with attachment 60 is similar in many respect to the apparatus 20 described above. The apparatus of attachment 60 includes body portion 136, shroud 138 extending from body 136, and electrical wire 132 connected to an external electrical source, also shown in FIG. 39. And, as in the previous embodiment of the subject invention, therapeutic light emitting apparatus of attachment 60 is adapted and configured for performing biological tissue therapy on light treatment area 4 of biological tissue 2 of a patient, as shown in FIG. 40.

Figure 37:
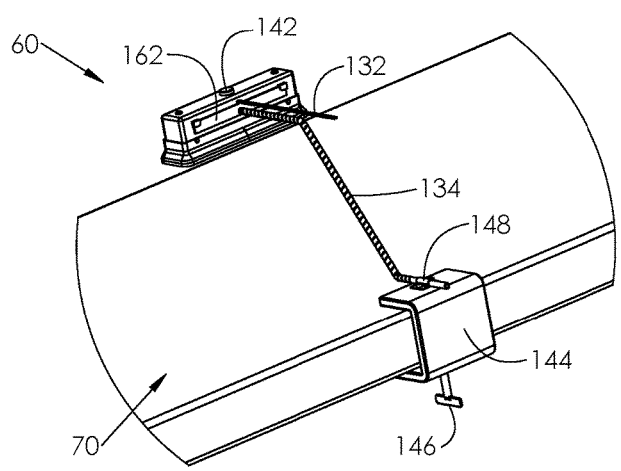
FIG. 37 is an enlarged view G taken from FIG. 35.
Figure 38:
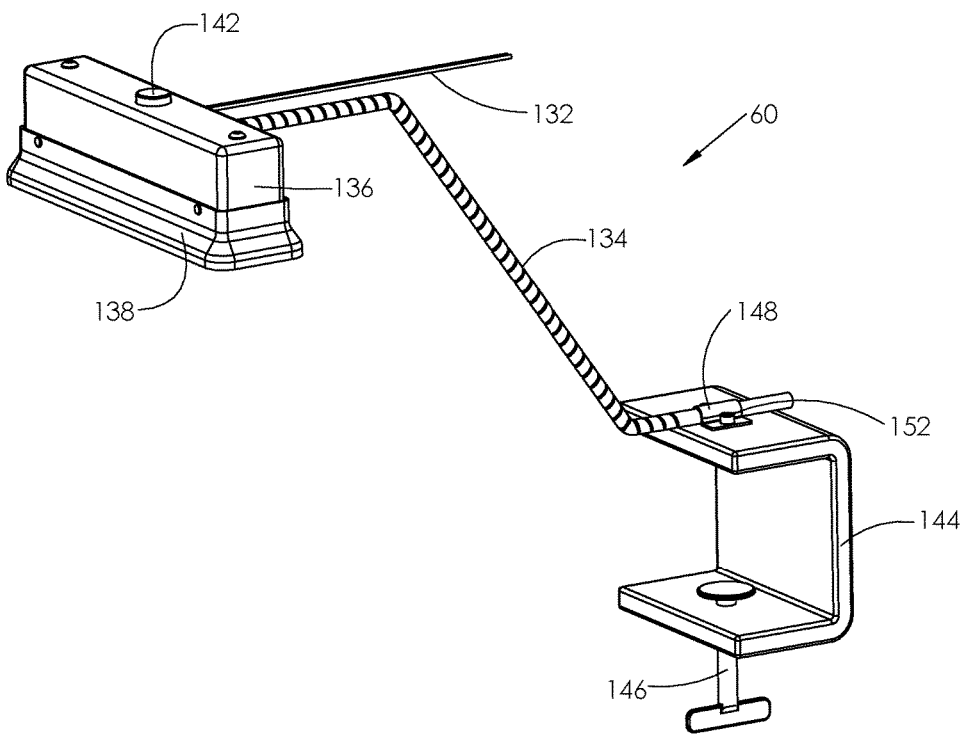
FIG. 38 is an isometric view of therapeutic light treatment apparatus 60.
Figure 43:
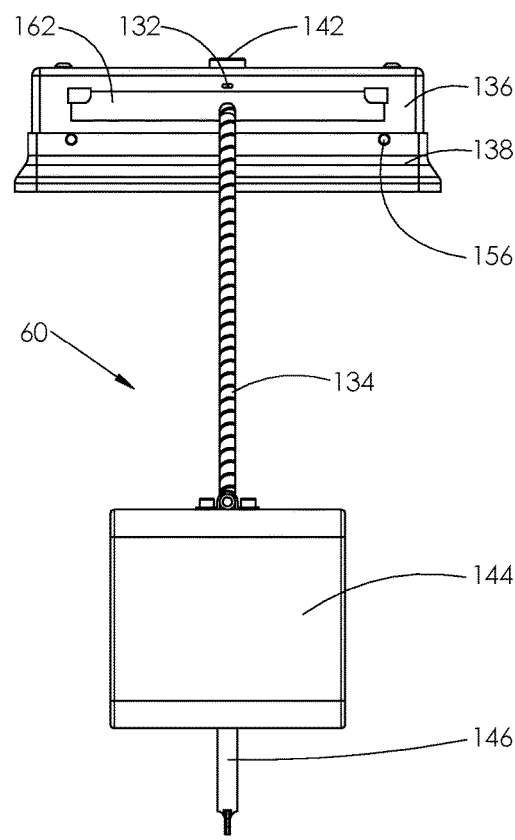

Referring to FIG. 40, the apparatus of attachment 60 differs from the previously described embodiment of the subject invention in that body 136 can be attached to surgical table 70 by bracket 144. It is also contemplated that body 136 can be attached to a surgical instrument or a surgical drape by bracket 144. It is envisioned that bracket 144 can be secured to surgical table 70, surgical instrument, or surgical drape by holding screw 146. The proximal end of bendable, structure 134 is secured to body 136 by holding plate 162, as shown in FIGS. 37 and 43. The distal end of bendable structure 134 is secured to bracket 144 by holding bracket 148, which is secured by one or more screws 152, as shown in FIG. 40. In addition, it is envisioned that the bendable structure 134 and body 136 of apparatus 60 can be adjusted relative to treatment area 4.

Referring now to FIG. 39, a light source 164 is supported across body 136 and associated with electrical wire 132 for emitting therapeutic light to treat biological tissue 2 proximate to shroud 138. Light source 164 is housed within an interior cavity of the apparatus of attachment 60, and includes at least one light sources associated with a printed circuit board (PCB) 166 that is supported within body 136, and it is preferably an LED light source. Light source 164 could also comprise at least one laser diode, which may be embedded on PCB 166 or separate from PCB 166. The therapeutic light for performing biological tissue therapy on light treatment area 4 of biological tissue 2 of a patient can be selected from a group of light sources that consists of UV light, UV-C light, Far UV-C light, infrared light, near-infrared light, low level laser light, and White light.

Shroud 138 is dimensioned and configured to establish an effective distance and area of therapeutic treatment relative to the biological tissue 2 to be treated. Pins 156 are inserted to attach shroud 138 to body 136, as shown in FIG. 39, and shroud 138 and body 136 are further fastened together by screws 154 and nuts 158. At distal and proximal ends of body 136, spacers are placed on PCB 166. It is contemplated that shroud 138 can be formed from a material that is impervious to therapeutic light (such as amber colored plastic) so as to avoid an impact of therapeutic light on areas of biological tissue 2 that are not intended to be treated. Preferably, an optical element can be designed to focus the therapeutic light to the treatment area 4.

Figure 41:
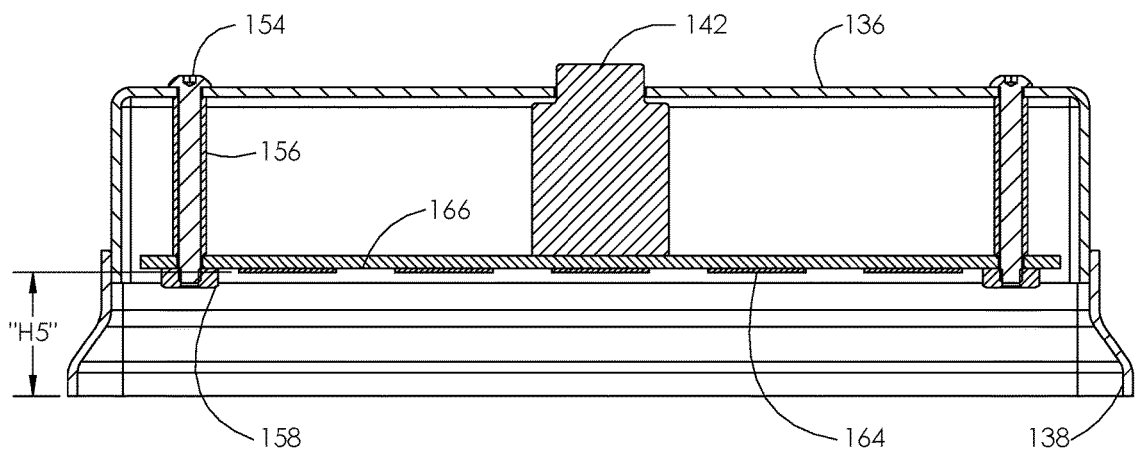
FIG. 41 is cross-section J-J taken from FIG. 40.
Figure 42:
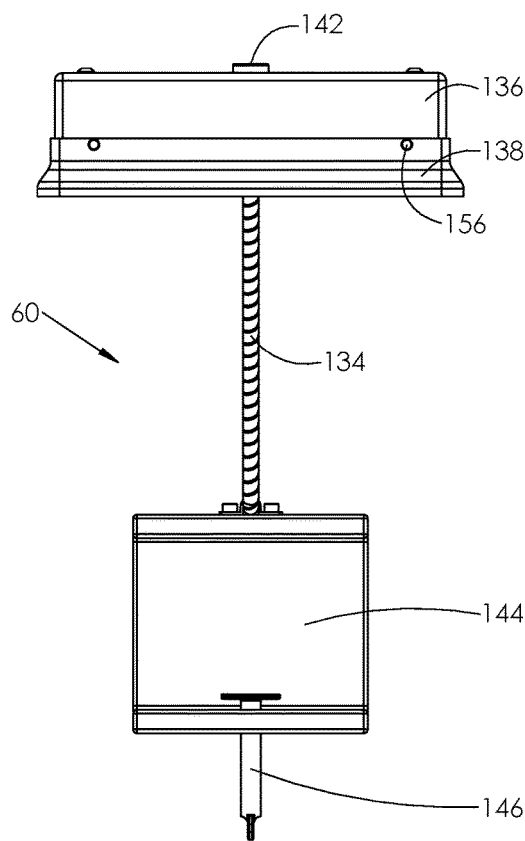
FIG. 42 and FIG. 43 are front and rear view of therapeutic light treatment apparatus 60.

Preferably, a push button switch 142 is operatively associated with the body for activating the electrical wire 132 and/or light source 164, as shown in FIG. 41, and is housed in body 136. Electronics are operatively associated with body 136 and shroud 138 to activate or enable activation of the electrical wire 132 and/or light source 164 when the shroud 138 comes into contact with the biological tissue 2 to be treated, or it can provide an indication to a user that the apparatus of attachment 60 is ready for use. An indicator can also be associated with the PCB 166 for sonically or visually indicating when the electrical wire 132 has been deactivated or provide an indication to a user that the treatment has been completed.

Figure 46:
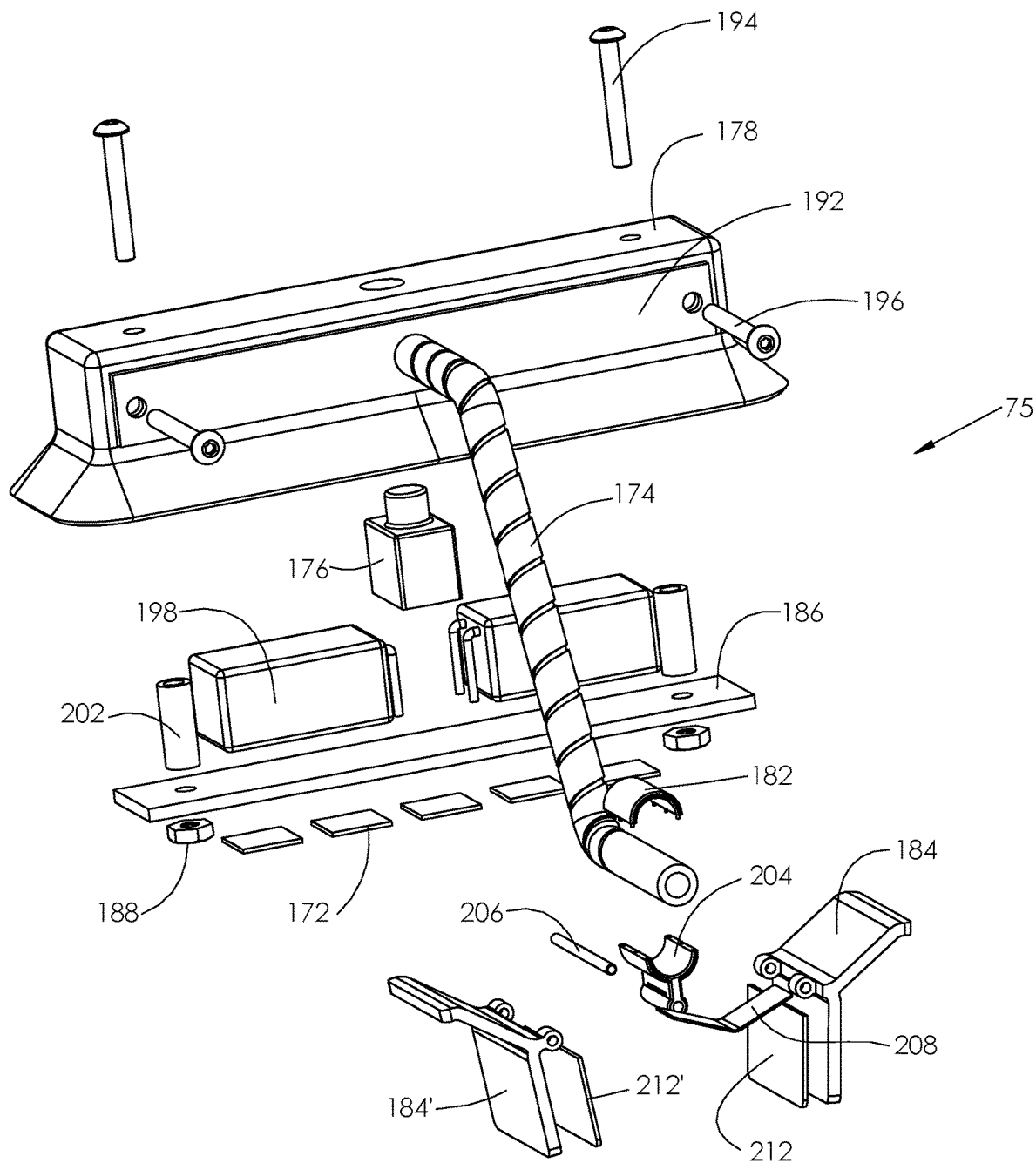
FIG. 46 is an exploded view of therapeutic light treatment apparatus 75.
Figure 47:
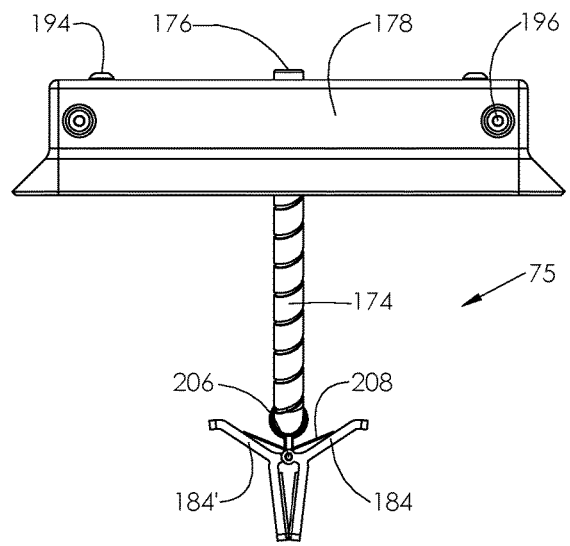
FIG. 47, FIG. 48 and FIG. 49 are front, bottom and side views of therapeutic light treatment apparatus 75.
Figure 48:
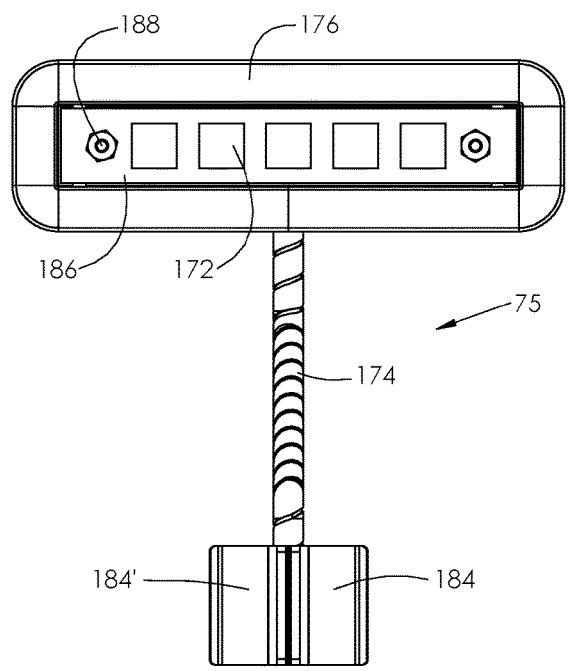
Figure 50:
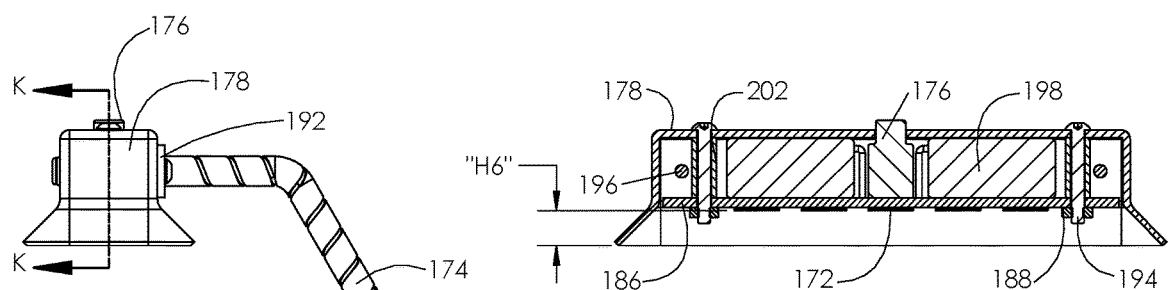
FIG. 50 is a section K-K taken from FIG. 49.

Referring now to FIGS. 44-50, there is illustrated a handheld therapeutic light emitting treatment attachment constructed in accordance with a preferred embodiment of the subject invention and designated generally by reference numeral 75. As explained in more detail below, the apparatus joined with attachment 75 is similar in many respect to the apparatus 20 described above. However, the apparatus of attachment 75 includes shroud 178, which houses power source 198, as shown in FIG. 46. And, as in the previous embodiment of the subject invention, therapeutic light emitting apparatus of attachment 75 is adapted and configured for performing biological tissue therapy on light treatment area 4 of biological tissue 2 of a patient, as shown in FIG. 50.

Figure 44:
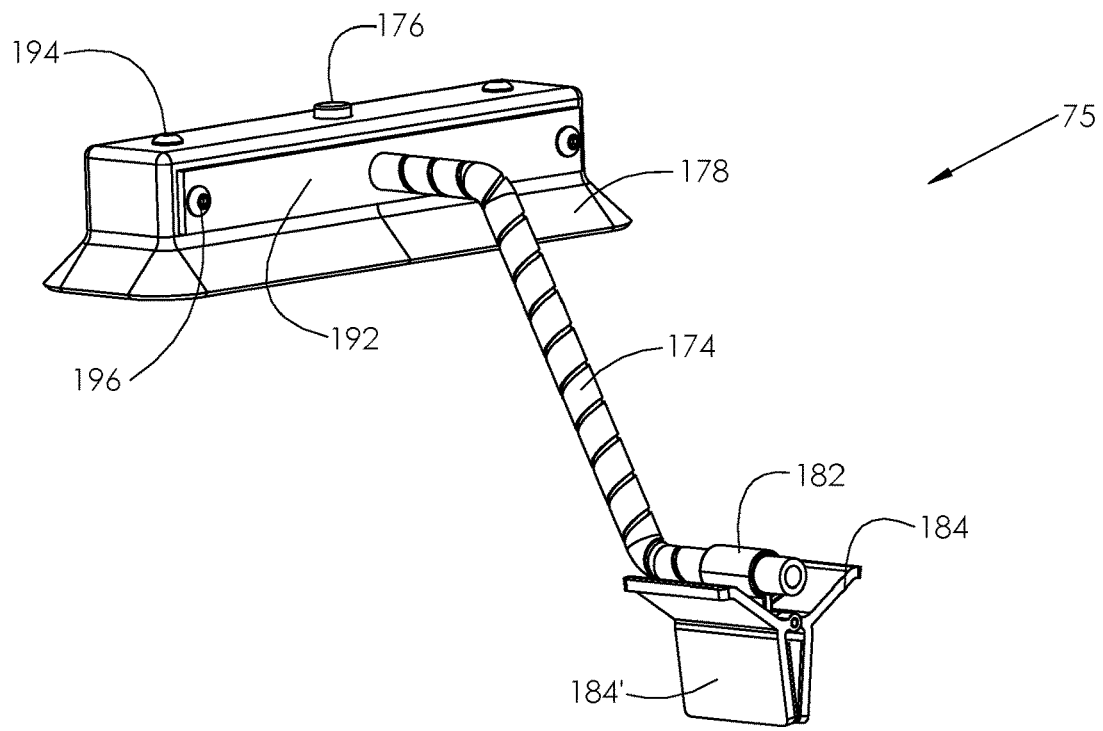
FIG. 44 and FIG. 45 are isometric of views therapeutic light treatment apparatus 75 by concept 7 and this apparatus can be clamped (attached) to the surgical instruments, surgical drape etc.
Figure 45:
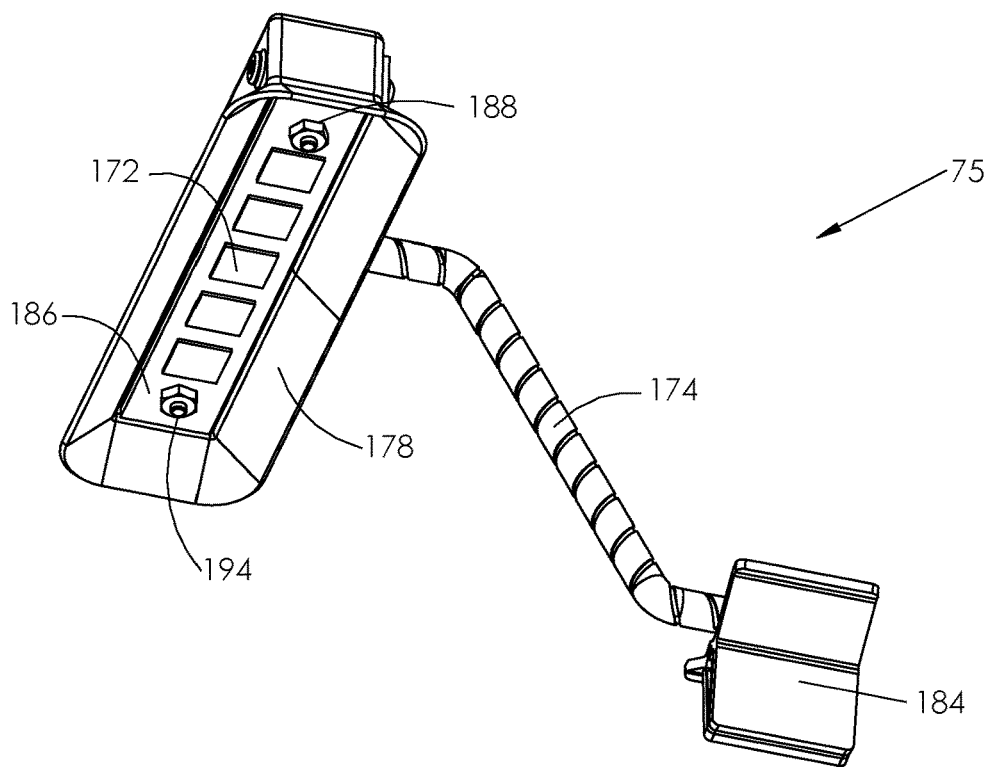
Figure 49:
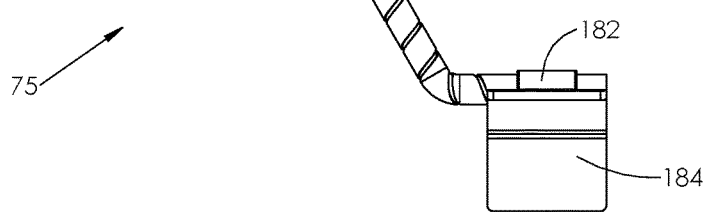

Referring to FIG. 46, the apparatus of attachment 75 differs from the previously described embodiment of the subject invention in that shroud 178 can be attached to surgical table 70 by clamp body 184 and 184'. It is also contemplated that shroud 178 can be attached to a surgical instrument or a surgical drape by clamp body 184 and 184'. The proximal end of bendable, structure 174 is secured to shroud 178 by holding plate 192, as shown in FIGS. 44, 46, and 49. Referring to FIG. 46, the distal end of bendable structure 174 is secured to clamp body 184 and 184' by upper holder 182 and upper holder 204, which are operatively associated with pin 206 and leaf spring 208 to enable the clamping mechanism of clamp body 184 and 184'. It is envisioned that compliant material 212 (over molded or bonded) can be applied to clamp body 184 and 184' to improve their clamping performance. In addition, it is envisioned that the bendable structure 174 and shroud 178 of the apparatus of attachment 75 can be adjusted relative to treatment area 4.

Referring now to FIG. 50, a light source 174 is supported across shroud 178 and operatively associated with power source 198 for emitting therapeutic light to treat biological tissue 2 proximate to shroud 178. Light source 172 is housed within an interior cavity of the apparatus of attachment 75, and includes at least one light source associated with a printed circuit board (PCB) 186 that is supported within shroud 178, and it is preferably an LED light source. Light source 172 could also include at least one laser diode, which may be embedded on PCB 186 or separate from PCB 186. The therapeutic light for performing biological tissue therapy on light treatment area 4 of biological tissue 2 of a patient can be selected from a group of light sources that consists of UV light, UV-C light, Far UV-C light, infrared light, near-infrared light, low level laser light, and White light.

Shroud 178 is dimensioned and configured to establish an effective distance and area of therapeutic treatment relative to the biological tissue 2 to be treated. Screws 196 are inserted to attach holding plate to shroud 178, as shown in FIG. 46, and shroud 178 and PCB 186 are further fastened together by screws 194 and nuts 188. At distal and proximal ends of PCB 186, spacers 202 are placed on PCB 186 to contain screws 194. It is contemplated that shroud 178 can be formed from a material that is impervious to therapeutic light (such as amber colored plastic) so as to avoid an impact of therapeutic light on areas of biological tissue 2 that are not intended to be treated. Preferably, an optical element can be designed to focus the therapeutic light to the treatment area 4.

Preferably, a push button switch 176 is operatively associated with the body for activating the power source 198 and/or light source 172, as shown in FIGS. 46-50, and is housed in shroud 178. Electronics may be operatively associated with shroud 178 to activate or enable the activation of the power source 198 and/or light source 172 when the shroud 178 comes into contact with the biological tissue 2 to be treated, or it can provide an indication to a user that the apparatus of attachment 75 is ready for use. An indicator can also be associated with the PCB 186 for sonically or visually indicating when the power source 198 has been deactivated or provide an indication to a user that the treatment has been completed.

Referring now to FIGS. 51-64, there is illustrated a handheld therapeutic light emitting treatment apparatus constructed in accordance with a preferred embodiment of the subject invention and designated generally by reference numeral 80. As explained in more detail below, the apparatus 80 is similar in many respect to the apparatus 20 described above. The apparatus of attachment 80 includes body portion 214, shroud 216 extending from body 214, and electrical wire 224 connected to an external electrical source, also shown in FIG. 51. And, as in the previous embodiment of the subject invention, therapeutic light emitting apparatus 80 is adapted and configured for performing biological tissue therapy on light treatment area 4 of biological tissue 2 of a patient, as shown in FIG. 51.

Figure 55:
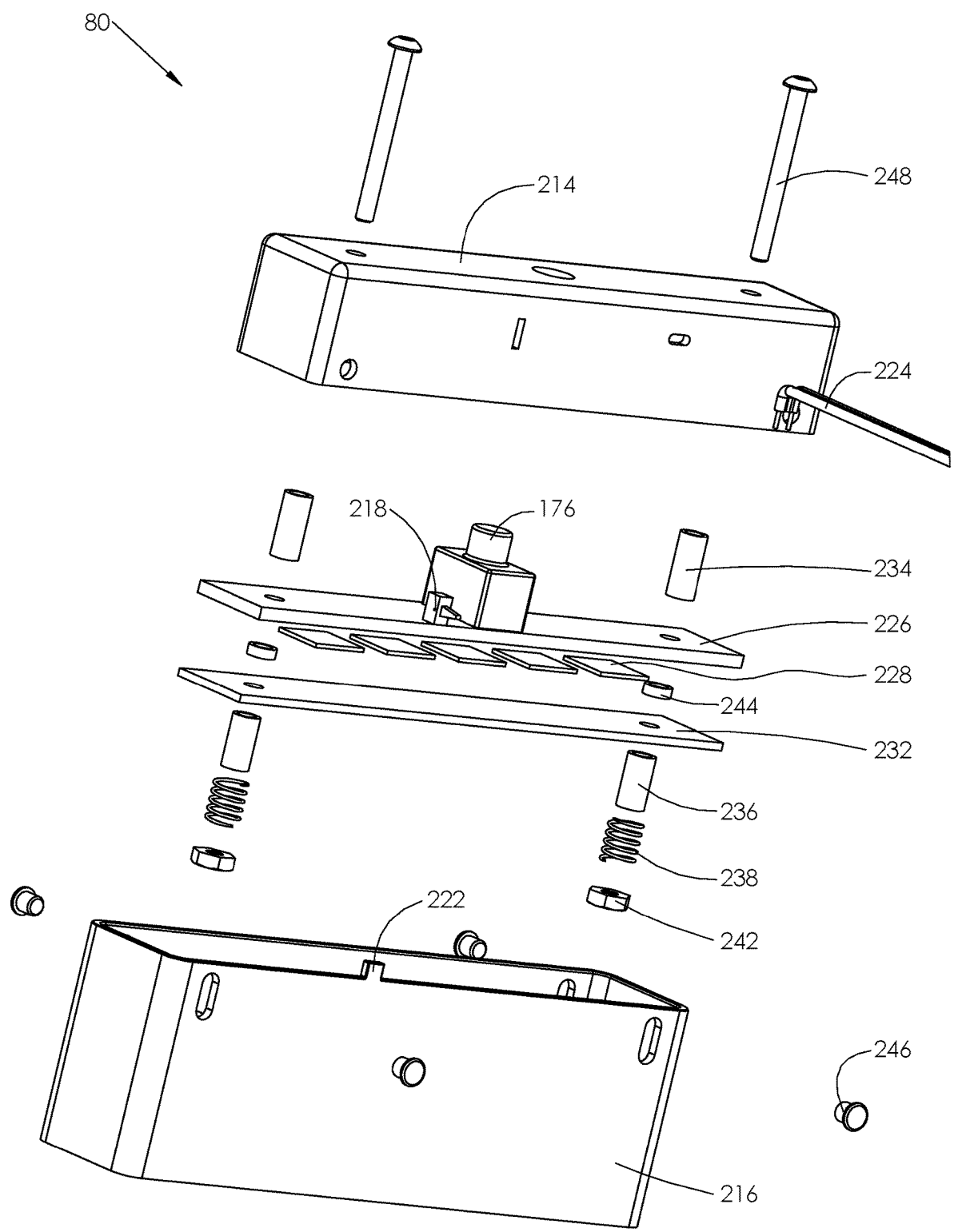
FIG. 55 is an exploded view of therapeutic light treatment apparatus 80.

Referring to FIGS. 53-55, the apparatus 80 differs from the previously described embodiment of the subject invention in that shroud 216 is slideable to establish a minimum effective distance to light treatment area 4. It is envisioned that when shroud 216 contacts biological tissue 2, apparatus 80 initiates and produces a signal to inform the user that shroud 216 is in contact with biological tissue 2. It is envisioned that at this time, push button switch 176 can be activated to start UV light emitting from apparatus 80.

Referring now to FIG. 59, a light source 228 is supported across body 136 and associated with electrical wire 224 for emitting therapeutic light to treat biological tissue 2 proximate to shroud 216. Light source 228 is housed within an interior cavity of the apparatus of attachment 60, and includes at least one light sources associated with a printed circuit board (PCB) 226 that is supported within body 214, and it is preferably an LED light source. Light source 228 could also comprise at least one laser diode, which may be embedded on PCB 226 or separate from PCB 226. The therapeutic light for performing biological tissue therapy on light treatment area 4 of biological tissue 2 of a patient can be selected from a group of light sources that consists of UV light, UV-C light, Far UV-C light, infrared light, near-infrared light, low level laser light, and White light.

Shroud 216 is dimensioned and configured to establish an effective distance and area of therapeutic treatment relative to the biological tissue 2 to be treated. Referring to FIGS. 52-54, shroud 216 is operatively associated with body 214 to provide vertical slideable functionality via grooves 252, which enable shroud 216 to extend or retract from body 214 to establish a minimum effective distance to light treatment area 4. Once minimum effective distance to light treatment area 4 is reached, electrical switch 218 and switch activated boss 222 automatically enable the activation of light source 228 on treatment area 4.

Figure 60:
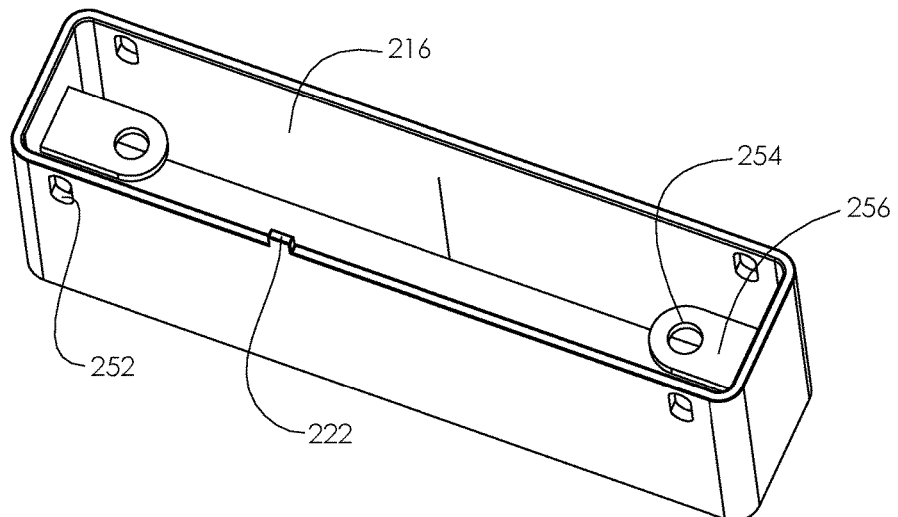
FIG. 60 is an isometric view of shroud 216.

Referring to FIG. 56, pins 246 are inserted to attach shroud 216 to body 214, and shroud 216 and body 214 are further fastened together by screws 248 and nuts 242, as shown in FIG. 55. At distal and proximal ends of body 214, spacers 234 are placed on PCB 226. At distal and proximal ends of body 214, spacers 244 are placed on lens 232. Also at distal and proximal ends of body 214, spacers 236 are placed below a lens 232. As shown in FIG. 60, spacers 236 are placed above spring 238, both of which are inserted through opening 254 for spacer in order to reside on spring support structure 256 and further enable the vertical slideable functionality of shroud 216. It is contemplated that shroud 216 can be formed from a material that is impervious to therapeutic light (such as amber colored plastic) so as to avoid an impact of therapeutic light on areas of biological tissue 2 that are not intended to be treated. Preferably, an optical element can be designed to focus the therapeutic light to the treatment area 4.

Figure 61:
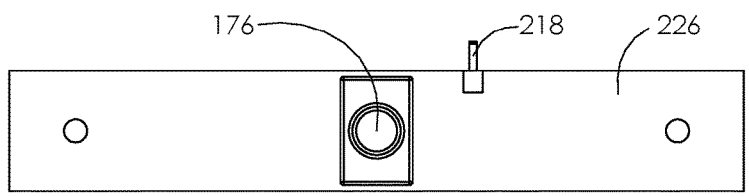
FIG. 61, FIG. 62, FIG. 63 and FIG. 64 are top, side, front and bottom view of PC Board assembly.
Figure 62:
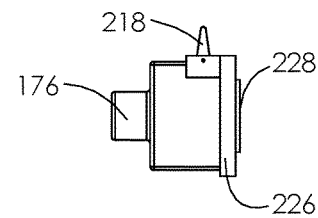
Figure 63:
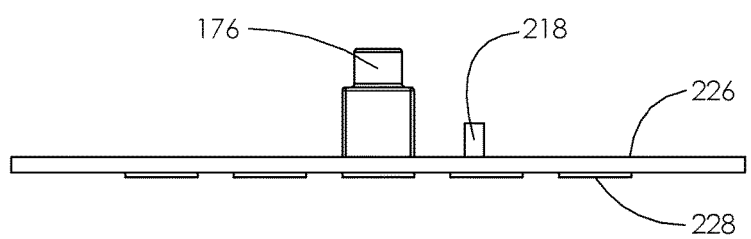
Figure 64:
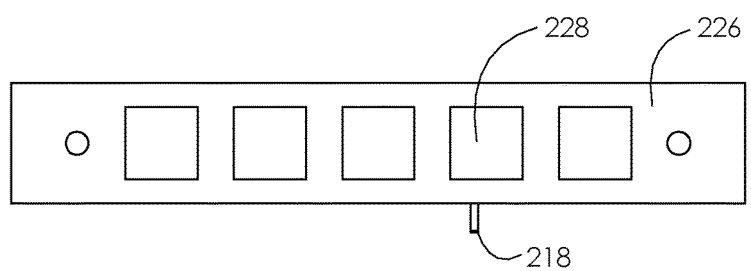
Figure 65:
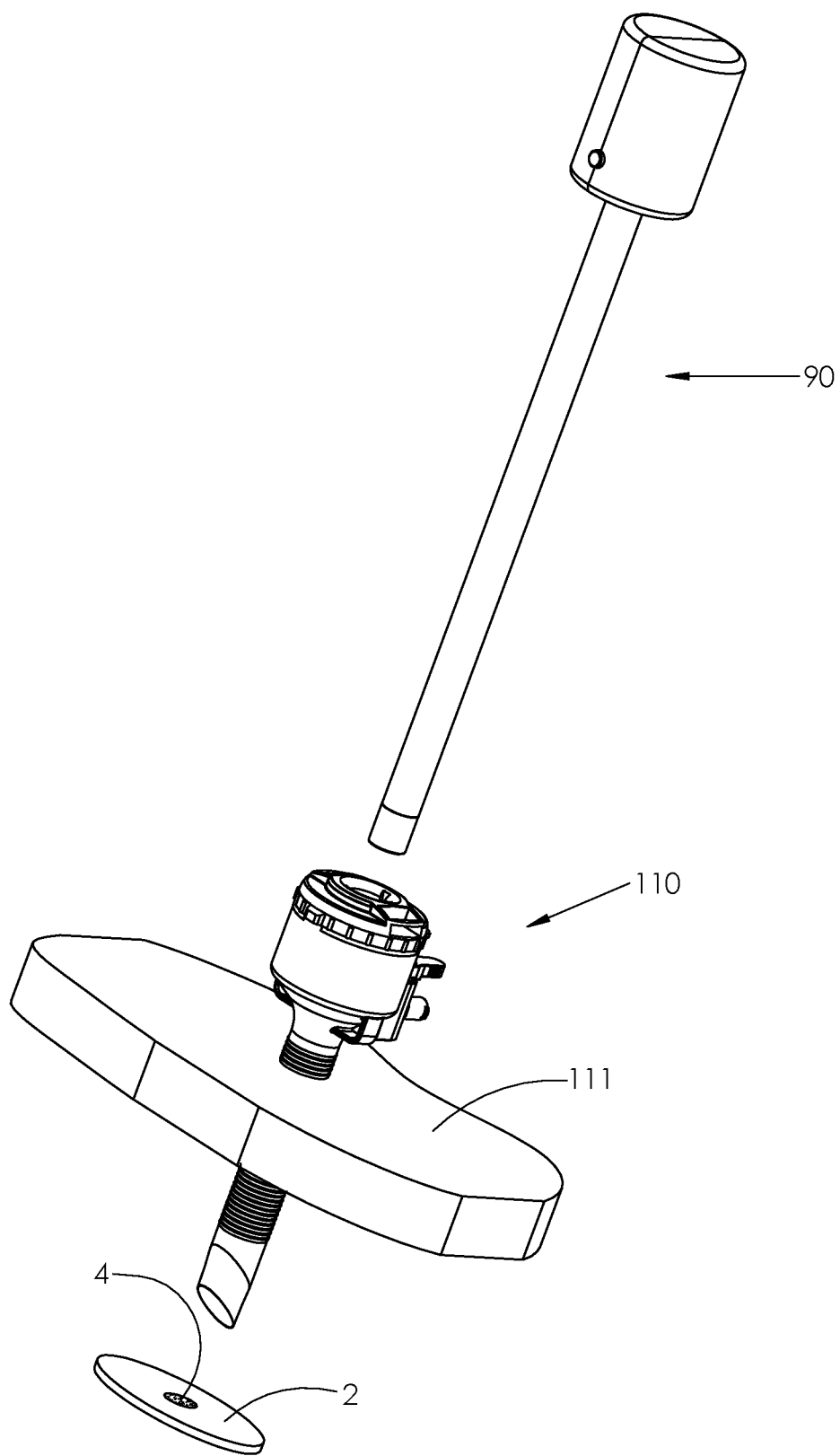
FIGS. 65-75 illustrate a treatment apparatus 90 for therapeutic light treatment of tissue in laparoscopic procedure, used with a laparoscopic port 110. This is illustration of concept 9.
Figure 66:
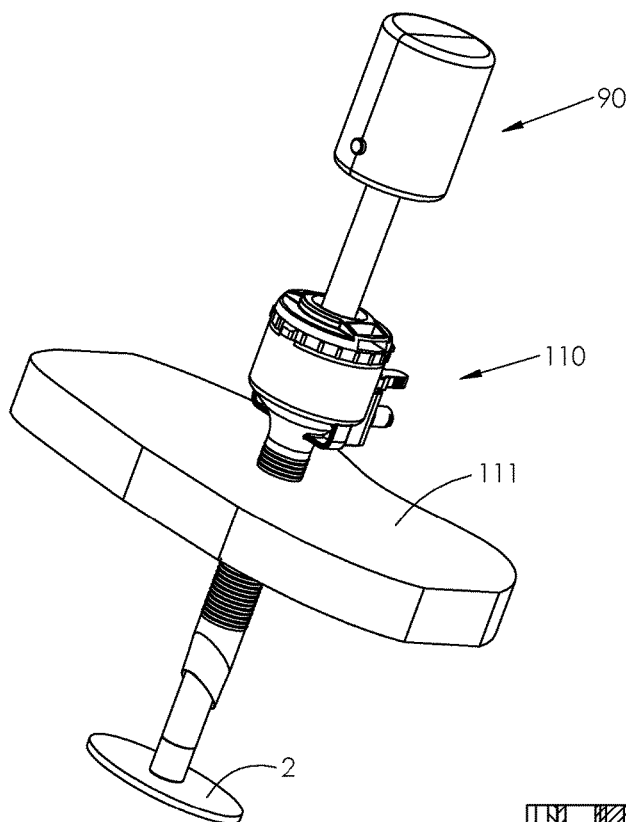
Figure 67:
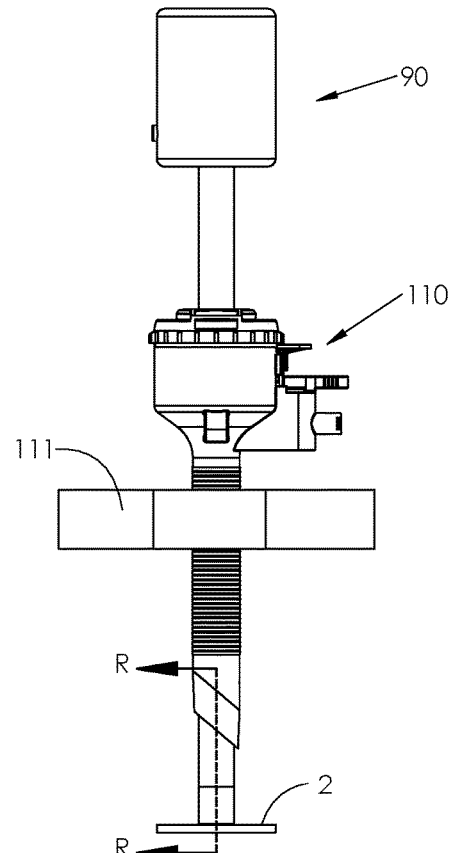

Preferably, a push button switch 176 is operatively associated with the body 214 for activating the electrical wire 224 and/or light source 228, as shown in FIGS. 59, 61, and 63. Electronics may be operatively associated with body 214 and shroud 216 to activate or enable the activation of the electrical wire 224 and/or light source 228 when the shroud 216 comes into contact with the biological tissue 2 to be treated, or it can provide an indication to a user that the apparatus 80 is ready for use. An indicator can also be associated with the PCB 226 for sonically or visually indicating when the electrical wire 224 has been deactivated or provide an indication to a user that the treatment has been completed. Lens 232 is supported within body 214 in front of the light source 228, as shown in FIGS. 55 and 59. The optical design of the lens 232 is used to focus the therapeutic light to the target treatment area 4 to maximize safety and efficacy.

Figure 68:
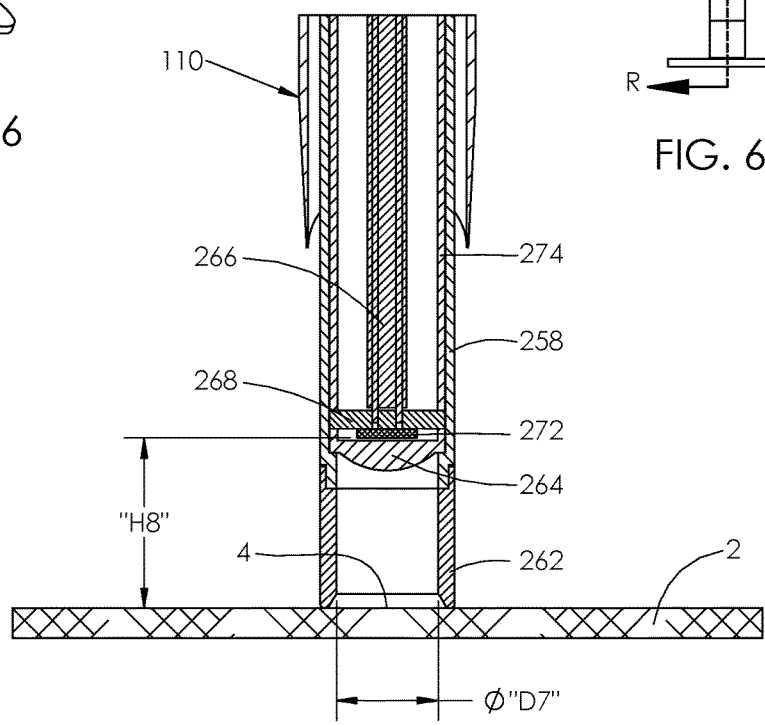
Figure 69:
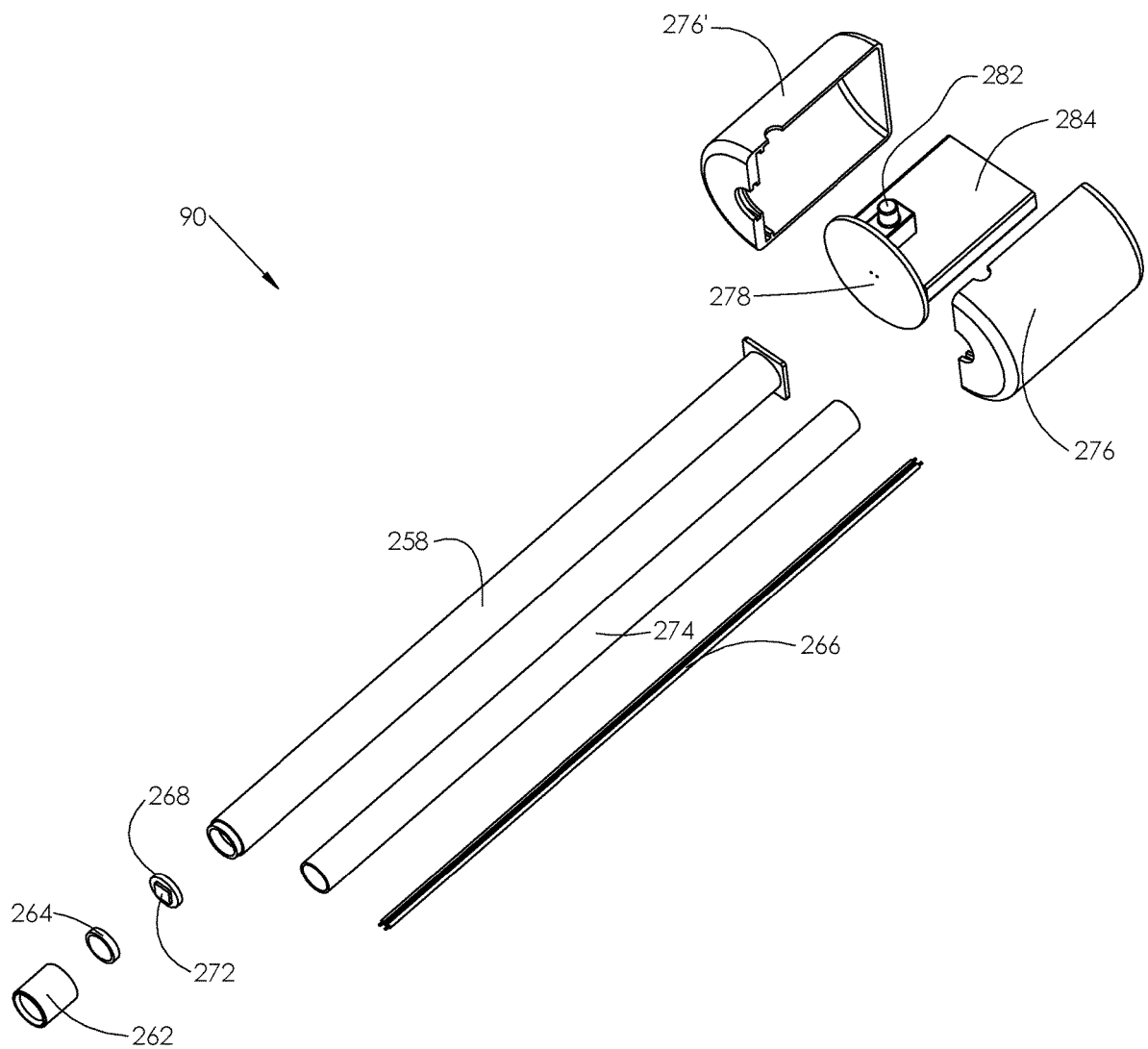
Figure 70:
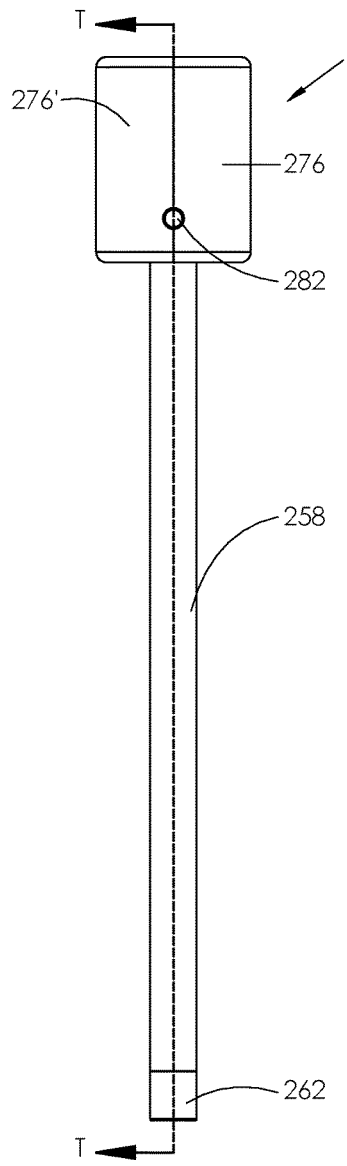
Figure 71:
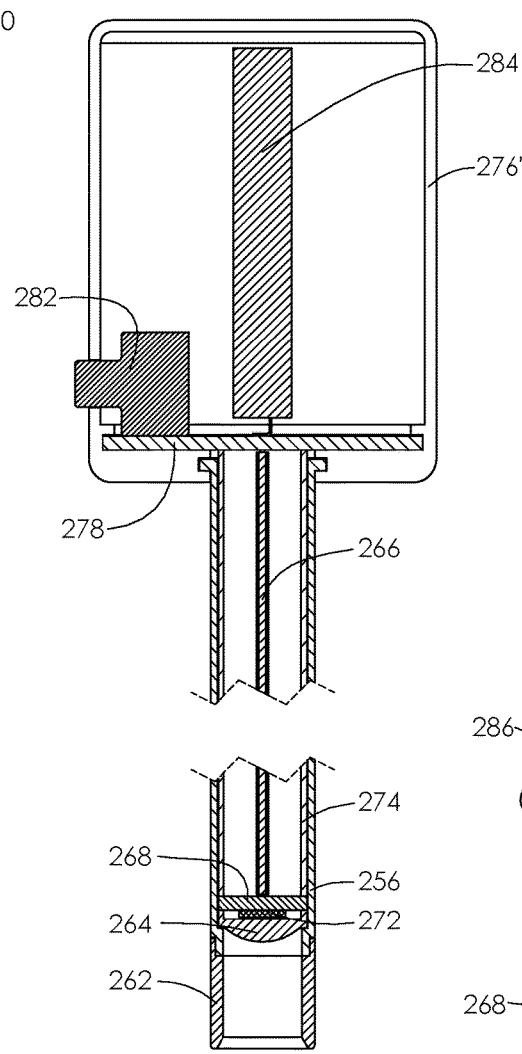

Referring now to FIGS. 65-75, there is illustrated an apparatus for treating biological tissue during laparoscopic surgery, constructed in accordance with a preferred embodiment of the subject invention and designated generally by reference numeral 90. UV light treatment apparatus 90 is adapted and configured for performing biological tissue therapy on light treatment area 4 of biological tissue 2 of a patient, as shown in FIG. 68. Referring to FIG. 69, apparatus 90 includes a proximal handle portion, a tubular body extending distally from the proximal handle portion, a shroud 262 extending from the distal end of the tubular body, and a light source 272 supported at a distal end of the tubular body proximal to the shroud 262 and connected to a power source 284 housed within the handle portion or external to the handle portion for emitting therapeutic light to treat biological tissue 2 proximate to the shroud 262.

Referring to FIG. 69, the proximal handle portion is comprised of left 276 and right 276' portions, respectively. Collectively, left 276 and right 276' portions encase power source 284, which is operatively associated with switch 282. When switch 282 activates power source 284, PCB 278 receives a stimulus, which is relayed via electrical wire 266 from PCB 278 to UV LED PCB 268. Electrical wire 266 is encased in spacer 274 and outside cannula 258 respectively, which collectively include a tubular body extending distally from the proximal handle portion.

Referring to FIG. 68, PCB 268, at the distal end of electrical wire 266, is operatively associated with light source 272 via electrical wire 266 for emitting therapeutic light to treat biological tissue 2 proximate to shroud 262. Light source 272 is housed within the distal end of the tubular body, and includes at least one light sources embedded on PCB 268 that is supported within the tubular body, and it is preferably an LED light source. Light source 272 could also include at least one laser diode, which may be embedded on PCB 268 or separate from PCB 268. The therapeutic light for performing biological tissue therapy on light treatment area 4 of biological tissue 2 of a patient can be selected from a group of light sources that consists of UV light, UV-C light, Far UV-C light, infrared light, near-infrared light, low level laser light, and White light.

It is envisioned that at an incision in the abdominal wall 111, shroud 262, extending from the distal end of the tubular body, can be inserted into laparoscopic port 110. Shroud 262 is preferably composed of non-transparent UV material. Preferably, the shroud 262 is dimensioned and configured to establish an effective distance and area of therapeutic light treatment relative to the biological tissue 2 to be treated. However, it is envisioned that the effective or minimum treatment distance can be established by way of a laser, a probe, or a sensor, that could be embedded in the probe or in the shroud 262.

Figure 73:
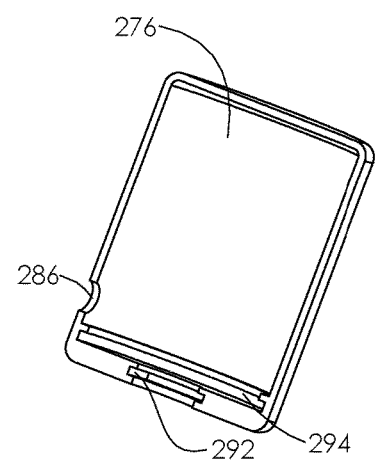
Figure 74:
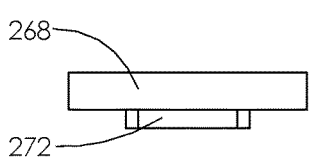
Figure 72:
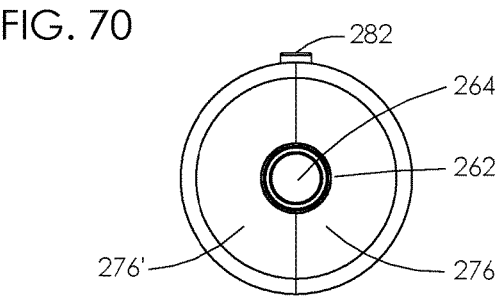
Figure 75:
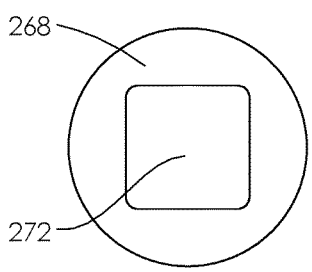

Push button switch 282 is operatively associated with the left 276 and right 276' body portions for activating the electrical wire 266 and/or light source 272, as shown in FIGS. 66-68 and 71. Electronics may be operatively associated with shroud 262 to activate or enable the activation of the electrical wire 266 and/or light source 272 when the shroud 262 comes into contact with the biological tissue 2 to be treated, or it can provide an indication to a user that the apparatus 90 is ready for use. An indicator can also be associated with the PCB 268 for sonically or visually indicating when the electrical wire 266 has been deactivated or provide an indication to a user that the treatment has been completed. Lens 264 is supported within the tubular body in front of the light source 272, also shown in FIGS. 66-68 and 71. The optical design of the lens 264 is used to focus the therapeutic light to the target treatment area 4 to maximize safety and efficacy. Referring to FIG. 73, left 276 and right 276' body portions are joined around switch 282 by rivet 286. During assembly, groove 292 and slot 294 permit the preferred locating of lens 264 and PCB 268, respectively.

Figure 76:
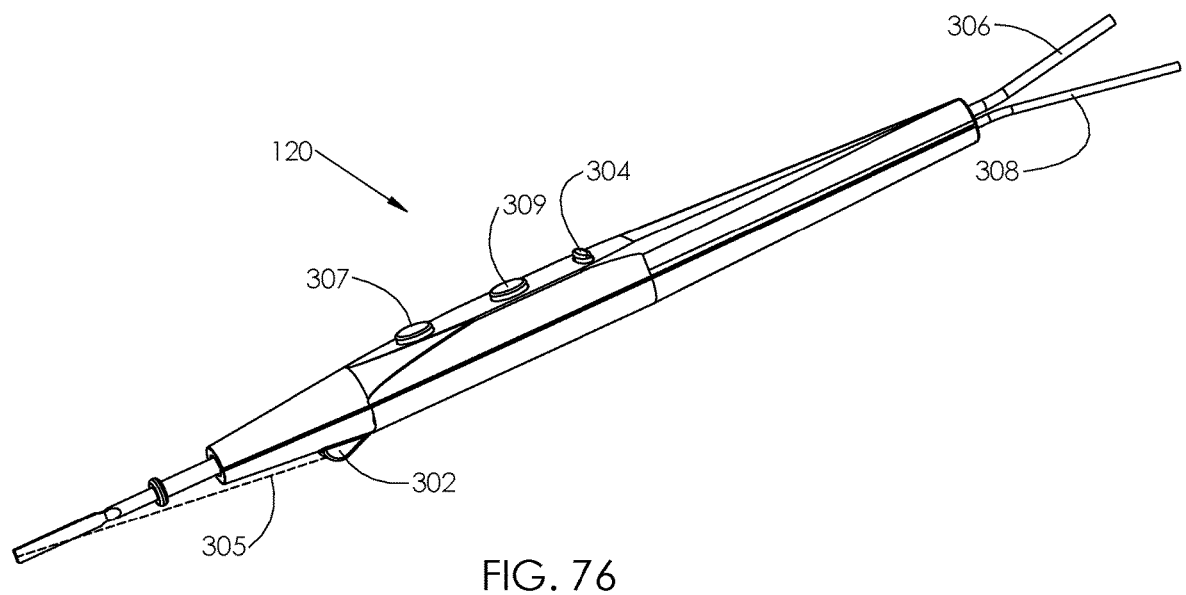
FIG. 76 is an isometric view of an electrosurgical instrument 120 with integrated therapeutic light source for tissue treatment by concept 10.

Referring now to FIGS. 76-79, there is illustrated an apparatus for treating biological tissue, constructed in accordance with a preferred embodiment of the subject invention and designated generally by reference numeral 120. Electrosurgical instrument 120 with integrated light source 302 is adapted and configured for performing biological tissue therapy on light treatment area 4 of biological tissue 2 of a patient. Referring to FIG. 76, electrosurgical instrument 120 includes an elongated body, an electrocautery blade 305 extending from a distal end of the body, and light source 302 operatively associated with the body and oriented to focus therapeutic light to an area around a tip of the electrocautery blade 305.

Figure 77:
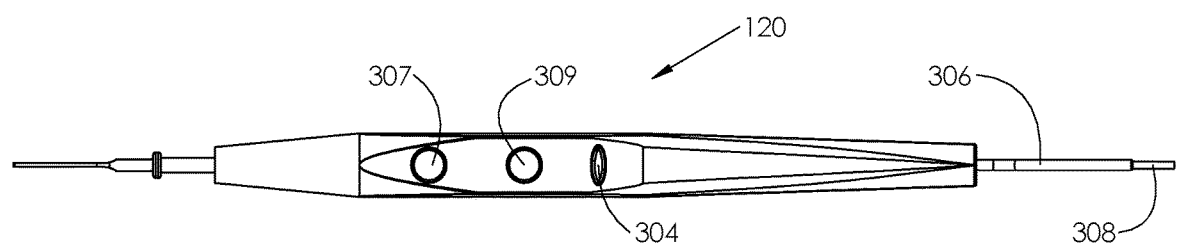
FIG. 77, FIG. 78 and FIG. 79 are top, front and bottom views of the electrosurgical instrument 120.
Figure 78:
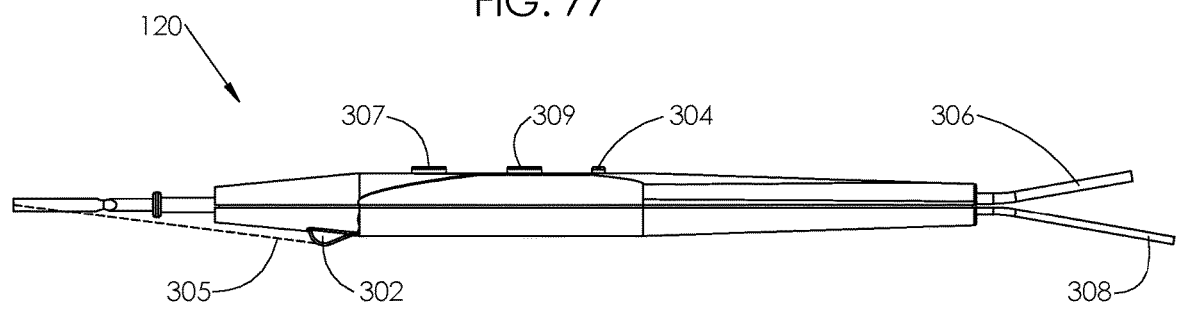
Figure 79:
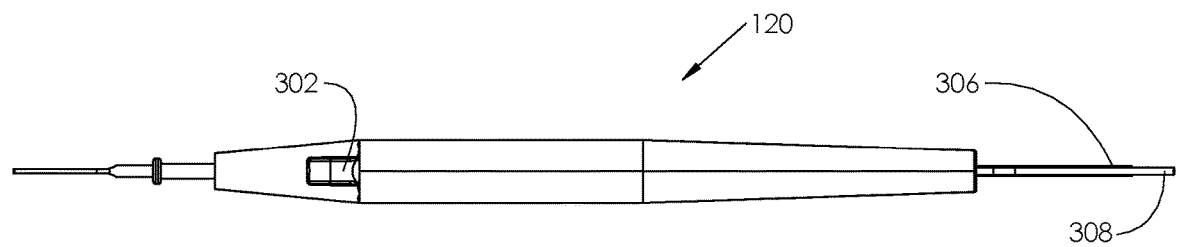
Figure 80:
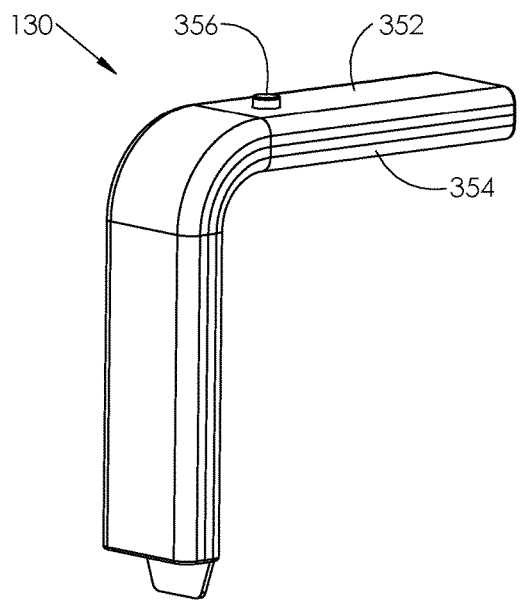
FIG. 80 and FIG. 81 show isometric views of surgical retractor by concept 11.
Figure 81:
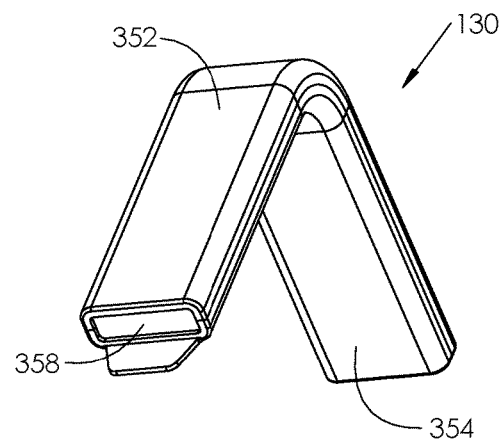
Figure 82:
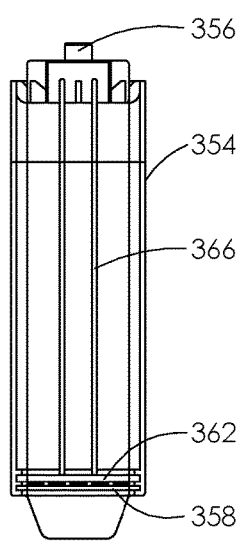
FIG. 82 is a front view of retractor by concept 11 when upper retractor body remove for batter understanding.
Figure 83:
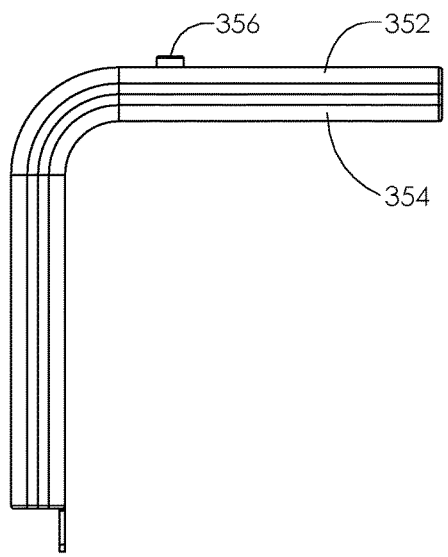
FIG. 83 is a side view of the retractor.

Referring to FIGS. 77-79, the electrosurgical instrument 120 further includes a first switch 307 and a second switch 309 on the body for manually activating the electrocautery blade 305, and a third switch 304 on the body for manually activating the therapeutic light source 302. The therapeutic light for performing biological tissue therapy on light treatment area 4 of biological tissue 2 of a patient can be selected from a group of light sources that consists of UV light, UV-C light, Far UV-C light, infrared light, near-infrared light, low level laser light, and White light. In addition, the instrument 120 includes a first power cord 306 extending from the proximal end of the body for connecting the electrocautery blade 305 to a first power source and a second power cord 308 extending from a proximal end of the body for connecting the therapeutic light source 302 to a second power source, as shown in FIG. 78.

Figure 84:
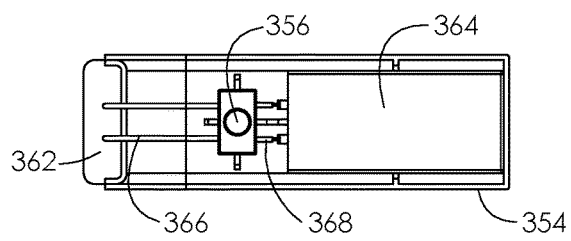
FIG. 84 is a top view of the retractor when the upper retractor body is removed.
Figure 85:
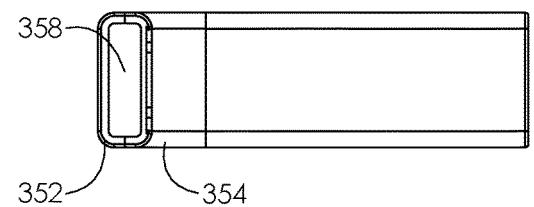
FIG. 85 is a bottom view of the retractor.
Figure 86:
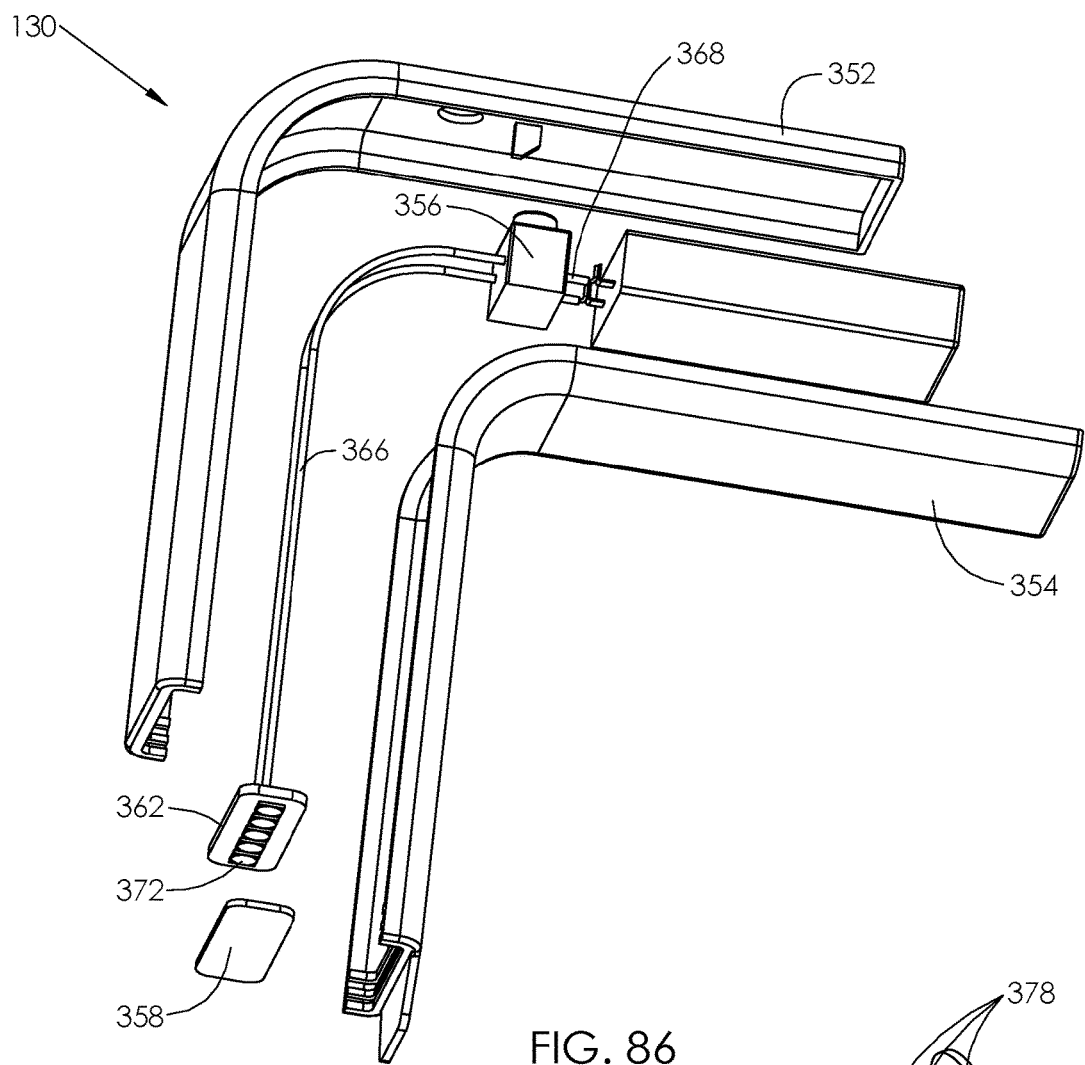
FIG. 86 is an exploded view of the retractor.
Figure 87:
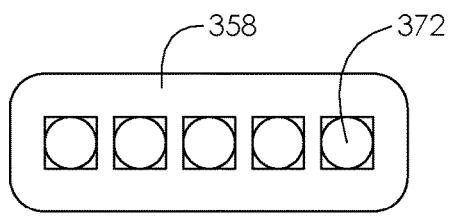
FIG. 87 is a front view of retractor PCB with embedded LED.
Figure 88:
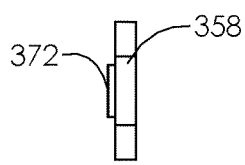
FIG. 88 is a side view of retractor PCB with embedded LED.

Referring now to FIGS. 80-89, there is illustrated an instrument for retraction, constructed in accordance with a preferred embodiment of the subject invention and designated generally by reference numeral 130. Surgical retractor 130 is adapted and configured for supplying energy to UV LED 372 while performing biological tissue therapy on light treatment area 4 of biological tissue 2 of a patient. Referring to FIG. 86, retractor 130 includes an upper body portion 352 operatively associated with a power source 364 and a lower body portion 354 extending orthogonal to the upper body portion 352 and housing a therapeutic light source 372 embedded on a printed circuit board 362 and connected to the power source 364. Preferably, the power source 364 is housed within the upper body portion 352 of the retractor 130, a lens 358 is positioned in front of the therapeutic light source 372 and a flange projects forward from the distal end of the lower body portion 354 of the retractor 130. Switch 356 may be associated with the upper body portion 352 for manually activating the therapeutic light source 372 and/or the power source 364. It is envisioned that the LED light source 372 can include a therapeutic LED and a non-therapeutic LED. Wires 366 are operatively associated with switch 356 to communicate with printed circuit board 362, as shown in FIG. 86, and wires 368 are operatively associated with power source 364 to communicate with switch 356, as shown in FIG. 84.

Figure 89:
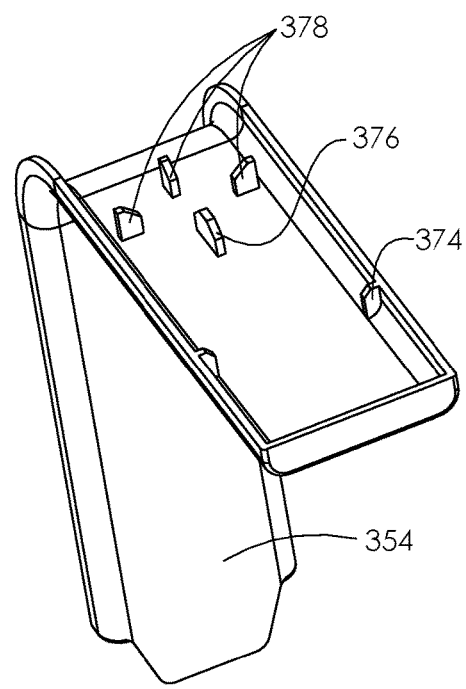
FIG. 89 is an isometric view of lower retractor body.
Figure 90:
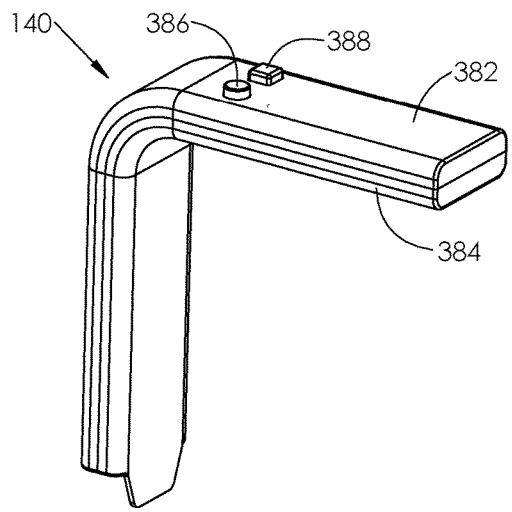
FIG. 90 and FIG. 91 show isometric views of retractor by concept 12.
Figure 91:
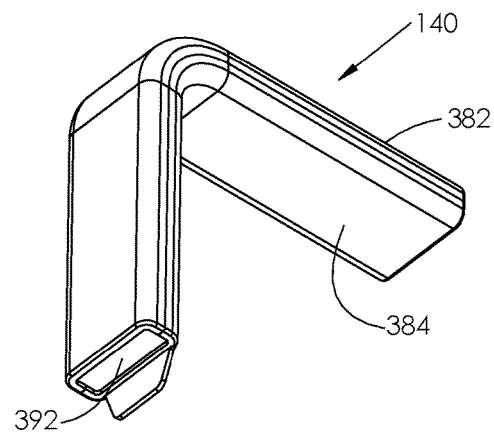

Referring now to FIG. 89, battery holding ribs 374 are arranged on a proximal surface lower body portion 354 as a means for securing power source 364 during assembly of retractor 130. Also on the proximal surface lower body portion 354, switch holding ribs 378 are arranged as a way for securing power source switching means 356 during assembly of retractor 130. Finally, battery and switch holding rib 376 is arranged on the proximal surface lower body portion 354 between battery holding ribs 374 and switch holding ribs 378 as a way for further securing power source 364 and switch 356 respectively during assembly of retractor 130.

Figure 96:
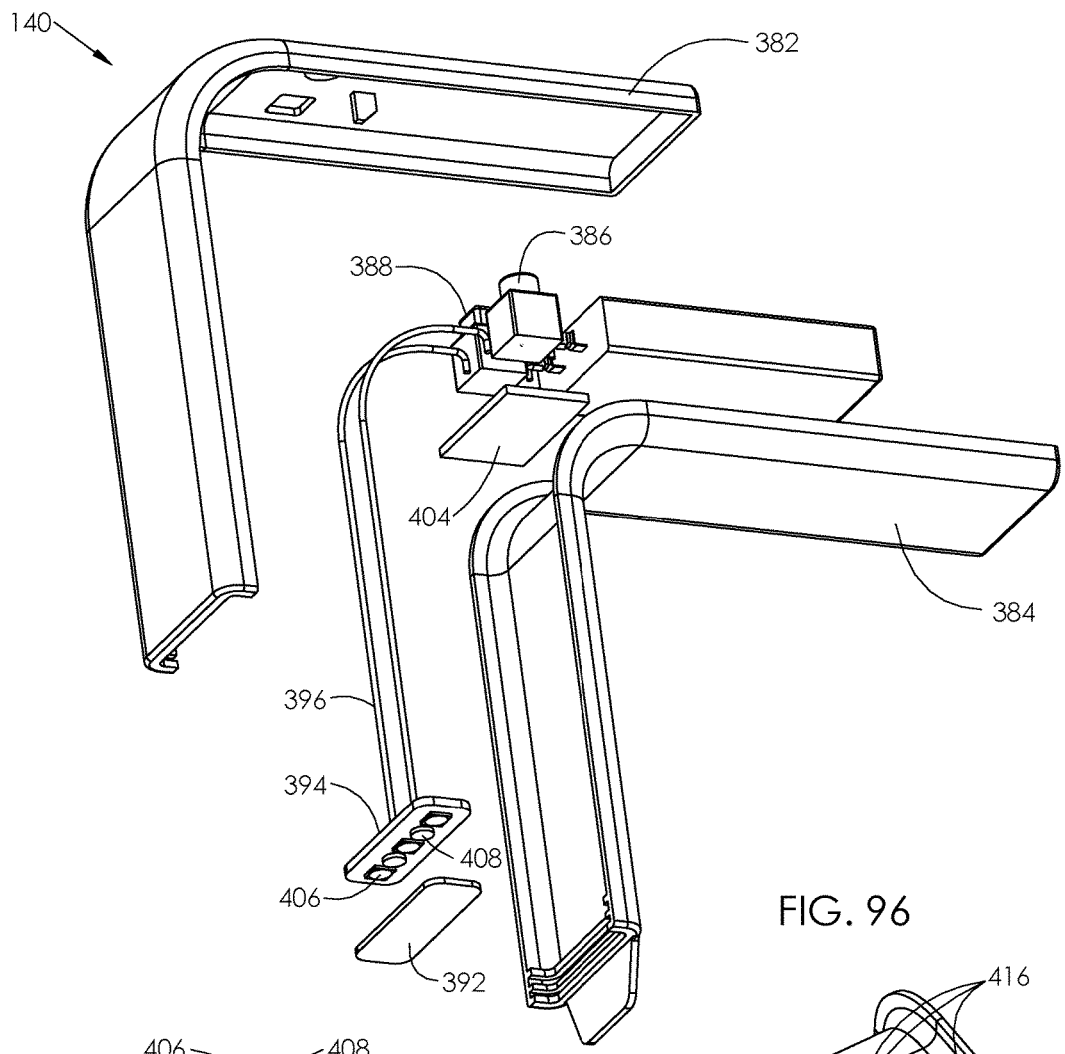
FIG. 96 is an exploded view of the retractor.
Figure 97:
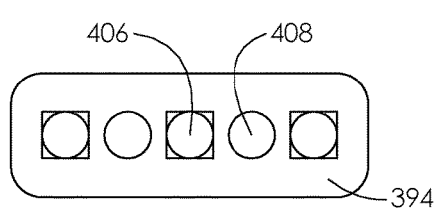
FIG. 97 is a front view of retractor PCB with UV LED and regular LED.
Figure 98:
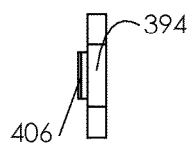
FIG. 98 is a side view of retractor PCB with UV LED and regular LED.

Referring now to FIGS. 90-99, there is illustrated an instrument for retraction, constructed in accordance with a preferred embodiment of the subject invention and designated generally by reference numeral 140. As explained in more detail below, the surgical retractor 140 is similar in many respect to the surgical retractor 130 described above. Surgical retractor 140 is adapted and configured for supplying energy to UV LED 372 while performing biological tissue therapy on light treatment area 4 of biological tissue 2 of a patient. Referring to FIG. 96, retractor 140 includes an upper body portion 382 operatively associated with a power source 402 and a lower body portion 384 extending orthogonal to the upper body portion 382 and housing a therapeutic UV LED light source 406 embedded on a printed circuit board 394 and connected to the power source 402. Lower body portion 384 also houses a non-UV LED light source 408, which is also associated with printed circuit board 394 and connected to the power source 402, which differs from retractor 130. Preferably, the power source 402 is housed within the upper body portion 382 of the retractor 140, a lens 392 is positioned in front of both the therapeutic UV LED light source 406 and the non-UV LED light source 408. A flange projects forward from the distal end of the lower body portion 384 of the retractor 140.

Figure 92:
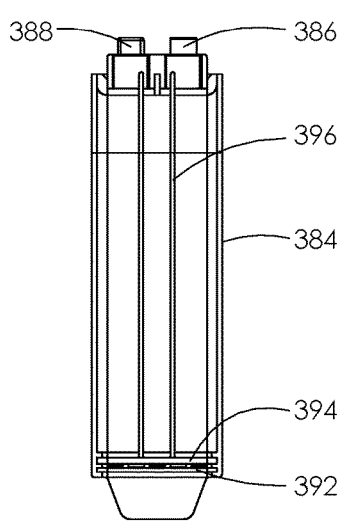
FIG. 92 is a front view of retractor by concept 12 when upper retractor body is removed.
Figure 93:
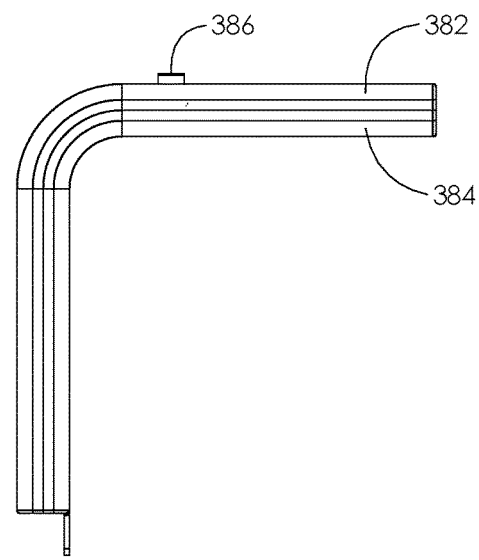
FIG. 93 is a side view of the retractor.
Figure 94:
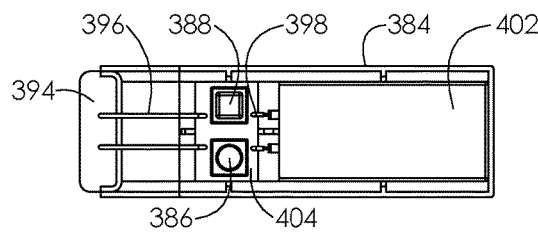
FIG. 94 is a top view of the retractor when upper retractor body is removed.
Figure 95:
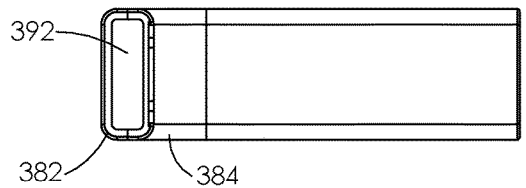
FIG. 95 is a bottom view of the retractor.

Referring to FIGS. 92, 94, and 96, the retractor 140 also differs from the previously described embodiment of the subject invention in that a way of switching could include a first switch 386 operatively associated with the therapeutic UV LED 406 and a second switch 388 operatively associated with the non-therapeutic LED 408. Switch printed circuit board 404 is operatively associated with first switch 386 and second switch 388 in order to activate therapeutic UV LED 406 and/or non-therapeutic LED 408 respectively. Wires 396 provide a means for switch 388 to communicate with printed circuit board 394, as shown in FIG. 96, and wires 398 provide a means for power source 402 to communicate with switch printed circuit board 404, as shown in FIG. 94.

Figure 99:
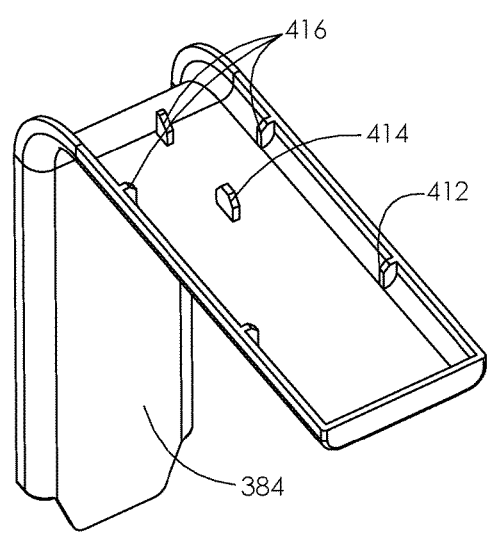
FIG. 99 is an isometric view of lower retractor body.

Referring now to FIG. 99, battery holding ribs 412 are arranged on a proximal surface lower body portion 384 as a way for securing power source 402 during assembly of retractor 140. Also on the proximal surface lower body portion 384, switch PCB holding ribs 416 are arranged as a way for securing switch PCB 404 during assembly of retractor 140. Finally, battery and switch PCB holding rib 414 is arranged on the proximal surface lower body portion 384 between battery holding ribs 374 and switch PCB holding ribs 416 as a way for further securing power source 402 and switch PCB 404 respectively, during assembly of retractor 140.

Figure 100:
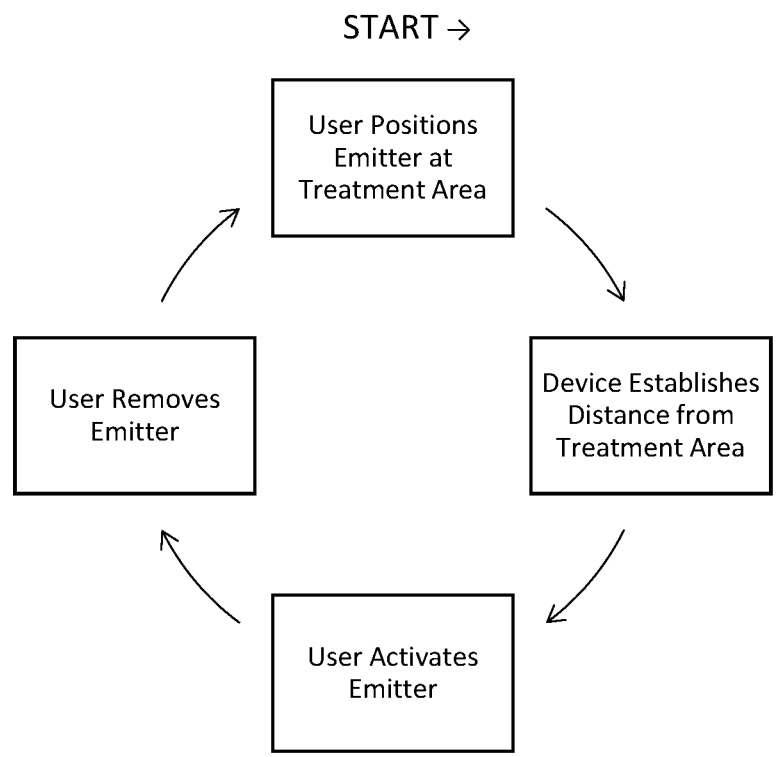
FIGS. 100 through 103 are flow charts describing the steps in the method of therapy using a therapeutic lighting device constructed in accordance with an embodiment of the subject invention.
Figure 101:
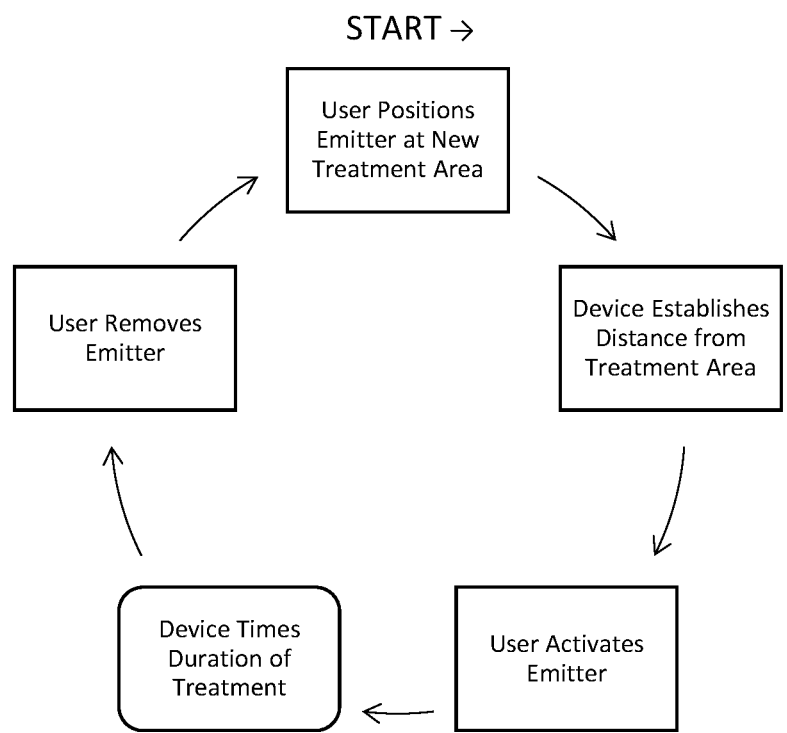
Figure 102:
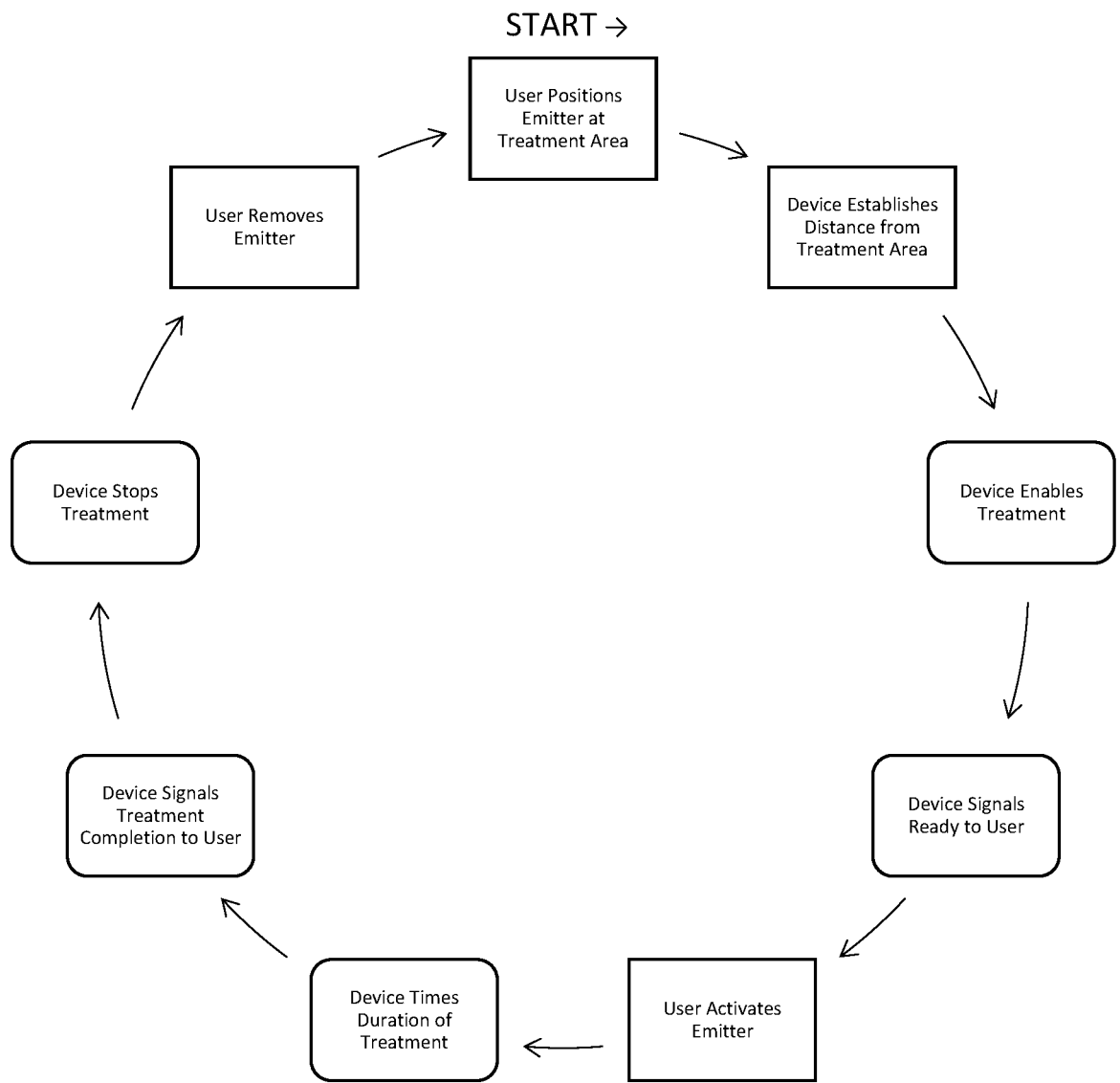
Figure 103:
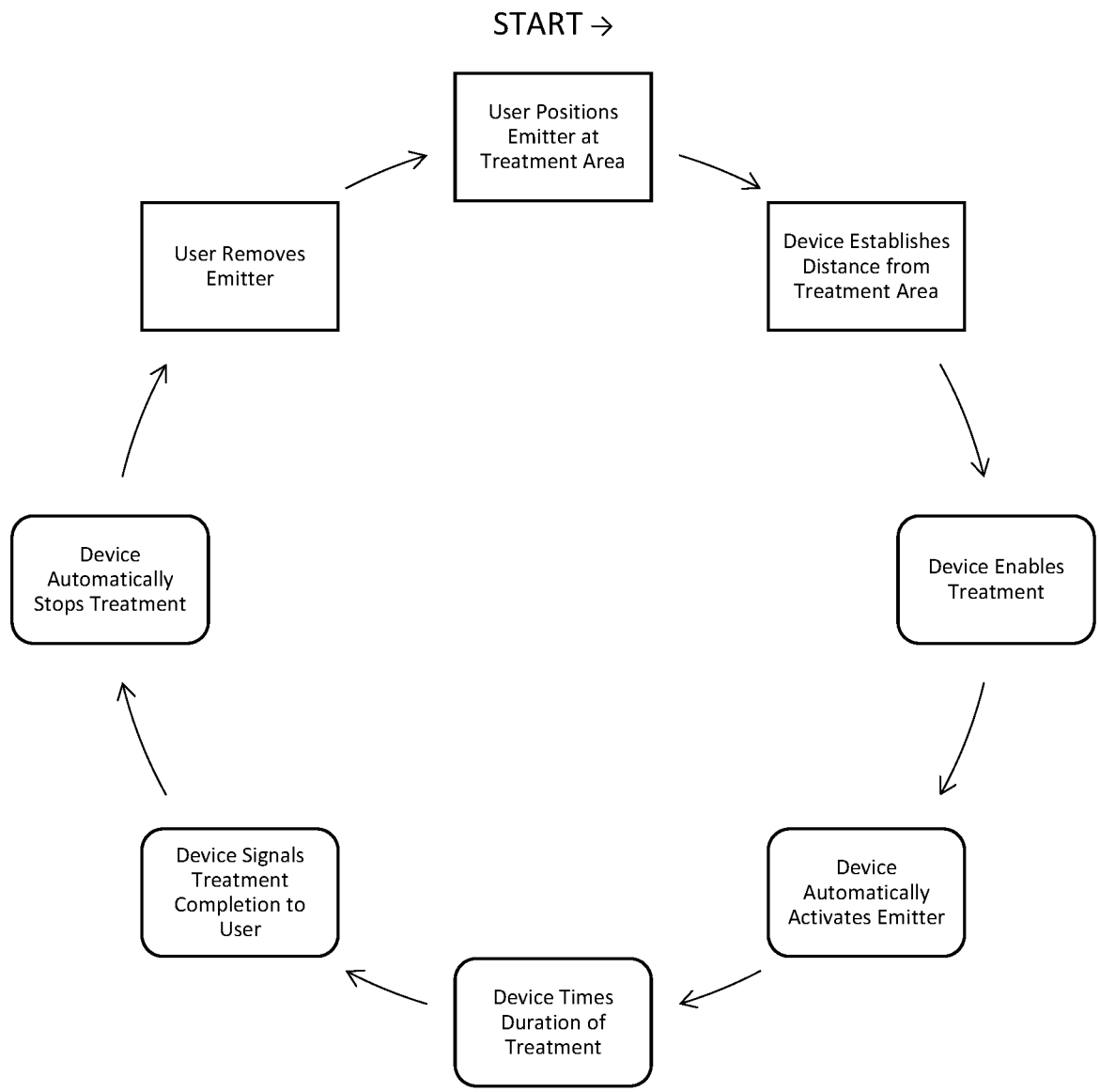

The subject invention is also directed to a method of treating biological tissue with therapeutic light, as shown in FIGS. 100-103. This method includes the steps of positioning an emitter at a treatment area, establishing an effective distance for the emitter from the treatment area, activating the emitter to provide therapeutic light at the treatment area, and then removing the emitter from the treatment area, as shown in FIG. 100. The method can further include the steps of controlling a duration of therapeutic light treatment, as shown in FIG. 101. The method can further include the steps of allowing the emitter to enable the therapeutic light treatment based on user activation, signaling to a user that the emitter is ready to provide the therapeutic light treatment, signaling to a user that the therapeutic light treatment has concluded, and allowing the emitter to stop the therapeutic light treatment based user removal of emitter, as shown in FIG. 102. The method can further include the steps of allowing the emitter to automatically enable the therapeutic light treatment, signaling to a user that the therapeutic light treatment has concluded, and allowing the emitter to automatically stop the therapeutic light treatment, followed by user removal of emitter, as shown in FIG. 103.

It is well within the scope of this disclosure that the therapeutic lighting devices described herein may be used in conjunction with other materials, drugs, devices for diagnostic imaging, or curing materials such as glues or cements, and they may provide further or additional therapeutic benefits beyond the treatment of surgical site infection such as relieving pain, promoting tissue repair, and reducing inflammation.

What is claimed is:

1. A device for treating biological tissue, comprising:
   a) a body having opposed proximal and distal end portions;
   b) a shroud extending from the distal end portion of the body for establishing an effective distance and an area of therapeutic treatment relative to biological tissue to be treated, wherein the shroud is fixedly fastened to the body so that the effective distance relative to the biological tissue to be treated is a fixed distance;
   c) a light source supported at a distal end of the body and connected to a power source for emitting therapeutic light to treat the biological tissue within the effective area of therapeutic treatment, wherein the light source includes a printed circuit board (PCB) supported within the distal end portion of the body and having a plurality of LED light sources embedded thereon, and wherein a planar lens is supported within the distal end portion of the body in front of the plurality of LED light sources for focusing the therapeutic light to the area of therapeutic treatment, and
   d) electro-mechanical means operatively associated with the body and the shroud configured to automatically activate the power source and/or the light source when the shroud comes into contact with the biological tissue to be treated.

2. The device as recited in claim 1, wherein the power source is housed within an interior cavity of the body or it is housed external to the body.

3. The device as recited in claim 1, wherein the therapeutic light is selected from a group of light sources consisting of UV light, UV-C light, Far UV-C light, infrared light, near infrared light, low level laser light and White light.

4. The device as recited in claim 1, wherein a switch is operatively associated with the body for activating the power source and/or the light source.

5. The device as recited in claim 1, wherein a control circuit is operatively associated with the printed circuit board so that the power source and/or light source can be deactivated after a predetermined treatment period or provide an indication to a user that the treatment period has been completed.

6. The device as recited in claim 1, wherein the shroud is formed from a material that is impervious to the therapeutic light so as to avoid an impact of the therapeutic light on areas of the biological tissue that are not intended to be treated.

7. The device as recited in claim 1, wherein the power source is remote from the body and it is connected to the light source by an electrical wire.

8. The device as recited in claim 1, wherein indicator means are associated with the printed circuit board for sonically or visually indicating when the power source has been deactivated or providing an indication to a user that the treatment has been completed.

9. The device as recited in claim 1, wherein the light source comprises at least one laser diode supported within the body.

10. The device as recited in claim 1, wherein the PCB is rectangular, and wherein the plurality of LED light sources embedded on the PCB are arranged along a longitudinal axis of the PCB, wherein the planar lens extends along an axial length of the PCB and is co-planar with the PCB.

11. A device for treating biological tissue, comprising:
 a) a body having opposed proximal and distal end portions;
 b) a shroud extending from the distal end portion of the body for establishing a minimum effective distance and an area of therapeutic treatment relative to biological tissue to be treated, wherein the shroud is fixedly fastened to the body so that the minimum effective distance relative to the biological tissue to be treated is a fixed distance defining a fixed volume therein where the biological tissue to be treated, the shroud, and a distal end of the body form the boundaries of the fixed volume;
 c) a light source supported at the distal end of the body and connected to a power source for emitting therapeutic light to treat the biological tissue within the effective area of therapeutic treatment, and
 d) electro-mechanical means operatively associated with the body and the shroud configured to automatically activate the light source when the electro-mechanical means comes into contact with the biological tissue to be treated, while the distal end of the body and light source remain at the fixed distance from the biological tissue to be treated.

12. The device as recited in claim 11, further comprising an indicator for sonically or visually indicating when the power source has been activated and/or the light source has been activated or provide an indication to a user that the treatment has begun.

13. The device as recited in claim 12, further comprising an indicator for sonically or visually indicating when the power source has been deactivated or provide an indication to the user that the treatment has been completed.

14. The device as recited in claim 11, wherein the electro-mechanical means includes an elongated probe extending from the distal end portion of the body configured to contact the biological tissue to be treated, wherein the probe is configured to automatically activate the light source when the probe comes into contact with the biological tissue to be treated.

15. The device as recited in claim 14, wherein the elongated probe extends beyond the shroud.

* * * * *